United States Patent
Stern-Berkowitz et al.

(10) Patent No.: US 12,069,736 B2
(45) Date of Patent: *Aug. 20, 2024

(54) SUPPORTING RANDOM ACCESS AND PAGING PROCEDURES FOR REDUCED CAPABILITY WTRUs IN AN LTE SYSTEM

(71) Applicant: InterDigital Patent Holdings, Inc., Wilmington, DE (US)

(72) Inventors: Janet A. Stern-Berkowitz, Little Neck, NY (US); Moon-il Lee, Melville, NY (US); Pouriya Sadeghi, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/127,315

(22) Filed: Mar. 28, 2023

(65) Prior Publication Data
US 2023/0262779 A1 Aug. 17, 2023

Related U.S. Application Data

(63) Continuation of application No. 16/874,612, filed on May 14, 2020, now Pat. No. 11,647,545, which is a
(Continued)

(51) Int. Cl.
*H04W 74/08* (2024.01)
*H04L 1/1829* (2023.01)
(Continued)

(52) U.S. Cl.
CPC ....... *H04W 74/0833* (2013.01); *H04L 1/1854* (2013.01); *H04L 5/0053* (2013.01);
(Continued)

(58) Field of Classification Search
CPC . H04L 1/18854; H04L 5/0092; H04L 5/0053; H04W 74/0833; H04W 74/004; H04W 74/006; H04W 74/008
See application file for complete search history.

(56) References Cited

U.S. PATENT DOCUMENTS

| | | | |
|---|---|---|---|
| 8,458,559 | B2 | 6/2013 | Siew et al. |
| 8,848,674 | B2 | 9/2014 | Kwon et al. |

(Continued)

FOREIGN PATENT DOCUMENTS

| | | |
|---|---|---|
| CN | 101843160 A | 9/2010 |
| CN | 102273298 A | 12/2011 |

(Continued)

OTHER PUBLICATIONS

3rd Generation Partnership Project (3GPP), R1-135104, "Coverage enhancement of PRACH for low cost MTC", 3GPP TSG RAN WG1 Meeting #75, San Francisco, USA, Nov. 11-15, 2013, 8 pages.
(Continued)

*Primary Examiner* — Brian D Nguyen
(74) *Attorney, Agent, or Firm* — CONDO ROCCIA KOPTIW LLP

(57) ABSTRACT

A wireless transmit/receive unit (WTRU) may transmit a preamble using a physical random access channel (PRACH) and determine a location of a random access response (RAR) based on a parameter of the PRACH. The location may include a subframe and/or a frequency resource on which the RAR is transmitted. The RAR may be received at the location. A device may receive a preamble using a PRACH associated with a coverage enhancement (CE) level and/or a CE mode of a WTRU. The device may determine a location of an RAR based on a parameter of the PRACH. The location may include a subframe and/or a frequency resource on which the RAR is to be transmitted. The device may determine a number of repetitions of the RAR to
(Continued)

transmit based on the CE level or CE mode. The RAR may be transmitted at the location with the determined number of repetitions.

20 Claims, 9 Drawing Sheets

Related U.S. Application Data continuation of application No. 16/379,698, filed on Apr. 9, 2019, now Pat. No. 10,674,544, which is a continuation of application No. 15/504,218, filed as application No. PCT/US2015/045382 on Aug. 14, 2015, now Pat. No. 10,306,680.

(60) Provisional application No. 62/204,341, filed on Aug. 12, 2015, provisional application No. 62/161,212, filed on May 13, 2015, provisional application No. 62/149,053, filed on Apr. 17, 2015, provisional application No. 62/075,555, filed on Nov. 5, 2014, provisional application No. 62/038,194, filed on Aug. 15, 2014.

(51) Int. Cl.
*H04L 5/00* (2006.01)
*H04W 74/00* (2009.01)
*H04W 74/0833* (2024.01)

(52) U.S. Cl.
CPC ......... *H04L 5/0092* (2013.01); *H04W 74/004* (2013.01); *H04W 74/006* (2013.01); *H04W 74/008* (2013.01)

(56) References Cited

U.S. PATENT DOCUMENTS

| | | | |
|---|---|---|---|
| 9,225,503 B2 | 12/2015 | Kim et al. | |
| 9,226,287 B2 | 12/2015 | Suzuki et al. | |
| 9,232,540 B2 | 1/2016 | Xu et al. | |
| 9,499,995 B2 | 11/2016 | Xiong et al. | |
| 9,548,845 B2 | 1/2017 | Yi et al. | |
| 9,648,480 B2 | 5/2017 | Sammour et al. | |
| 9,730,114 B2 | 8/2017 | Han et al. | |
| 9,730,244 B2 | 8/2017 | Pasad et al. | |
| 9,876,610 B2 | 1/2018 | Li et al. | |
| 9,974,068 B2 | 5/2018 | Yang et al. | |
| 10,306,680 B2 | 5/2019 | Stern-berkowitz et al. | |
| 10,505,680 B2 | 12/2019 | Marinier et al. | |
| 10,674,544 B2 | 6/2020 | Stern-berkowitz et al. | |
| 2009/0186624 A1 | 7/2009 | Cave et al. | |
| 2009/0268707 A1 | 10/2009 | Pani et al. | |
| 2010/0210255 A1 | 8/2010 | Amirijoo et al. | |
| 2010/0272017 A1 | 10/2010 | Terry et al. | |
| 2010/0309021 A1 | 12/2010 | Picard | |
| 2011/0051840 A1 | 3/2011 | Hooki et al. | |
| 2011/0292816 A1 | 12/2011 | Lee et al. | |
| 2012/0002606 A1 | 1/2012 | Vujcic | |
| 2012/0026929 A1 | 2/2012 | Wang et al. | |
| 2012/0281576 A1 | 11/2012 | Yamada et al. | |
| 2012/0300715 A1 | 11/2012 | Pelletier et al. | |
| 2012/0300752 A1 | 11/2012 | Kwon et al. | |
| 2013/0083749 A1 | 4/2013 | Xu et al. | |
| 2013/0242837 A1 | 9/2013 | Worrall et al. | |
| 2014/0086173 A1 | 3/2014 | Sadeghi et al. | |
| 2014/0086224 A1 | 3/2014 | Kwon et al. | |
| 2014/0098761 A1 | 4/2014 | Lee et al. | |
| 2014/0254391 A1 | 9/2014 | Mahalingam et al. | |
| 2014/0269566 A1 | 9/2014 | Wang et al. | |
| 2015/0016312 A1* | 1/2015 | Li | H04W 74/006 370/280 |
| 2015/0023281 A1 | 1/2015 | Wu | |
| 2015/0043445 A1 | 2/2015 | Xiong et al. | |
| 2016/0014632 A1 | 1/2016 | Siow et al. | |
| 2016/0088595 A1 | 3/2016 | You et al. | |
| 2016/0119900 A1 | 4/2016 | You et al. | |
| 2016/0128011 A1* | 5/2016 | Yang | H04W 72/23 370/329 |
| 2016/0143057 A1 | 5/2016 | Li et al. | |
| 2016/0219614 A1 | 7/2016 | Webb et al. | |
| 2016/0234865 A1* | 8/2016 | Yasukawa | H04W 28/24 |
| 2016/0278124 A1* | 9/2016 | Zhao | H04W 74/08 |
| 2016/0353473 A1 | 12/2016 | Chen et al. | |
| 2017/0034853 A1 | 2/2017 | Rune et al. | |
| 2017/0164400 A1 | 6/2017 | Fong et al. | |
| 2017/0171787 A1 | 6/2017 | Fu et al. | |
| 2017/0238302 A1* | 8/2017 | Futaki | H04W 4/70 370/329 |
| 2017/0280478 A1 | 9/2017 | Petermann et al. | |
| 2018/0279313 A1 | 9/2018 | Papasakellariou | |
| 2019/0229858 A1 | 7/2019 | Cui et al. | |
| 2020/0068464 A1 | 2/2020 | Basu Mallick et al. | |
| 2020/0382970 A1 | 12/2020 | Dimou et al. | |
| 2021/0044395 A1 | 2/2021 | Fong et al. | |

FOREIGN PATENT DOCUMENTS

| | | |
|---|---|---|
| CN | 102548015 A | 7/2012 |
| CN | 102959997 A | 3/2013 |
| CN | 103518407 A | 1/2014 |
| CN | 103518415 A | 1/2014 |
| CN | 103548409 A | 1/2014 |
| CN | 103828467 A | 5/2014 |
| CN | 103906085 A | 7/2014 |
| EP | 2328297 A1 | 6/2011 |
| EP | 2849483 A1 | 3/2015 |
| JP | 2011-182348 A | 9/2011 |
| JP | 2013-232903 A | 11/2013 |
| JP | 2015-537422 A | 12/2015 |
| JP | 2016-528791 A | 9/2016 |
| KR | 10-2010-0014387 A | 2/2010 |
| KR | 10-2010-0029681 A | 3/2010 |
| KR | 10-2012-0139102 A | 12/2012 |
| KR | 10-2013-0137672 A | 12/2013 |
| KR | 10-2014-0071482 A | 6/2014 |
| KR | 10-2014-0078657 A | 6/2014 |
| WO | 2009/131509 A1 | 10/2009 |
| WO | 2011/050996 A1 | 5/2011 |
| WO | 2012/134248 A2 | 10/2012 |
| WO | 2013/036580 A2 | 3/2013 |
| WO | 2013/181808 A1 | 12/2013 |
| WO | 2014/055878 A1 | 4/2014 |
| WO | 2014/110802 A1 | 7/2014 |
| WO | 2014/110805 A1 | 7/2014 |
| WO | 2014/112905 A1 | 7/2014 |

OTHER PUBLICATIONS

3rd Generation Partnership Project (3GPP), R1-135342, "Discussion on PRACH Coverage Enhancement for MTC UE", Sharp, 3GPP TSG RAN WG1 Meeting #75, San Francisco, USA, Nov. 11-15, 2013, pp. 1-4.

3rd Generation Partnership Project (3GPP), R1-135460, "RACH Procedure for MTC Coverage Enhancement", LG Electronics, 3GPP TSG RAN WG1 #75, San Francisco, USA, Nov. 11-15, 2013, pp. 25-28.

3rd Generation Partnership Project (3GPP), R1-135509, "Discussion on Multi-level PRACH Coverage Enhancement", NTT DoComo, 3GPP TSG RAN WG1 Meeting #75, San Francisco, USA, Nov. 11-15, 2013, 7 pages.

3rd Generation Partnership Project (3GPP), R1-136057, "Offline Report on the Handling on PRACH for Enhanced Coverage Mode", Panasonic, 3GPP TSG RAN WG1 #75, San Francisco, USA, Nov. 11-15, 2013, 2 pages.

3rd Generation Partnership Project (3GPP), R1-140153, "Coverage Enhancement for RACH Messages", 3GPP TSG-RAN WG1 Meeting #76, Alcatel-Lucent, Alcatel-Lucent Shanghai Bell, Prague, Czech Republic, Feb. 10-14, 2014, 5 pages.

(56) References Cited

OTHER PUBLICATIONS

3rd Generation Partnership Project (3GPP), R1-140278, "PRACH Coverage Enhancement for MTC UEs", ZTE, 3GPP TSG RAN WG1 Meeting #76, Prague, Czech Republic, Feb. 10-14, 2014, 8 pages.

3rd Generation Partnership Project (3GPP), R1-140305, "RACH Procedure for MTC Coverage Enhancement", 3GPP TSG RAN WG1 #76; LG Electronics; Prague, Czech Republic, Feb. 10-14, 2014, 3 pages.

3rd Generation Partnership Project (3GPP), R1-140355, "PRACH Coverage Enhancements for MTG UEs", Samsung, 3GPP TSG RAN WG1 #76, Prague, Czech Republic, Feb. 10-14, 2014, 5 pages.

3rd Generation Partnership Project (3GPP), R1-140640, "On PRACH Coverage Enhancement for MTC UE", Sharp, 3GPP TSG RAN WG1 Meeting #76, Prague, Czech Republic, Feb. 10-14, 2014, 5 pages.

3rd Generation Partnership Project (3GPP), R2-140727, "Capability Signalling for Low Complexity MTC UE", Alcatel-Lucent, Alcatel-Lucent Shanghai Bell, 3GPP TSG-RAN WG2 Meeting #85, Prague, Czech Republic, Feb. 10-14, 2014, pp. 49-51.

3rd Generation Partnership Project (3GPP), TS 36.211 V11.4.0, "Technical Specification Group Radio Access Network, Evolved Universal Terrestrial Radio Access (E-UTRA), Physical Channels and Modulation (Release 11)", Sep. 2013, pp. 1-120.

3rd Generation Partnership Project (3GPP), TS 36.212 V11.3.0, "Technical Specification Group Radio Access Network, Evolved Universal Terrestrial Radio Access (E-UTRA), Multiplexing and Channel Coding (Release 11)", Jun. 2013, pp. 1-84.

3rd Generation Partnership Project (3GPP), TS 36.212 V12.1.0, "Technical Specification Group Radio Access Network, Evolved Universal Terrestrial Radio Access (E-UTRA), Multiplexing and Channel Coding (Release 12)", Jun. 2014, pp. 1-89.

3rd Generation Partnership Project (3GPP), TS 36.213 V11.4.0, "Technical Specification Group Radio Access Network, Evolved Universal Terrestrial Radio Access (E-UTRA), Physical Layer Procedures (Release 11)", Sep. 2013, pp. 1-182.

3rd Generation Partnership Project (3GPP), TS 36.304 V12.1.0, "Technical Specification Group Radio Access Network, Evolved Universal Terrestrial Radio Access (E-UTRA), User Equipment (UE) Procedures in Idle Mode (Release 12)", Jun. 2014, pp. 1-35.

3rd Generation Partnership Project (3GPP), TS 36.321 V11.1.0, "Technical Specification Group Radio Access Network, Evolved Universal Terrestrial Radio Access (E-UTRA), Medium Access Control (MAC) Protocol Specification (Release 11)", Dec. 2012, pp. 1-57.

3rd Generation Partnership Project (3GPP), TS 36.321 V12.2.1, "Technical Specification Group Radio Access Network, Evolved Universal Terrestrial Radio Access (E-UTRA), Medium Access Control (MAC) Protocol Specification (Release 12)", Jun. 2014, pp. 1-57.

3rd Generation Partnership Project (3GPP), TS 36.331 V11.4.0, "Technical Specification Group Radio Access Network, Evolved Universal Terrestrial Radio Access (E-UTRA), Radio Resource Control (RRC), Protocol Specification (Release 11)", Jun. 2013, pp. 1-346.

3rd Generation Partnership Project (3GPP), TS 36.331 V12.2.0, "Technical Specification Group Radio Access Network, Evolved Universal Terrestrial Radio Access (E-UTRA), Radio Resource Control (RRC), Protocol Specification (Release 12)", Jun. 2014, pp. 1-365.

CNIPA, "National Intellectual Property Administration, PRC for Reexamination and Invalidation Examination", Decision on Invalidation Petition (54650) of Chinese Patent No. 201580056369.7, Mar. 16, 2022, 43 pages.

Li et al., "Implementation of DCI Format Detection and Transmission Scheme Confirmation of PDSCH in LTE System", Video Engineering, No. 17, Sep. 2, 2013, 6 pages.

* cited by examiner

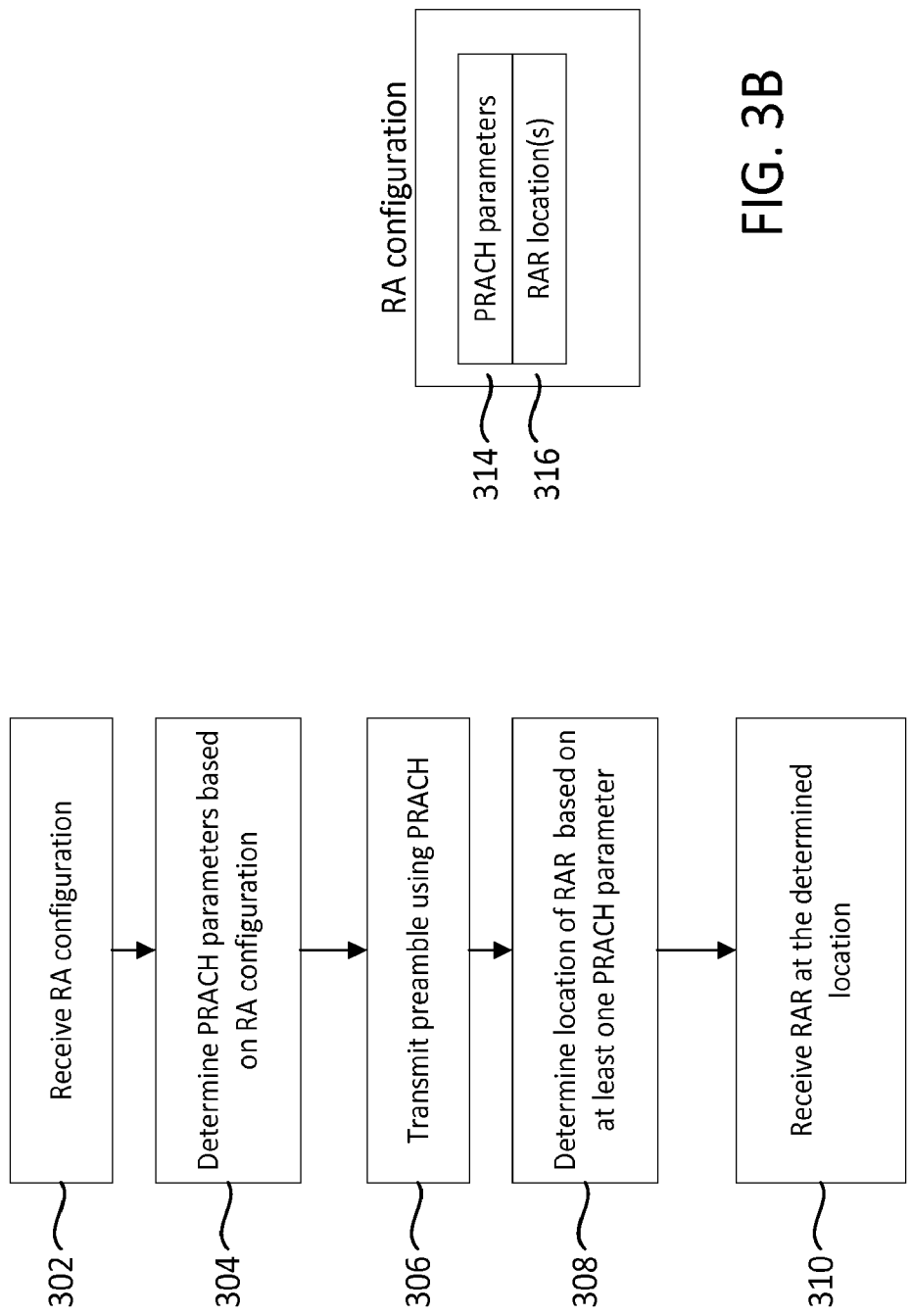

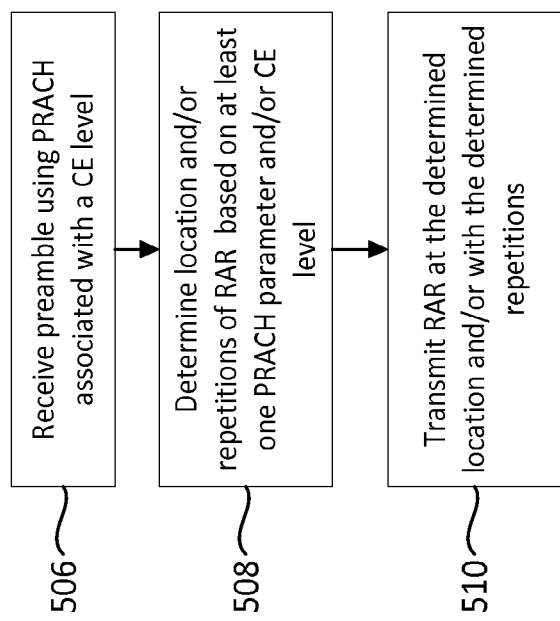

SUPPORTING RANDOM ACCESS AND PAGING PROCEDURES FOR REDUCED CAPABILITY WTRUs IN AN LTE SYSTEM

CROSS-REFERENCE TO RELATED APPLICATIONS

This application is a continuation of U.S. Non-Provisional application Ser. No. 16/874,612, filed May 14, 2020 and issued as U.S. Pat. No. 11,647,545, which is a continuation of U.S. Non-Provisional application Ser. No. 16/379,698, filed Apr. 9, 2019 and issued as U.S. Pat. No. 10,674,544, which is a continuation of U.S. Non-Provisional application Ser. No. 15/504,218, filed Feb. 15, 2017 and issued as U.S. Pat. No. 10,306,680, which is the National Stage entry under 35 U.S.C. § 371 of Patent Cooperation Treaty Application PCT/US2015/045382, filed Aug. 14, 2015, which claims the benefit of United States Provisional Patent Application 62/038,194, filed Aug. 15, 2014; U.S. Provisional Patent Application 62/075,555, filed Nov. 5, 2014; U.S. Provisional Patent Application 62/149,053, filed Apr. 17, 2015; U.S. Provisional Patent Application 62/161,212, filed May 13, 2015; and U.S. Provisional Patent Application 62/204,341, filed Aug. 12, 2015. The disclosures of the aforementioned priority applications are incorporated by reference herein in their entities.

BACKGROUND

A coverage enhanced wireless transmit/receive unit (WTRU) may be a WTRU that may need or may use coverage enhancement or a WTRU that may support or use a coverage enhancement (CE) mode. A coverage limited WTRU may refer to a coverage enhanced WTRU, and vice versa.

A reduced bandwidth (BW) WTRU may be a WTRU that may support a certain limited bandwidth (e.g., RF bandwidth) or a certain limited number of resource blocks (RBs) in the downlink (DL) and/or uplink (UL) that may be independent of the bandwidth of the eNB or cell with which the WTRU may communicate. For example, a limited bandwidth WTRU may support a certain number of RBs (e.g., 6 RBs) or bandwidth (e.g., 1.4 MHz) for transmission and/or reception. Such a WTRU may communicate with an eNB or cell for which the bandwidth may be larger (e.g., 20 MHz or 100 RBs). This WTRU may use procedures to operate in a portion of the full bandwidth of the cell. Reduced bandwidth, limited bandwidth, and bandwidth limited may be used interchangeably.

SUMMARY

PRACH resource allocation and random access procedures may be provided for WTRUs that may be coverage limited and/or bandwidth limited. Some (e.g., all) of the PRACH resources that may be allocated, e.g., by an eNB, for coverage limited WTRUs may be located in a bandwidth that may be supported by bandwidth limited WTRUs. WTRUs that may be both coverage limited and bandwidth limited may choose from and/or use one or more PRACH resources for PRACH transmission to an eNB. PRACH resources that may be allocated or designated for each of one or more (e.g., all) levels of coverage limitation may include a subset that may be used by WTRUs that may be coverage limited and bandwidth limited.

PRACH resources may be allocated or designated for WTRUs that may be both coverage limited and bandwidth limited. WTRUs that may be both coverage limited and bandwidth limited may choose from and/or use these allocated or designated PRACH resources for PRACH transmission to an eNB. PRACH resources (which may be differentiated, for example, by one or more of preamble, time, and/or frequency) may be allocated and/or used for different levels of coverage limitation.

A WTRU may transmit a preamble using a PRACH and may determine a location of a random access response (RAR) based on a parameter of the PRACH, the location comprising at least one of a subframe or a frequency resource on which the RAR is transmitted. The WTRU may receive the RAR at the determined location.

A device may receive a preamble using a PRACH associated with at least one of a coverage enhancement (CE) level or a CE mode of a WTRU from which the preamble is received. The device may determine a location of an RAR based on a parameter of the PRACH. The location may comprise at least one of a subframe or a frequency resource on which the RAR is to be transmitted. The device may determine a number of repetitions of the RAR to transmit based on the CE level or CE mode. The device may transmit the RAR at the determined location with the determined number of repetitions.

BRIEF DESCRIPTION OF THE DRAWINGS

FIG. 3A illustrates an example of preamble transmission and RAR reception by a WTRU.

FIG. 3B illustrates an example RA configuration.

FIG. 5 illustrates an example of preamble reception and RAR transmission.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
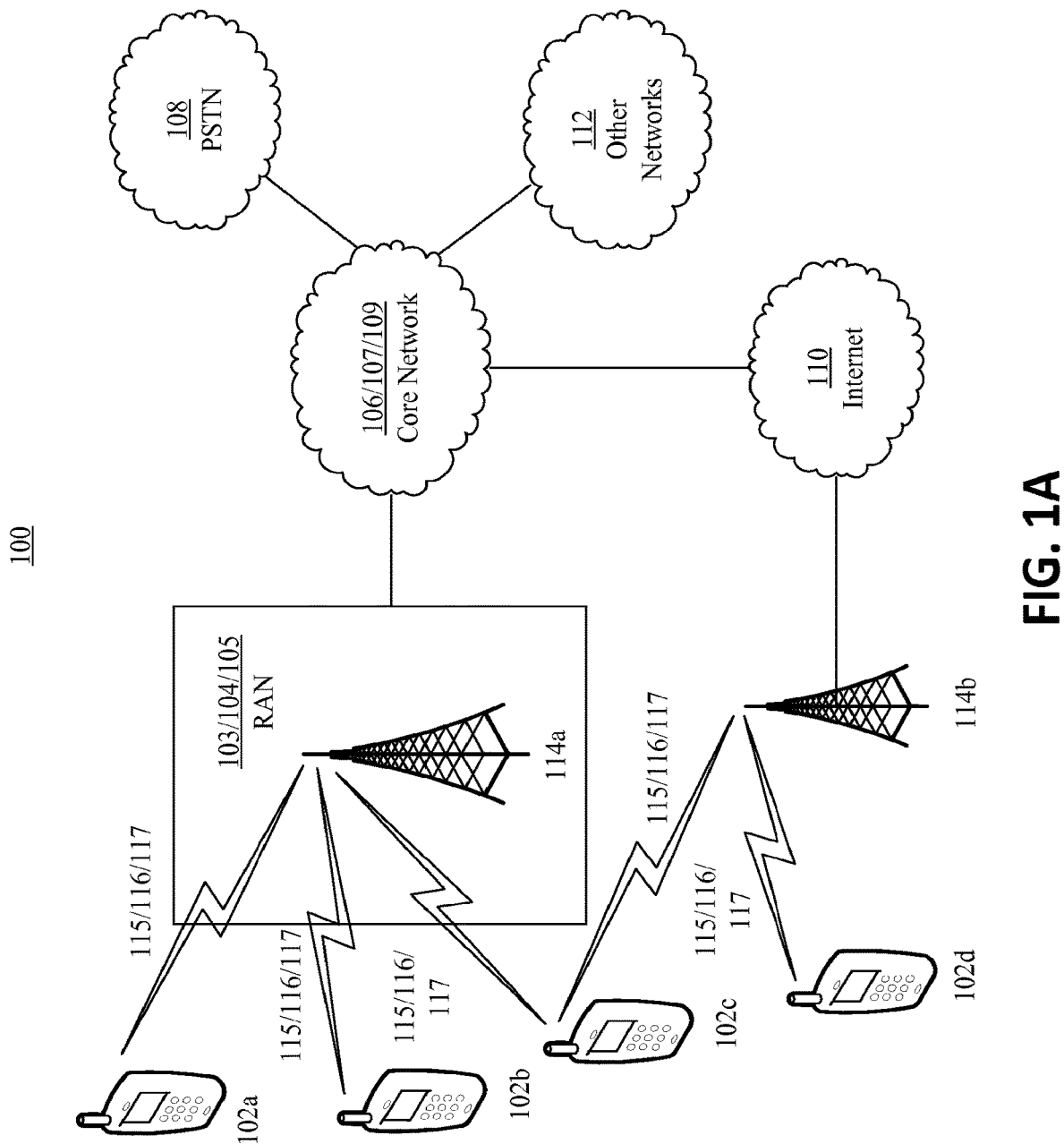
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
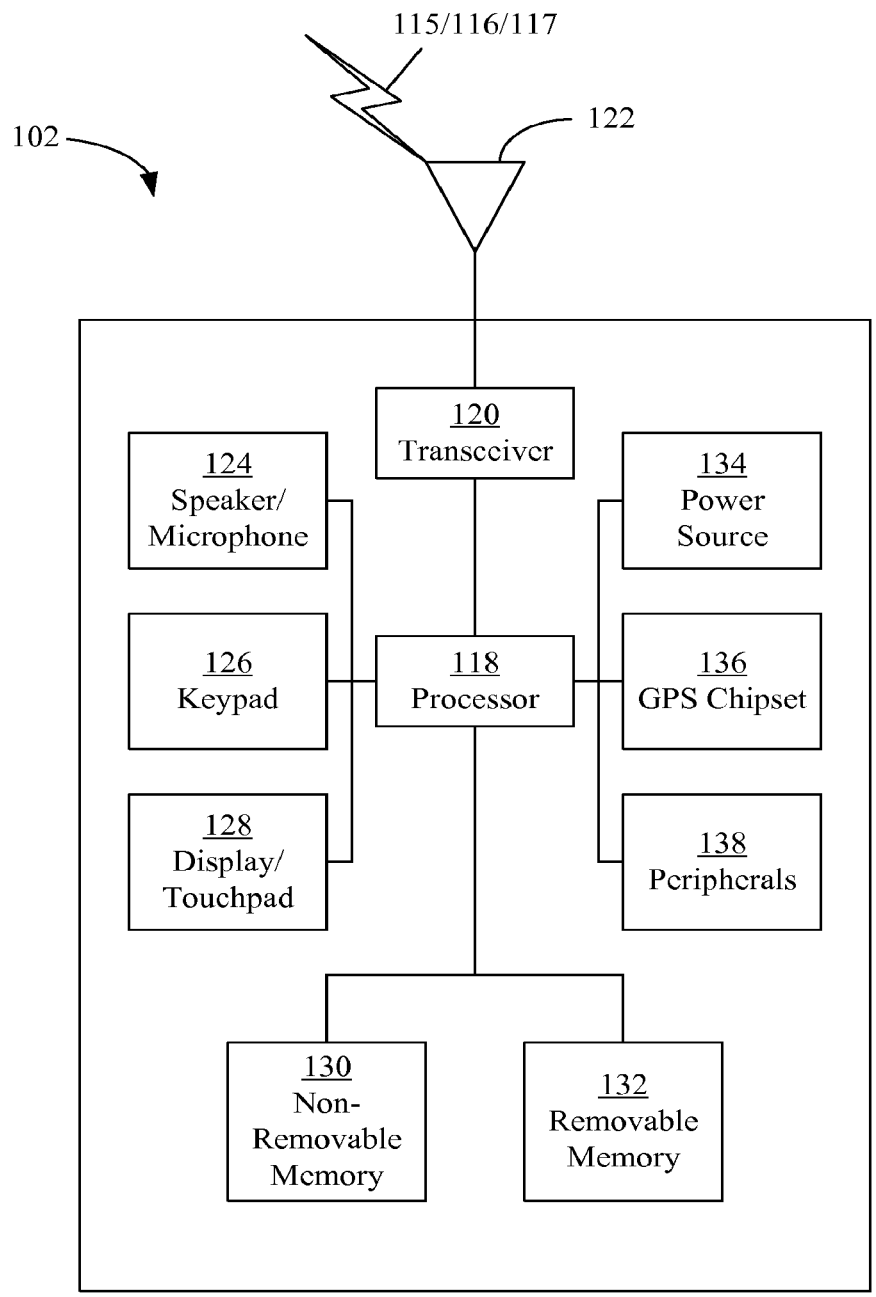
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip. A processor, such as the processor 118, may include integrated memory (e.g., WTRU 102 may include a chipset that includes a processor and associated memory). Memory may refer to memory that is integrated with a processor (e.g., processor 118) or memory that is otherwise associated with a device (e.g., WTRU 102). The memory may be non-transitory. The memory may include (e.g., store) instructions that may be executed by the processor (e.g., software and/or firmware instructions). For example, the memory may include instructions that when executed may cause the processor to implement one or more of the implementations described herein.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130, the removable memory 132, and/or memory integrated with the processor 118. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/

117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
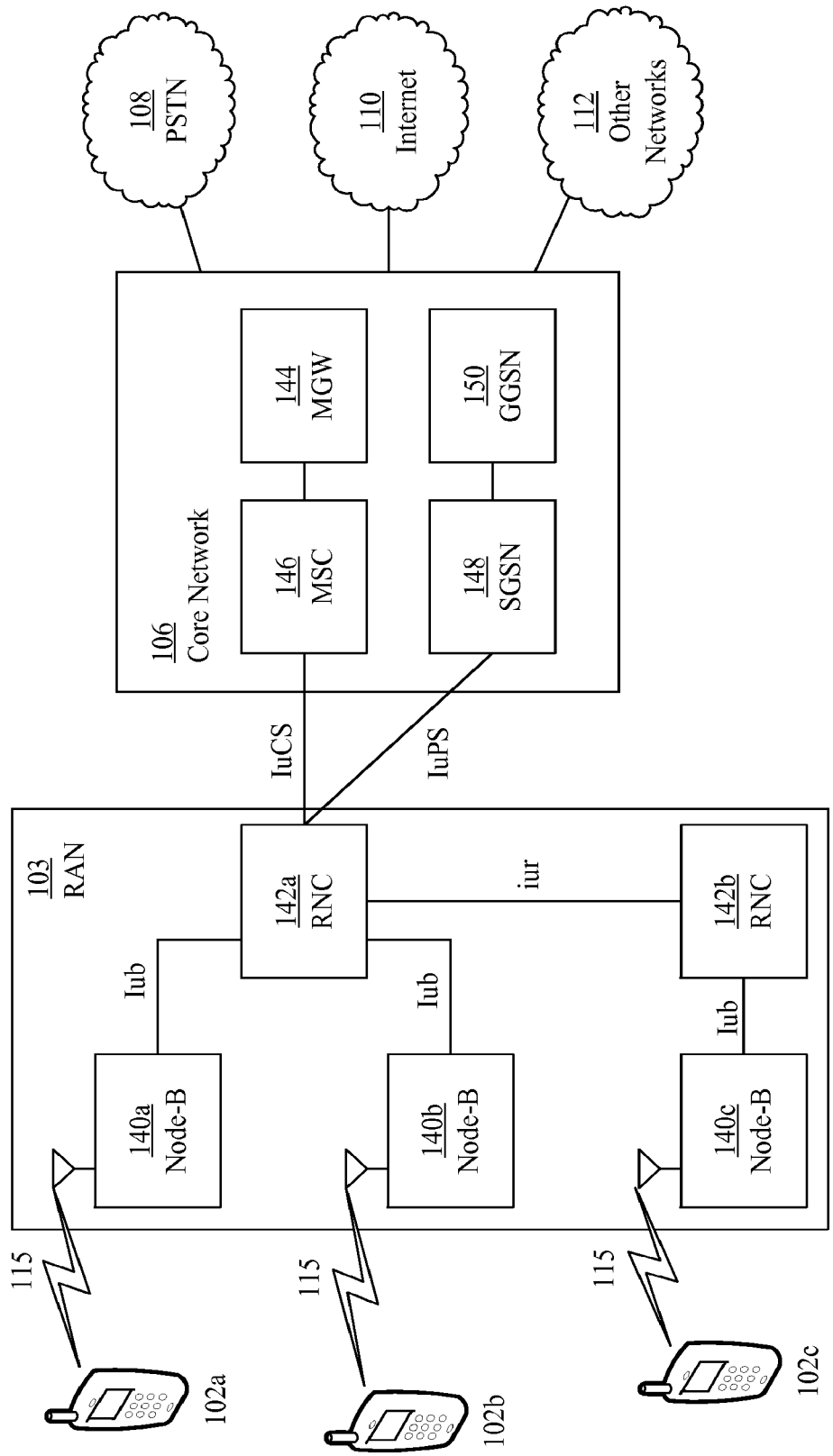
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
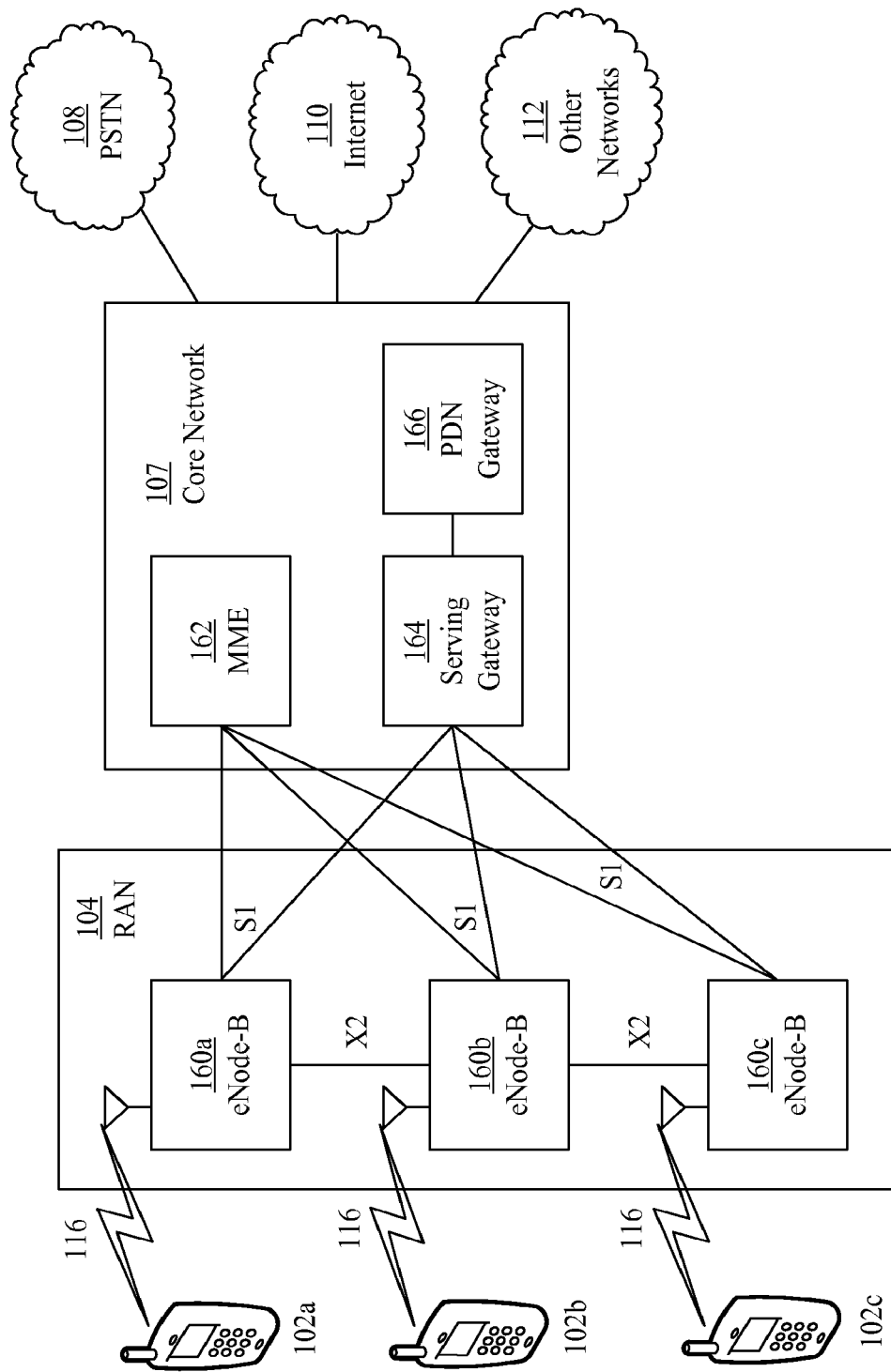
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
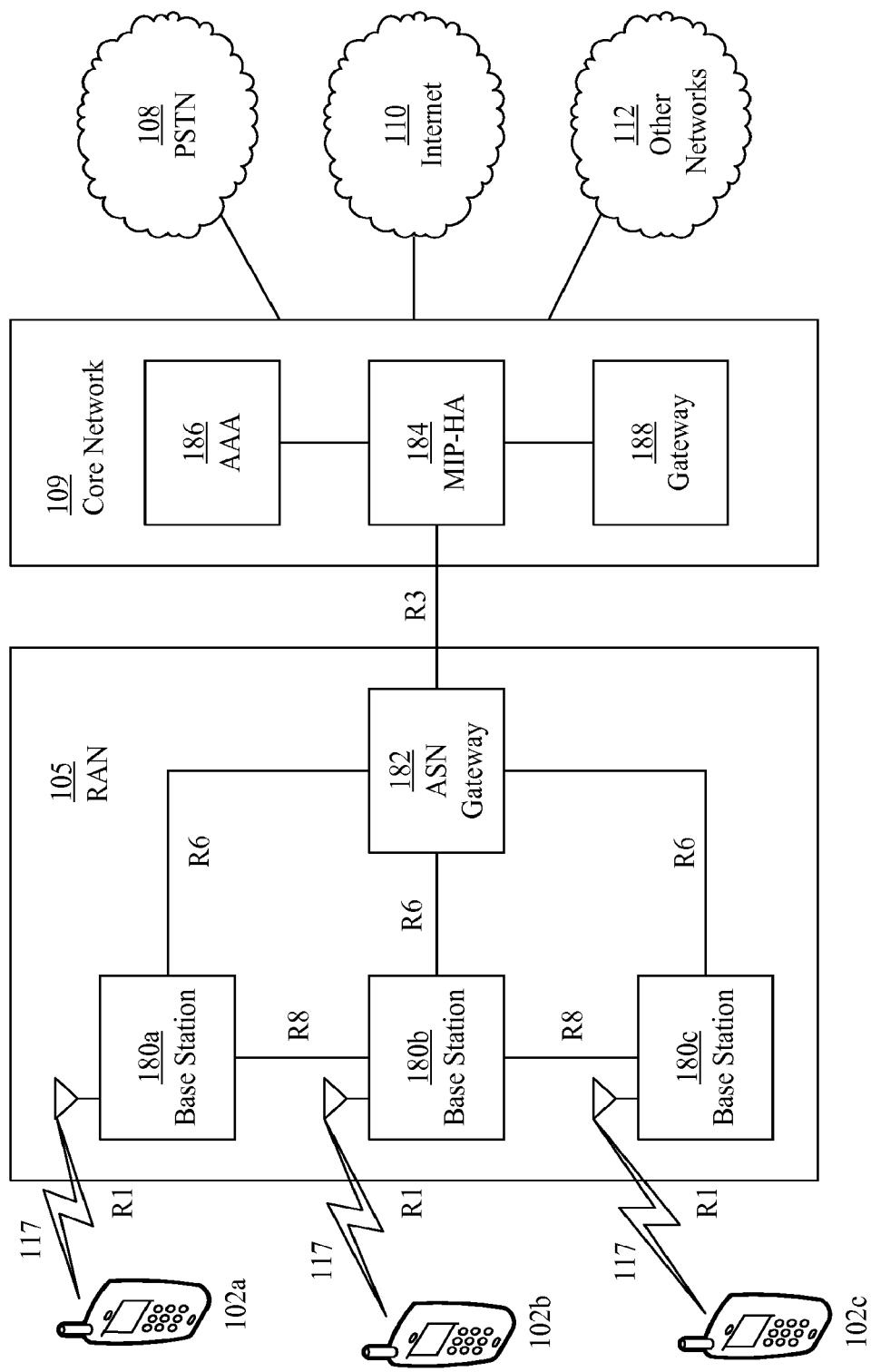
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

A WTRU that may support the full bandwidth of a cell may be referred to as a full bandwidth WTRU. Bandwidth may include a number of RBs and/or a location in a band, such as the center of the band.

A WTRU may at least sometimes communicate, behave, or operate in a manner that may be consistent (e.g., at least partially consistent) with that of a full bandwidth (BW) WTRU and may at least sometimes (e.g., at other times) communicate, behave, or operate in a manner that may be consistent (e.g., at least partially consistent) with that of a reduced BW WTRU. For example, a WTRU that may support the full bandwidth of a cell may communicate, behave, or operate in a manner that may be consistent (e.g., at least partially consistent) with that of a reduced BW WTRU at certain times, such as when it may be coverage limited or when it may operate in coverage enhanced (CE) mode. A WTRU may be or may be considered a full BW WTRU and/or a reduced BW WTRU, for example, at least sometimes.

A WTRU may be or may be considered a reduced BW WTRU while it may (or may need to or may intend to) behave or operate like (e.g., at least partially like) a reduced BW WTRU. A WTRU that may communicate (e.g., with an eNB), behave, or operate in a manner that may be consistent (e.g., at least partially consistent) with that of a reduced BW WTRU may be or may be considered to be a reduced BW WTRU, for example, at least sometimes, such as when the WTRU may communicate, behave, or operate in a manner that may be consistent (e.g., at least partially consistent) with that of a reduced BW WTRU.

The examples disclosed herein may apply to eNBs and cells. The examples disclosed herein may apply to WTRUs such as coverage limited and reduced bandwidth (BW)

WTRUs. The examples disclosed herein as being applicable to reduced BW WTRUs may apply to coverage limited WTRUs. The examples disclosed herein as being applicable to coverage limited WTRUs may apply to reduced BW WTRUs. The examples disclosed herein may apply to WTRUs of other types, with other capabilities, or with reduced capabilities.

For purposes of description and explanation, PDCCH may be replaced with EPDCCH, and vice versa, and may still be consistent with the examples disclosed herein. For purposes of description and explanation, PDCCH (or EPDCCH) may be replaced with a DL control channel or another DL control channel and may still be consistent with the examples disclosed herein. For purposes of description and explanation, component carrier (CC) and serving cell may be used interchangeably. For purposes of description and explanation, WTRU, WTRU MAC entity, and MAC entity may be used interchangeably. For purposes of description and explanation, eNB and cell may be used interchangeably. CE level may be replaced with number of repetitions, and vice versa, and may still be consistent with the examples disclosed herein. Repetition number, number of repetitions, and repetition level may be used interchangeably.

A WTRU or WTRUs may be replaced with at least a WTRU or at least WTRUs, and may still be consistent with the examples disclosed herein. Intended for may be replaced with at least intended for or with intended for at least and may still be consistent with the examples disclosed herein.

Examples disclosed herein may be disclosed for RAR, PCH, or for a physical downlink shared channel (PDSCH) that may carry RAR or PCH. Such examples are non-limiting. RAR may be replaced by PCH, PCH PDSCH, or PDSCH, and vice versa, and may still be consistent with the examples disclosed herein. The channel or other content that may be carried by the PDSCH may be replaced by another channel or content and may still be consistent with the examples disclosed herein.

An eNB and/or a WTRU may use a random access procedure for WTRU initial access (for example, to a cell or eNB), reset of UL timing (for example, to reset or align WTRU UL timing with respect to a cell), and/or reset of timing during handover (for example, to reset or align WTRU timing with respect to the handover target cell). The WTRU may transmit a physical random access channel (PRACH) preamble sequence at a power $P_{PRACH}$, which may be based on configured parameters and/or measurements, and the WTRU may transmit the preamble using a time-frequency resource or resources. The configured parameters, which may be provided or configured by the eNB, may include one or more of initial preamble power (e.g., preambleInitialReceivedTargetPower), a preamble format based offset (e.g., deltaPreamble), a random access response window (e.g., ra-ResponseWindowSize), a power ramping factor (e.g., powerRampingStep), and/or a maximum number of retransmissions (e.g., preambleTransMax). The PRACH resources (which may include preambles or sets of preambles and/or time/frequency resources that may be used for preamble transmission) may be provided or configured by the eNB. The measurements may include pathloss. The time-frequency resource or resources may be chosen by the WTRU from an allowed set or may be chosen by the eNB and signaled to the WTRU. Following WTRU transmission of a preamble, if the eNB may detect the preamble, it may respond with a random access response (RAR). If the WTRU may not or does not receive an RAR for the transmitted preamble (which may, for example, correspond to a certain preamble index and time/frequency resource), within an allotted time (for example, ra-ResponseWindowSize), the WTRU may send another preamble at a later time, at a higher power, (for example, higher than the previous preamble transmission by powerRampingStep) where the transmission power may be limited by a maximum power, for example, a WTRU-configured maximum power which may be for the WTRU as a whole (for example, $P_{CMAX}$) or for a serving cell of the WTRU (for example, $P_{CMAX,c}$). The WTRU may wait again for receipt of an RAR from the eNB. This sequence of transmitting and waiting may continue until the eNB may respond with an RAR or until the maximum number of random access preamble transmissions (for example, preambleTransMax) may have been reached. The eNB may transmit and the WTRU may receive the RAR in response to a single preamble transmission.

The term time/frequency or time-frequency may be used to represent time and/or frequency. The term time-frequency may be used to represent a specific time and frequency.

A random access procedure (e.g., an instance of a random access procedure) may be contention-based or contention-free. A contention-free procedure may be initiated by a request, for example from an eNB, which may, for example, be via physical layer signaling such as a PDCCH order or by higher layer signaling such as an RRC reconfiguration message (e.g., an RRC connection reconfiguration message) that may include mobility control information and may, for example, indicate or correspond to a handover request. For a contention-free procedure that may be initiated by PDCCH order in subframe n, the PRACH preamble may be transmitted in the first subframe (or the first subframe available for PRACH) $n+k_2$, where $k_2$ may be at least 6. When initiated by RRC command, there may be other delays that may be specified (for example, there may be minimum and/or maximum required or allowed delays). The WTRU may autonomously initiate a contention-based procedure for reasons that may include for example, initial access, restoration of UL synchronization, and/or recovering from radio link failure. For certain events, for example, events other than recovery from radio link failure, it may not be defined or specified as to how long after such an event the WTRU may send the PRACH preamble.

For a contention-free random access (RA) procedure, a network-signaled PRACH preamble may be used, e.g., by a WTRU. For a contention-based random access procedure, the WTRU may autonomously choose a preamble where the preamble format and/or the time/frequency resource or resources available for preamble transmissions may be based on an indication or index (e.g., prach_configIndex) that may be provided or signaled by the eNB.

In an LTE system, one of the preambles transmitted at the progressively higher transmit powers may be detected by the eNB. An RAR may be sent by the eNB in response to that one detected preamble.

A WTRU may monitor (e.g., periodically) the PDCCH for DL assignments on the PDCCH masked with a P-RNTI (Paging Radio Network Temporary Identifier (RNTI)) in idle mode and/or in connected mode. When such a DL assignment using the P-RNTI may be detected, the WTRU may demodulate the assigned PDSCH resource blocks (RBs) and may decode the paging channel (PCH) carried on that PDSCH. A PDSCH that may carry PCH may be a PCH PDSCH. Paging, paging message, paging information, and PCH may be used interchangeably.

In idle mode, the specific paging frame (PF) and subframe within that PF, for example, the paging occasion (PO) that a WTRU may monitor for the paging channel may be determined based on the WTRU ID (e.g., WTRU ID) and parameters that may be specified by the network. The parameters may include the paging cycle (PC) length (e.g., in frames), which may be the same as a DRX cycle and another parameter, e.g., nB, which together may facilitate the determination of the number of PF per PC and the number of PO per PF that may be in the cell. The WTRU ID may be the WTRU IMSI or the WTRU IMSI modulo a number such as 1024. For example, the PO may be determined based on WTRU IMSI mod 1024.

There may be multiple PFs per paging cycle and multiple POs within a PF, for example, more than one subframe per paging cycle may carry PDCCH masked with a P-RNTI. A WTRU may monitor a (e.g., one) PO per paging cycle, and such a PO may be determined based on WTRU ID and/or one or more of the parameters disclosed herein, which may be provided to the WTRU via system information, dedicated signaling information, and the like. POs may include pages for one or more specific WTRUs, or they may include system information change pages that may be directed to each of the WTRUs, some of the WTRUs, or all of the WTRUs. For WTRU-specific pages (e.g., pages that may be specific to one or more WTRUs), a WTRU (e.g., a WTRU in idle mode) may monitor one PO per PC that may be based on a WTRU ID. For pages that may indicate a system information change (e.g., a change that has occurred or an upcoming system information change), a WTRU (e.g., a WTRU in idle or connected mode) may monitor one or more POs in a system information modification period that may or may not be based on the WTRU ID.

In connected mode, a WTRU may receive pages related to a system information change, for example, and it may not receive WTRU-specific pages such as those that may be used for an incoming call. A WTRU in the connected mode may not monitor a specific PO (e.g., a PO that may be based on its WTRU ID). For frequency division duplexing (FDD), the PO subframes may include certain subframes, such as subframes 0, 4, 5, and 9. For time division duplexing (TDD), the PO subframes may include certain subframes, such as subframes 0, 1, 5, and 6.

A number of repetitions, such as of a preamble, a control channel, a PDSCH (e.g., an RAR PDSCH), a PUSCH, and/or a PUCCH may include the first transmission (or reception). A number of repetitions (e.g., other repetitions) may exclude the first transmission (or reception). Inclusion may be substituted for exclusion and vice versa and still be consistent with the examples disclosed herein. Downlink control channel, downlink control channel for MTC WTRU, (E)PDCCH (e.g., EPDCCH and/or PDCCH), PDCCH, and/or M-PDCCH may be used interchangeably. System information, system information for MTC WTRU, MTC-SIB, M-SIB, and/or SIB may be used interchangeably.

A random access (RA) procedure may be provided and/or used. An eNB or cell may support WTRUs with capabilities or limitations, such as coverage limited WTRUs and/or WTRUs with reduced capabilities, such as reduced bandwidth WTRUs. A WTRU may be coverage limited and/or reduced bandwidth. Reduced capabilities may or may also include reduced complexity, such as inclusion or use of (e.g., only of) a single receive antenna and/or receiver chain and/or support for a reduced transport block size.

PRACH resources may be partitioned such that resources (e.g., certain resources) which may be or include preambles and/or resources in time and/or frequency may be used by WTRUs such as coverage limited WTRUs and the use of the resources (e.g., certain resources) may indicate to an eNB that the WTRU using the resources may be coverage limited and/or the coverage limitation of the WTRU using the resources may be of a certain level.

An eNB, for example, one that may support a bandwidth (BW) larger than that of a reduced bandwidth WTRU and/or that may support reduced bandwidth WTRUs, may allocate PRACH resources that may be used by at least certain WTRUs, such as reduced bandwidth WTRUs. The allocated resources may be located in a bandwidth (e.g., number of RBs and/or band location such as a band center) in which a reduced bandwidth WTRU may or may be able to transmit. These resources may be the same as, separate from, or a subset of those which may be allocated for legacy or other WTRUs. The allocated resources may include preambles that may or may only be used by reduced bandwidth WTRUs.

PRACH resource allocation (e.g., for resources that may be used by at least certain WTRUs) may include the designation of one or more of preambles (e.g., certain preambles), times (e.g., subframes or certain subframes), and/or frequencies (e.g., RBs or certain RBs). PRACH resources (e.g., for use by at least certain WTRUs) may be differentiated (e.g., from resources that may not be used by the certain WTRUs) by at least one or more of preamble, time (e.g., subframe allocation), and/or frequency (e.g., RB allocation). Allocation and/or designation may be via signaling (e.g., by the eNB), such as dedicated or broadcast signaling and/or system information.

PRACH resource allocation and random access procedures may be provided for WTRUs that may be coverage limited and/or bandwidth limited. Some (e.g., all) of the PRACH resources that may be allocated, e.g., by an eNB, for coverage limited WTRUs may be or may always be located in a bandwidth that may be supported by bandwidth limited WTRUs. WTRUs that may be coverage limited and/or bandwidth limited may choose from and/or use one or more PRACH resources (e.g., from among the PRACH resources that may be allocated for coverage limited WTRUs and/or may be located in a bandwidth that may be supported by bandwidth limited WTRUs) for PRACH transmission to an eNB. PRACH resources that may be allocated or designated for each of one or more (e.g., all) levels of coverage limitation may include a subset (which may include the full set) that may be used by WTRUs that may be coverage limited and bandwidth limited.

An eNB may consider a coverage limited WTRU (e.g., a WTRU that the eNB may determine to be coverage limited) as a bandwidth limited WTRU as well, for example, until informed or determined otherwise. The eNB may determine the WTRU to be coverage limited based on the PRACH resource the WTRU may have used (e.g., transmitted) or the eNB may have received from the WTRU. The eNB may communicate with the WTRU accordingly.

An eNB that may receive a PRACH from a PRACH resource that may be designated or allocated for coverage limited WTRUs and that may be used by bandwidth limited WTRUs (e.g., by designation or by location in the supportable bandwidth of the WTRU) may consider the WTRU that may have transmitted the PRACH as a bandwidth limited WTRU, for example, until informed or determined otherwise. The eNB may communicate with the WTRU accordingly.

PRACH resources may be specifically allocated or designated for WTRUs that may be both coverage limited and bandwidth limited. WTRUs that may be both coverage limited and bandwidth limited may choose from and/or use these allocated or designated PRACH resources for PRACH transmission to an eNB. Separate PRACH resources (which may be differentiated, for example, by one or more of preamble, time, and/or frequency) may be allocated and/or used for different levels of coverage limitation. For example, one level of coverage limitation, e.g., the worst case level, may be used by WTRUs that may be both coverage limited and bandwidth limited.

An eNB that may receive a PRACH from a PRACH resource that may be designated or allocated for WTRUs that may be both coverage limited and bandwidth limited may consider the WTRU that may have transmitted the PRACH as both a coverage limited and bandwidth limited WTRU. Based on the PRACH resource, the eNB may also know the coverage limitation level. The eNB may communicate with the WTRU accordingly.

A random access response (RAR) may be provided and/or used. During a random access procedure with a WTRU, an eNB may not know if the WTRU is a reduced bandwidth WTRU, for example, until it may receive an indication or message from the WTRU, and may, for example, not know whether to respond to the WTRU in a reduced bandwidth.

An eNB may consider a WTRU that may have transmitted (or from which the eNB may have received) a PRACH in a certain bandwidth (e.g., a certain number of RBs and/or a certain location such as a center set of RBs, such as the center 6 RBs) to be a reduced bandwidth WTRU, for example, until it receives an indication that the WTRU is not a reduced bandwidth WTRU. The indication may be provided by the WTRU in a message (e.g., RRC message such as a RRC connection request or WTRU capabilities message, which may be from the WTRU).

When responding to PRACH from a WTRU such as one that may be or may be considered by an eNB to be a reduced bandwidth WTRU, the eNB may provide the random access response (RAR) in a way in which the WTRU may be able to receive it.

An eNB may, for example, until it knows or determines a WTRU is not a reduced bandwidth WTRU, limit transmissions intended for the WTRU to a maximum of a certain number R RBs (e.g., 6) and/or location, such as a set (e.g., a certain set) of R RBs (e.g., the center R RBs). The eNB may or may also limit an UL grant (e.g., the UL grant for msg3 of the RA procedure) size to a certain maximum number Y RBs (e.g., 6 RBs) and/or location such as a set (e.g., a certain set) of Y RBs (e.g., the center Y RBs). R may be equal to Y. The RB location(s) may be provided (e.g., by the eNB, in signaling such as broadcast signaling (e.g., in system information). This may apply (e.g., may only apply) for WTRUs that may or may be determined to be coverage limited (e.g., based on the PRACH resource used by the WTRU).

An eNB that may receive a PRACH from a PRACH resource that may be allocated or designated for or used by at least certain, e.g., bandwidth limited and/or coverage limited, WTRUs may do one or more of the following: provide RAR in a manner in which a WTRU, such as a bandwidth limited WTRU and/or a coverage limited WTRU, may receive the RAR, provide an UL grant for resources (e.g., for message 3 of the RA procedure) in the bandwidth in which a bandwidth limited WTRU may transmit, and/or provide or continue to provide DL grants and/or UL grants for a limited bandwidth WTRU until, for example, it may receive an indication (explicit or otherwise) that the WTRU may not be a limited bandwidth WTRU. The indication may be included in an RRC message such as an RRC connection request message or a WTRU capabilities message, which may be from the WTRU.

Providing RAR in a manner in which a WTRU, such as a bandwidth limited WTRU and/or a coverage limited WTRU, may receive the RAR may include using EPDCCH (or both EPDCCH and PDCCH) to send the control information (e.g., DCI format) that may indicate the location and/or parameters for the PDSCH that may carry the RAR. Providing RAR in a manner in which a WTRU, such as a bandwidth limited WTRU and/or a coverage limited WTRU, may receive the RAR may include transmitting the PDSCH that may carry RAR in the bandwidth (e.g., number of RBs and/or band location such as the center of the band) in which a limited bandwidth WTRU may receive it. Providing RAR in a manner in which a WTRU, such as a bandwidth limited WTRU and/or a coverage limited WTRU, may receive the RAR may include transmitting the RAR PDSCH in a fixed, known, or determined location and/or with one or more fixed, known, or determined parameters (e.g., transmission parameters such as MCS) such that a DCI format may not be required or used (e.g., for the RAR) by or for a WTRU, which may be a bandwidth limited WTRU or a coverage limited WTRU. The fixed, known, or determined location and/or parameters may be provided by the eNB in signaling, such as broadcast system information and/or may be a function of the PRACH or PRACH transmission to which the RAR may respond or may include a response.

A known location, parameter, or value may be determined by the WTRU and/or eNB. Known and determined may be used interchangeably.

Providing DL grants and/or UL grants for a limited bandwidth WTRU may include one or more of using EPDCCH (or both EPDCCH and PDCCH) to send the control information (e.g., DCI format) associated with the grant, transmitting the granted PDSCH in the bandwidth (e.g., number of RBs and/or band location such as the center of the band) in which a limited bandwidth WTRU may receive it, and/or granting UL resources in the bandwidth (e.g., number of RBs and/or band location such as the center of the band) in which a limited bandwidth WTRU may transmit.

The location and/or transmission parameters of an RAR that may be intended for a WTRU (or at least a WTRU) that may be bandwidth limited and/or coverage limited may be a function of one or more parameters of the PRACH (e.g., the PRACH resource) for which the RAR may provide or include a response. A location (e.g., of an RAR) may be or may include time (e.g., subframe) and/or frequency (e.g., one or more RBs). A PRACH or PRACH resource parameter may be or may include time (e.g., subframe or subframe set), frequency (e.g., one or more RBs), and/or preamble.

An RAR may be or may represent a certain instance or repetition of an RAR. Repetitions of an RAR that may be combined by a WTRU, such as a WTRU that may be coverage limited, may be in the same or different locations (e.g., subframes may be different and RBs may be the same or different) and/or may use the same or different parameters.

A WTRU, such as a bandwidth limited and/or coverage limited WTRU, may transmit a PRACH, e.g., to an eNB. The WTRU and/or the eNB may determine the location of an RAR that may be intended for the WTRU (or at least the WTRU), for example, in response to the PRACH transmission of the WTRU, based on one or more parameters of the PRACH (e.g., the PRACH resource). For example, the RB or RBs in which a WTRU may transmit a PRACH may determine (or may be used by the WTRU and/or eNB to determine) the RB or RBs for the RAR that may correspond to the PRACH. The eNB may transmit and/or the WTRU may receive or attempt to receive the RAR in the determined location. Determination by the WTRU may be based on at least configuration, e.g., of the relationship or correspondence between RAR location and/or parameters and PRACH parameters and/or PRACH resources, which may be provided by the eNB via signaling, such as broadcast signaling or in system information, which may be broadcast.

A location (e.g., which may be fixed or known) and/or one or more transmission parameters (e.g., which may be fixed or known) of an RAR that may be intended for a WTRU (or at least a WTRU), such as a WTRU that may be bandwidth limited and/or coverage limited, may be a function of a capability (or reduced capability) of the WTRU. For example, RAR location and/or one or more RAR transmission parameters may be a function of at least one of CE mode, CE level, and/or bandwidth limitation. The capability (or reduced capability) of the WTRU, such as the CE mode and/or CE level, and/or bandwidth limitation of the WTRU, may determine (or may be used by the WTRU and/or eNB to determine) the location (e.g., subframes and/or RBs) and/or one or more transmission parameters (e.g., MCS) for the RAR that may correspond to the PRACH. The eNB may transmit and/or the WTRU may receive or attempt to receive the RAR in the determined location. Determination by the WTRU may be based on at least configuration (e.g., of RAR location and/or parameters) for one or more capabilities (or reduced capabilities, such as CE mode or level) that may be provided by the eNB via signaling such as broadcast signaling.

Figure 2:
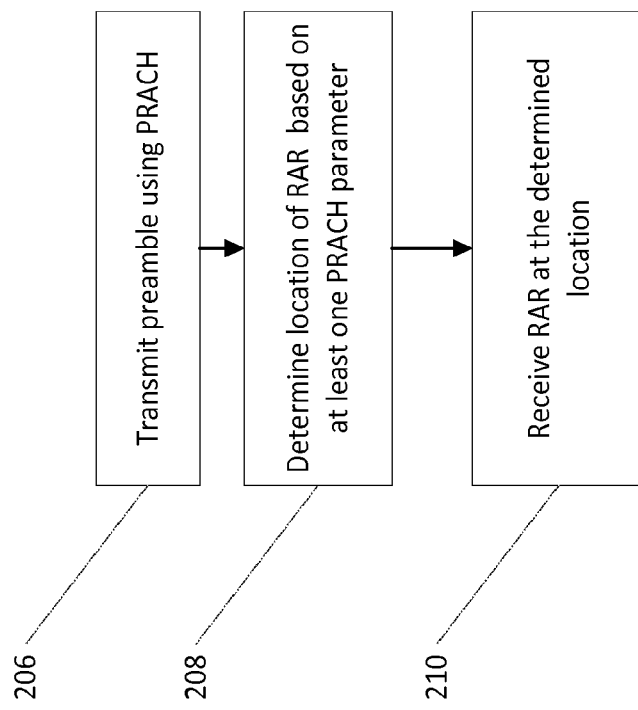
FIG. 2 illustrates an example of preamble transmission and RAR reception by a WTRU.

FIG. 2 illustrates an example of preamble transmission and RAR reception by a WTRU. The WTRU may transmit a preamble on or using a PRACH at 206. The WTRU may determine the location of the RAR based on at least one parameter of the PRACH at 208. The location of the RAR may comprise at least one of a subframe or a frequency resource on which the RAR may be or will be transmitted. A PRACH parameter may comprise at least one of a subframe, a frequency resource, e.g., on which the preamble is transmitted, or the preamble. The WTRU may receive or may attempt to receive the RAR at the determined location at 210. The WTRU may transmit the preamble with repetitions, for example, when the WTRU is in CE mode, using CE, and/or using a CE level. The WTRU may receive and combine repetitions of an RAR to successfully receive and/or decode the RAR, for example, when the WTRU is in CE mode, using CE, and/or using a CE level. The location of the RAR repetitions may be determined based on the at least one parameter of the PRACH and/or one or more other PRACH parameters. The association or correspondence between the one or more PRACH parameters and the RAR location (or locations, for example for repetitions) may be provided to and/or received by the WTRU via a configuration, e.g., a random access (RA) configuration. The configuration may be provided and/or received in system information, which may be broadcast.

FIG. 3A illustrates another example of preamble transmission and RAR reception by a WTRU. The WTRU receives an RA configuration at 302. The WTRU determines one or more PRACH parameters based on the RA configuration at 304. The WTRU transmits a preamble on or using a PRACH at 306. The WTRU determines the location of the RAR based on at least one parameter of the PRACH at 308. The location of the RAR may comprise at least one of a subframe or a frequency resource on which the RAR may be or will be transmitted. A PRACH parameter may comprise at least one of a subframe, a frequency resource, e.g., on which the preamble is transmitted, or the preamble. The WTRU may receive or may attempt to receive the RAR at the determined location at 310. The WTRU may transmit the preamble with repetitions, for example, when the WTRU is in CE mode, using CE, and/or using a CE level. The WTRU may receive and combine repetitions of an RAR to successfully receive and/or decode the RAR, for example, when the WTRU is in CE mode, using CE, and/or using a CE level. The location of the RAR repetitions may be determined based on the at least one parameter of the PRACH and/or one or more other PRACH parameters. The RA configuration may provide the WTRU with the association or correspondence between the one or more PRACH parameters and the RAR location (or locations, for example, for repetitions).

FIG. 3B illustrates an example RA configuration that includes one or more PRACH parameters 314 and one or more RAR locations 316. The RA configuration may provide the association or correspondence between one or more PRACH parameters and an RAR location or locations, for example for repetitions. The PRACH parameters and/or RAR locations may be associated with CE levels.

Figures 4A, 4B:
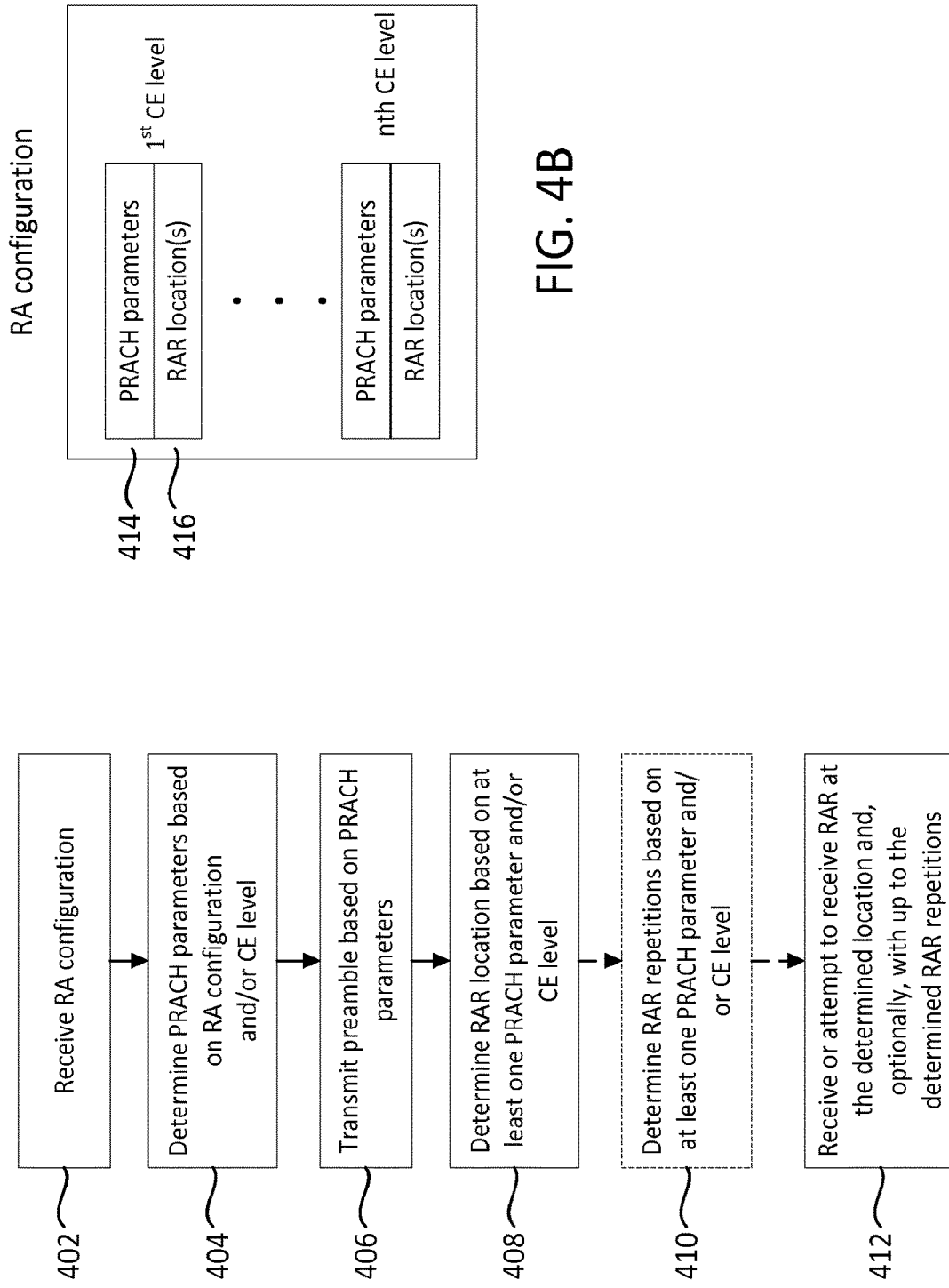
FIG. 4A illustrates an example of preamble transmission and RAR reception by a WTRU.
FIG. 4B illustrates an example RA configuration.

FIG. 4A illustrates an example of preamble transmission and RAR reception by a WTRU. The WTRU may receive an RA configuration at 402. The WTRU may determine PRACH parameters based on the RA configuration and/or CE level at 404. For example, the RA configuration may include one or more PRACH parameters or sets of PRACH parameters that may be associated with one or more CE levels. PRACH parameters may include one or more preambles and/or one or more PRACH time and/or frequency resources. The WTRU may determine a preamble, e.g., select a preamble from a set of one or more preambles. The WTRU may determine a subframe or set of subframes (e.g., for repetition) from the one or more time resources. The WTRU may determine a frequency resource such as one or more (e.g., a set of) PRBs from the one or more frequency resources. The CE level may be determined by the WTRU, for example, based on a measurement. The CE level may be determined by the WTRU according to a starting CE level and a number of prior failed random access attempts. For a WTRU that may be using a reduced BW but may not be in or using a CE mode, CE level may not be included in the determination of PRACH parameters at 404.

The WTRU may transmit a preamble based on the PRACH parameters at 406. For example, the WTRU may transmit the determined preamble on or using the determined PRACH. The WTRU may transmit the determined preamble in the determined subframe or set of subframes in the determined frequency resource (or frequency resources, e.g., if frequency hopping is used for one or more repetitions).

The WTRU may determine the RAR location based on at least one PRACH parameter and/or CE level at 408. The RAR location may comprise at least one of a subframe and/or a frequency resource on which the RAR may be transmitted. For RAR with repetition, the location may comprise multiple (e.g., a set of) subframes. For RAR with repetition, the location may comprise multiple (e.g., a set of) frequency locations, e.g., if frequency hopping is used.

The WTRU may determine the number of repetitions with which the RAR will be transmitted based on at least one PRACH parameter and/or CE level at 410. For some WTRUs, e.g., a WTRU that may be using a reduced BW but may not be in or using a CE mode, this determination may not be made.

The WTRU may receive or may attempt to receive an RAR at the determined location and, optionally, with up to the determined number of repetitions at 412. The WTRU may receive a repetition of an RAR at one or more determined locations and may combine the repetitions to successfully receive and decode the RAR. The WTRU may receive and combine up to the determined number of repetitions at 412.

If the WTRU successfully receives an RAR within an RA response window, the WTRU may transmit a success message on resources which may be allocated or granted by the RAR. The success message may be a random access msg3 or another message. If the WTRU does not successfully receive an RAR within an RA response window, the WTRU may stop or may try again depending on the random access procedure and the number of attempts already made, e.g., at one or more CE levels.

FIG. 4B illustrates another example RA configuration that includes one or more PRACH parameters 414 and one or more RAR locations 416. The RA configuration may provide the WTRU with the association or correspondence between one or more PRACH parameters and an RAR location or locations, for example for repetitions. The PRACH parameters and/or RAR locations may be associated with CE levels.

FIG. 5 illustrates an example of preamble reception and RAR transmission, for example by an eNB or cell. A preamble may be received on or using a PRACH associated with a CE level at 506. The location of the RAR and/or the number RAR repetitions may be determined based on at least one parameter of the PRACH at 508. The location of the RAR may comprise at least one of a subframe or a frequency resource on which the RAR may be or will be transmitted. A PRACH parameter may comprise at least one of a subframe, a frequency resource, e.g., on which the preamble is transmitted or received, or the preamble. The RAR may be transmitted at the determined location and/or with the determined repetitions at 510.

RAR location may be used to represent the location of a PDSCH that may carry a (or at least one) RAR. RAR location may be used to represent the location of a control channel or control information, e.g., one or more of a PDCCH, EPDCCH, M-PDCCH, a DCI, or a DCI format, that may include or carry a (or at least one) RAR or may indicate or be associated with a PDSCH that may carry a (or at least one) RAR.

RAR may be used to represent a PDSCH that may carry an RAR (or at least one RAR). RAR may be used to represent a control channel or control information, e.g., one or more of a PDCCH, EPDCCH, M-PDCCH, a DCI, or a DCI format, that may include or carry a (or at least one) RAR or may indicate or be associated with a PDSCH that may carry a (or at least one) RAR.

At least one RAR transport block size (TBS) may be configured or fixed and may correspond to a number (e.g., a certain number) of RA responses (e.g., to a number or certain number of preambles). Padding may be used, for example, when the number of responses (e.g., actual responses) may be less than the number (e.g., the certain number) of RA responses or preambles to which the RAR TBS that may be configured or fixed may apply. TBS configuration may be by signaling, such as broadcast signaling, which may be from the eNB. There may be a separate RAR TBS value (e.g., fixed or configured) for one or more CE levels. There may be at least one RAR TBS value for RAR that may be intended for (e.g., at least for) a coverage limited and/or bandwidth limited WTRU. A WTRU, such as a WTRU that may be coverage limited and/or bandwidth limited, may receive or may expect to receive an RAR with a fixed or configured TBS. An eNB may transmit an RAR that may be intended for (e.g., at least for) a WTRU that may be coverage limited and/or bandwidth limited with a fixed or configured TBS.

There may be N CE levels and/or there may be PRACH resources (e.g., separate PRACH resources) for one or more (e.g., each) of the N CE levels. A WTRU that may transmit PRACH using the resources that may correspond to a certain CE level may receive or may expect to receive an RAR in time and/or frequency resources (e.g., subframes and/or RBs) that may correspond to the CE level of the WTRU and/or the PRACH resources used by the WTRU. An eNB may transmit an RAR in time and/or frequency resources (e.g., subframes and/or RBs) that may correspond to the resources in which the eNB may have received the PRACH that may correspond to a certain CE level. RAR for different CE levels may be in different frequency resources that may be in the same or different subframes.

A set of RAR transport block (TB) sizes (e.g., possible or candidate TB sizes) may be fixed or configured (e.g., by the eNB) and/or determined (e.g., by the WTRU). A WTRU may try one or more of the TB sizes in the set to try to successfully receive the RAR, for example, when monitoring for and/or attempting to receive RAR.

A set of RAR candidates may be fixed or configured (e.g., by the eNB) and/or determined (e.g., by the WTRU). The RAR candidates may differ in one or more characteristics, which may include time (e.g., subframe), frequency (e.g., RBs), TBS, and/or one or more transmission parameters, such as MCS. A WTRU may try one or more of the RAR candidates to try to successfully receive the RAR, for example, when monitoring for and/or attempting to receive RAR.

An eNB, for example, one that may be unsure if a WTRU from which it may have received a PRACH transmission may be a limited bandwidth WTRU, may transmit RAR in a way in which a limited bandwidth WTRU may receive it and in a way in which a full bandwidth WTRU may receive it.

The eNB may transmit a PDSCH (which may be repeated in the case of coverage enhancement) that may carry a RAR that may be intended for (e.g., at least) the WTRU. The eNB may transmit the DCI format for the PDSCH that may carry RAR in both PDCCH and EPDCCH. The PDCCH may indicate the location and/or parameters of the PDSCH to be the same as the location and/or parameters indicated by the EPDCCH. The PDSCH may be located in a bandwidth that may be received by a limited bandwidth WTRU. If a DCI format may not be needed for the RAR PDSCH (e.g., for a coverage limited and/or limited bandwidth WTRU), then the EPDCCH may not be transmitted. The PDCCH may indicate the location and/or parameters of the PDSCH to be the same as the configured or otherwise known or determined location and/or parameters. The PDSCH may provide a grant for UL resources in a bandwidth that a limited bandwidth WTRU may support.

The eNB may transmit two PDSCH (one or more of which may be repeated in the case of coverage enhancement), e.g., in the same subframe. A PDSCH (e.g., each of the two and/or the repetitions of the two) may carry a RAR that may be intended for (e.g., at least for) the WTRU.

The eNB may transmit a DCI format for a first PDSCH in a PDCCH. The eNB may transmit a DCI format for a second PDSCH in an EPDCCH. The transmissions may be in the same subframe. The location of the first PDSCH may not be limited to a bandwidth that may be supported by a limited bandwidth WTRU. The location of the second PDSCH may be in (or limited to) a bandwidth that may be supported by a limited bandwidth WTRU. The eNB may not transmit a DCI format for the second PDSCH. The location and/or parameters for the second PDSCH may be configured (e.g., by signaling from the eNB such as broadcast signaling and/or system information) and/or known or determined. One or more (e.g., each) PDSCH may carry an RAR that may be intended for (e.g., at least for) the WTRU from which it may have received the PRACH transmission.

The eNB may provide two UL grants (e.g., each for a PUSCH transmission) that may be for WTRU transmission of a PUSCH which may carry RA procedure message 3. The two UL grants may be for resources in the same subframe. At least one UL grant may be for resources that a limited bandwidth WTRU may support (e.g., be able to transmit in). The first and/or second (e.g., at least the second) PDSCH may include an UL grant for resources which a limited bandwidth WTRU may support.

A full bandwidth WTRU (e.g., that may have transmitted the PRACH that may have resulted in the eNB sending the RAR) may receive and/or decode the DCI format in the PDCCH and may receive the first PDSCH (e.g., based on a DL grant in the PDCCH). The full bandwidth WTRU may transmit a PUSCH that may carry message 3 in UL resources granted by the first PDSCH. A limited bandwidth WTRU (e.g., that may have transmitted the PRACH that may have resulted in the eNB sending the RAR) may receive and/or decode the DCI format in the EPDCCH and/or may receive the second PDSCH (e.g., based on a DL grant in the EPDCCH or based on a known or determined location and/or known or determined parameters). The limited bandwidth WTRU may transmit message 3 in a PUSCH in UL resources granted by the second PDSCH.

The eNB may determine whether the WTRU may be a limited bandwidth WTRU based on the PUSCH in which the WTRU may transmit and/or the eNB may receive message 3 (e.g., from the WTRU that may have been granted the UL resources).

One or more of a PRACH, PDCCH, EPDCCH, PDSCH, and/or PUSCH may be repeated, e.g., in multiple subframes, for example, when coverage enhancement techniques may be used. Transmitting and/or receiving one of these channels may be replaced by transmitting or receiving one or more repetitions of the channel (e.g., where the first instance of the channel may be considered a repetition of the channel) and still be consistent with this disclosure. For a WTRU or eNB to successfully receive a channel, one or more of the repetitions, which may include a first instance and one or more subsequent repetitions, may be combined.

An RAR may include an indication of a subframe (e.g., a starting or ending subframe) and/or frequency (e.g., RB or starting RB) of the PRACH transmission to which the RAR may correspond.

A WTRU may inform an eNB whether or not it is a limited bandwidth WTRU via a message, which may be, for example, an RRC message, such as an RRC connection request message or a WTRU capabilities message.

Non-receipt of an indication that a WTRU is a limited bandwidth WTRU in a message that may include such an indication (such as a RRC connection request or capabilities message) may be considered the same as receipt of an indication that the WTRU is not a reduced bandwidth WTRU. For example, if the eNB receives a message that may include a reduced bandwidth indication from a WTRU and a limited bandwidth indication is not included, the eNB may consider the WTRU to be a full bandwidth WTRU (e.g., not a limited bandwidth WTRU).

The eNB may determine the bandwidth capability (e.g., limited or non-limited) of a WTRU based on whether or not the eNB receives a limited bandwidth indication.

A RA response and/or RA-RNTI may be provided and/or used. After a WTRU may transmit a RA preamble, e.g., regardless of a possible occurrence of a measurement gap, the WTRU may monitor a PDCCH, e.g., of a serving cell such as the PCell, for random access response(s) (RARs) that may be identified by an RA-RNTI and that may arrive in an RA response window. The RA response window may start at a certain subframe, such as the subframe that may include the end of the preamble transmission plus a number of additional subframes, e.g., three additional subframes. The RA response window may have a length in subframes, such as ra-ResponseWindowSize subframes, which may be configured or provided (e.g., by the eNB) via signaling such as broadcast (e.g., system information) signaling.

The RA-RNTI associated with the PRACH in which a preamble may be transmitted, may be computed, for example, as:

$$RA\text{-}RNTI = 1 + t\_id + 10 * f\_id$$

where t_id may be the index of the first subframe of the PRACH (e.g., $0 \leq t\_id < 10$), and/or f_id may be the index of the PRACH within that subframe, e.g., in ascending order of frequency domain (e.g., $0 \leq f\_id < 6$). The WTRU may stop monitoring for RARs after successful reception of a RAR that may include a RA preamble identifier that may match the transmitted RA preamble.

For a coverage limited WTRU, preambles and/or RAR may be repeated. RA-RNTI for coverage limited WTRUs may collide with those for non-coverage limited WTRUs, and the RA response window definition may be insufficient for coverage limited WTRUs.

An eNB may transmit RAR in a coverage enhanced manner, for example when transmitting RAR to a UE which may be coverage limited. A WTRU, such as a coverage limited WTRU, may receive RAR in a coverage enhanced manner. Transmission and/or reception in a coverage enhanced manner may include at least one or more of the following, and/or a WTRU and/or eNB may perform transmission and/or reception in a coverage enhanced manner in accordance with at least one or more of the following.

Transmission and/or reception in a coverage enhanced manner may include transmission of repetitions of RAR, which may include repetitions of a PDSCH that may carry RAR and/or repetitions of the associated PDCCH and/or EPDCCH.

Transmission and/or reception in a coverage enhanced manner may include reception and/or combining of repetitions of RAR, which may include reception and/or combining repetitions of a PDSCH that may carry RAR and/or reception and/or combining repetitions of the associated PDCCH and/or EPDCCH.

Transmission and/or reception in a coverage enhanced manner may include use of a modified and/or extended RA response window (e.g., with respect to the RA response window that may be used by or for a non-coverage limited WTRU or WTRUs that may not be in coverage enhanced (CE) mode).

Transmission and/or reception in a coverage enhanced manner may include transmission of an RNTI for the RAR PDCCH or EPDCCH, e.g., CE-RA-RNTI, which may be specific to coverage limited WTRUs, for example, of a certain coverage enhancement level.

Transmission and/or reception in a coverage enhanced manner may include monitoring and/or reception of an RNTI for the RAR PDCCH or EPDCCH, e.g., CE-RA-RNTI, which may be specific to coverage limited WTRUs, for example, of a certain coverage enhancement level.

RA-RNTI or a new RNTI may be used for PDCCH and/or EPDCCH associated with PDSCH that may carry RAR, for example, for RAR intended for (e.g., at least for) a WTRU that may be coverage limited and/or bandwidth limited.

PDCCH and/or EPDCCH associated with PDSCH that may carry RAR may be located in a common search space (e.g., PDCCH common search space and/or EPDCCH common search space), for example, for RAR intended for (e.g., at least for) a WTRU that may be coverage limited and/or bandwidth limited.

The eNB may transmit RAR in a coverage enhanced manner, for example, when responding to receipt of a PRACH preamble that may have been transmitted by a coverage limited WTRU and/or that may be considered or determined by the eNB to have been transmitted by a coverage limited WTRU.

The RA response window may start at a subframe, such as the subframe that may be or include the end of the preamble transmission (which may be the subframe of the last repetition of the preamble) plus a number of subframes (e.g., three subframes). The start and/or length of the RA response window may be a function of at least one or more of the number of repetitions (or CE level) of the preamble (or PRACH transmission); the number of repetitions or expected repetitions of the RAR; the number of repetitions of the PDCCH and/or EPDCCH that may carry the control information for the RAR and/or that may use RA-RNTI (or CE-RA-RANTI); the gap (e.g., in subframes) that may be between the last RA-RNTI (or CE-RA-RANTI) PDCCH (or EPDCCH) for the RAR and the first RAR; the ra-ResponseWindowSize; a value, e.g., ce-ra-ResponseWindowSize, which may be a fixed value or a configured value (e.g., by eNB signaling such as broadcast and/or system information signaling); a window offset value, which may be a fixed value or a configured value (e.g., by eNB signaling such as broadcast and/or system information signaling); and/or the subframe allocation for the repetitions of the RAR.

The repetitions and/or expected repetitions of the preamble and/or associated PDCCH (or EPDCCH) and/or RAR may be based on the CE mode and/or level of the WTRU which may be indicated by the WTRU and/or understood by the eNB from the PRACH resource used by the WTRU for the random access. The gap may be a fixed value or a configured value (e.g., by eNB signaling such as broadcast and/or system information signaling).

For example, if the WTRU may transmit the preamble Nrep times, the length of the window may be Nrep (or a multiple or Nrep such as 2) plus a fixed or configured (e.g., by eNB signaling such as broadcast and/or system information signaling) value such as To-ResponseWindowSize or a value, e.g., ce-ra-ResponseWindowSize, subframes. An offset may be added. For example, a CE response window size may be 2×Nrep+ra-ResponseWindowSize+window offset.

If the number of times that the RAR may be (or may be expected to be) transmitted is Mrep, the length of the window may be Mrep (or a multiple of Mrep such as 2) plus a fixed or configured value such as ra-ResponseWindowSize or a value, e.g., ce-ra-ResponseWindowSize, subframes. An offset may be added. For example, a CE response window size may be 2×Mrep+ra-ResponseWindowSize+window offset. The window offset may be a gap of time in subframes between the last of the repetitions of the control channel that may indicate the grant for the RAR PDSCH and the first repetition (e.g., first transmission) of the RAR PDSCH. If the number of repetitions of the control channel may be Crep and the number of repetitions of the RAR may be Rrep, the response window size may be a function of both and may be a function of the size of the gap between them, if any. For example, a CE response window size may be Crep+Rrep+ra-ResponseWindowSize+window offset. ra-ResponseWindowSize may be replaced by ce-ra-ResponseWindowSize or another parameter or value. The window offset may be 0 or a positive integer.

A subframe allocation for the repetitions of the RAR may be provided or configured by the eNB, for example, by signaling such as broadcast signaling. The subframe allocation may indicate in which subframes an RAR or a certain RAR may be transmitted and/or expected. For example, an RAR that may correspond to a certain CE mode, CE level, BW limitation, or PRACH resource may be transmitted or may only be transmitted in certain subframes. The subframes (e.g., the certain subframes) may be indicated by at least one or more of a periodicity, an indication of the SFNs to which the periodicity may correspond (e.g., x may be designated and periodicity may correspond to SFN mod x=0), and/or an offset (e.g., from the start of the period). The response window start and/or length may be a function of the subframe allocation. For example, if the subframe allocation may have a periodicity of 4 subframes, the response window may be on the order of 4 times longer than if it may have a periodicity of 1 subframe.

The response window size, for example for TDD, may be a function of the number of DL (or non-UL) subframes in each frame, which may be based on the TDD UL/DL configuration that may be broadcast in a system information block (SIB, e.g., SIB1) of the cell. When counting or considering subframes for RAR, for example for TDD, subframes may (or may only) refer to subframes in which RAR may be transmitted (e.g., DL and/or non-UL subframes).

If some subframes may not include RAR (e.g., UL subframes, some special subframes, and/or subframes that may include PBCH), then when counting or considering subframes for the RAR window, those subframes may be excluded from the count or consideration and the window may be longer in time than the count. For example, if the RAR response window may be 100 subframes, and 2 out of each 10 subframes in a frame may be excluded, the response window may use a span of 100/0.8=125 actual subframes for 100 counted subframes.

The length of the window may be or may be based on a new configured (e.g., by eNB signaling such as broadcast and/or system information signaling) value, e.g., ce-ra-ResponseWindowSize subframes, which may be a function of the CE level and which may take into account the repetitions of the RAR for the CE level.

The WTRU may monitor a control channel (e.g., PDCCH and/or EPDCCH) for RA-RNTI and/or CE-RA-RNTI, for example, following transmission of the preamble repetitions that may be for the (e.g., the current) coverage enhancement level of the WTRU. The WTRU may receive PDSCH carrying RAR. The WTRU may perform the monitoring in the response window. The WTRU may combine Crep repetitions (e.g., a moving window of Crep repetitions) of the control channel until it may successfully receive the control channel. The WTRU may combine Rrep or up to Rrep (e.g., a moving window of Rrep or up to Rrep repetitions of the RAR), for example, until it may successfully receive the RAR. A WTRU may or may only monitor a control channel for RA-RNTI and/or CE-RA-RNTI in subframes that may correspond to a subframe allocation that may correspond to a characteristic of the WTRU and/or the PRACH resource that the WTRU may have used for transmission. A WTRU characteristic may include one or more of CE mode, CE level, and/or bandwidth limitation.

The WTRU may monitor for (e.g., receive or attempt to receive) PDSCH that may carry RAR in a fixed, known, and/or determined location, for example, following transmission of the preamble repetitions that may be for the current coverage enhancement level of the WTRU. The WTRU may perform the monitoring in the response window. The WTRU may combine Rrep or up to Rrep repetitions (e.g., a moving window of Rrep or up to Rrep repetitions of the RAR), for example, until the WTRU may successfully receive an RAR that may include indication of the preamble that the WTRU may have transmitted.

A WTRU may or may only monitor the PDSCH that may carry RAR in subframes that may correspond to a subframe allocation that may correspond to a characteristic of the WTRU and/or the PRACH resource that the WTRU may have used for transmission.

A WTRU that may be both coverage limited and bandwidth limited may act at least in accordance with one or more examples disclosed herein for a coverage limited WTRU. For example, a WTRU, such as one that may be both coverage limited and bandwidth limited, may monitor a control channel for CE-RA-RNTI, transmit repeated preambles, combine repetitions of a control channel and/or PDSCH, transmit repeated PUSCH and/or PUCCH, and/or the like.

The RA-RNTI that may be used for RAR, e.g., CE-RA-RNTI, which may be intended for (e.g., at least for) a coverage limited WTRU, may be determined the same as for legacy WTRUs or may be different or offset from that calculation.

CE-RA-RNTI may be the same as or different from RA-RNTI. There may be a different CE-RA-RNTI or set of CE-RA-RNTIs for one or more CE levels (e.g., each CE level) that may be supported by an eNB. A CE-RA-RNTI that may be intended (e.g., at least intended) for or monitored for or expected by a certain WTRU may be a function of, for example, one or more of a CE mode (e.g., the CE mode of the WTRU); a CE level (e.g., the CE level of the WTRU); the first or last subframe (e.g., the index of that subframe within a frame) of the preamble transmission (e.g., of the WTRU); the SFN of the frame of the first or last subframe of the preamble transmission (e.g., of the WTRU); the number of repetitions of the preamble (e.g., by the WTRU or that may correspond to the CE mode or CE level of the WTRU); the frequency resource or the index of the frequency resource (e.g., of the set of frequency resources that may be used by certain WTRUs, such as coverage limited WTRUs) of the PRACH or preamble transmission (e.g., of the WTRU); and/or the set of RA-RNTIs.

For example, the first CE-RA-RNTI may be the first RNTI available after the last RA-RNTI. The first CE-RA-RNTI, e.g., CE-RA-RNTI1, may be (11+10*f_id max), where f_id max may be the highest index PRACH in a subframe, e.g., for legacy WTRUs. For example, for FDD, there may be one (e.g., one legacy) PRACH in a subframe, so f_id max may be 0. For TDD there may be up to six (e.g., six legacy) PRACH configured by the eNB (e.g., with indices 0-5), so f_id max may be the number of PRACH configured minus 1.

A CE-RA-RNTI may be a function of the first CE-RA-RNTI, CE-RA-RNTI1, and the first subframe of the preamble transmission or the first PRACH transmission, e.g., t_id where t_id may be an integer from 0 through 9. For example, CE-RA-RNTI may be CE-RA-RNTI1+t_id.

CE-RA-RNTI may be CElevel×CE-RA-RNTI1+t_id, where CElevel may be a value that may correspond to the coverage enhancement level (e.g., a value of 0, 1, or 2 if there may be three coverage enhancement levels) of the WTRU for which the RAR may be intended. No coverage enhancement may or may not be considered a coverage enhancement level.

CE-RA-RNTI may be CElevel×(1+t_id+10*f_id).

A DCI format may not be used for RAR. The PDSCH that may carry the RAR may indicate to the WTRU (e.g., in the contents and/or one or more headers of the PDSCH) whether or not the RAR may include a response that may be intended (e.g., at least intended) for the WTRU, for example, without the need for the WTRU to look for the preamble that it transmitted in the RAR.

The CRC of the PDSCH that may carry RAR may be scrambled with an RA-RNTI or CE-RA-RNTI or other indication that may correspond to the PRACH that may have been transmitted by a WTRU. The WTRU may discard PDSCH that may carry RAR if the RA-RNTI or CE-RA-RNTI or other indication with which its CRC may be scrambled may not match the one that may correspond to the PRACH transmission of the WTRU. The indication may be a function of one or more of the items described herein of which a CE-RA-RNTI may be a function.

An RAR may include an indication, such as an RA-RNTI or CE-RA-RNTI, that may assist the WTRU in determining if the RAR may include a response that may be intended for (e.g., at least intended for) it. For example, the indication may be included in a fixed location in the RAR, such as in the MAC header or at the beginning of the RAR. The indication may be a function of one or more of the items described herein of which a CE-RA-RNTI may be a function.

The WTRU may use the indication to determine if an RAR may be intended (e.g., at least intended) for it. If the WTRU may determine that the RAR may be intended (e.g., at least intended) for it, the WTRU may look for an indication of the preamble that it may have transmitted in the RAR to find the response that may be intended for (e.g., at least intended for) it. If the WTRU may determine that the RAR may not be intended for (e.g., at least intended for) it, the WTRU may discard the RAR and/or may continue to look for an RAR that may include a response that may be intended for (e.g., at least intended for) it.

A WTRU may monitor for PDSCH that may carry RAR that may be intended for (e.g., at least intended for) the WTRU in a location and/or with one or more parameters that may be known or determined by the WTRU, for example, in accordance with one or more examples disclosed herein. If the WTRU may successfully receive and/or decode the PDSCH, the WTRU may determine whether (or that) the PDSCH may include an RAR and/or whether (or that) the PDSCH may include an RAR that may be intended for (e.g., at least intended for) the WTRU and/or that may include a response (e.g., at least a response) for the WTRU. The WTRU may make the determination based on at least one or more of: whether the RAR may include the preamble or an indication of the preamble that the WTRU may have transmitted; whether the RAR may include a certain RA-RNTI or CE-RNTI or other indication that may indicate that the RAR may be intended for (or at least intended for) the WTRU. The WTRU may determine that the RAR may be intended for (or at least intended for) the WTRU if the RAR may include the preamble or an indication of the preamble that the WTRU may have transmitted, and/or if the RAR may include a certain RA-RNTI or CE-RNTI or other indication that may indicate that the RAR may be intended for (or at least intended for) the WTRU.

PRACH subframes may be provided and/or used. For coverage limited WTRUs, the WTRU may repeat the transmission of a preamble a number of times, such as 50 or 100. Given a set of PRACH resources in a (e.g., each) subframe and the large number of repetitions, some rules for preamble selection may result in more collisions with, for example, preamble transmissions of other WTRUs, such as coverage limited or non-coverage limited WTRUs.

PRACH resources may be defined, for example, in a set of frames such as every frame or every other frame. Certain subframes in those frames may be designated as subframes for PRACH resources. A WTRU may transmit a PRACH preamble and/or may choose a PRACH preamble for transmission in a PRACH subframe.

A WTRU (e.g., a coverage limited WTRU) may choose a preamble and a PRACH frequency resource, e.g., from a set or pool of such preambles and frequency resources, in one subframe and may repeat that transmission in multiple subframes. If another WTRU may choose a preamble and PRACH frequency resource (e.g., from the same set or pool) in one or more of the subframes in which the first WTRU may transmit its chosen preamble and frequency resource, the opportunities for collision may be increased by the number of repetitions.

The frames and/or subframes in which PRACH preamble transmission may start (e.g., in which a WTRU may begin PRACH preamble transmission or send a first PRACH preamble transmission before repetitions) may be a reduced set (e.g., a subset) of frames and/or subframes from the full set of frames and/or subframes in which PRACH preambles may be transmitted.

One or more frames and/or subframes may be designated, allocated, configured (e.g., by an eNB such as by signaling, which may be dedicated or broadcast and/or system information signaling), and/or used as PRACH starting frames and/or subframes.

One or more PRACH starting frames and/or subframes may be defined, specified, configured (e.g., by an eNB, such as by signaling, such as broadcast signaling and/or system information).

A starting frame and/or subframe may be a function of a system frame number (SFN).

A starting frame and/or subframe may be a function of at least one of a PRACH configuration index that may determine or identify one or more of the SFNs (e.g., even or any) in which there may be PRACH resources (e.g., PRACH SFNs), the subframes in each of the PRACH SFNs in which there may be PRACH resources, and/or the preamble format that may be used for transmission.

A starting frame and/or subframe may be a function of a CE level. A starting frame and/or subframe may be a function of the number of repetitions of the preamble, which may be a function of the CE level. A starting frame and/or subframe may be a function of a configured value (e.g., signaled from the eNB), such as an offset, e.g., a frame offset or subframe offset.

A starting frame and/or subframe may be a function of a FDD or TDD mode of operation and/or a TDD UL/DL configuration.

A PRACH starting frame may be a frame (e.g., the first frame) in which a WTRU, such as a coverage limited WTRU, may transmit a certain PRACH preamble (or the first part of a certain PRACH preamble). The certain preamble may be the first preamble of a set of repeated preambles that the WTRU may transmit.

A PRACH starting subframe may be a subframe (e.g., the first subframe) in which a WTRU such as a coverage limited WTRU, may transmit a PRACH preamble (or the first part of a PRACH preamble). The preamble may be the first preamble of a set of repeated preambles that the WTRU may transmit. A PRACH starting subframe may be in a PRACH starting frame. A PRACH starting subframe may be (or may be identified by) an offset (e.g., in subframes) from the start (e.g., subframe 0) of a PRACH starting frame.

For example, if a WTRU may (or may only) transmit a preamble beginning in subframe X1 and repeat that preamble in (or beginning in) subframes X2, X3, X4, . . . Xn, then X1 may be the PRACH starting subframe.

A WTRU, such as a coverage limited WTRU, may or may only transmit a preamble beginning in a starting PRACH subframe. The WTRU may repeat the preamble N times in (or beginning in) each of a certain N subframes which may be one or more of the next N subframes; the next N subframes that may be available or usable for PRACH transmission (e.g., by the WTRU); the next N PRACH subframes; a designated, allocated, or configured set of N (e.g., next N) subframes or PRACH subframes that may be based on the PRACH starting frame and/or subframe; and/or the same subframe as the starting subframe in one or more (e.g., each) of the next N frames that may include PRACH resources.

PRACH subframes for CE mode may be the same or different from PRACH subframes for non CE mode use.

A WTRU that may transmit a preamble beginning in a certain starting PRACH frame and/or subframe, may repeat the preamble N times in (or beginning in) each of a certain N subframes, which may be the next N subframes or PRACH subframes that may be allocated, designated, or configured for the repetitions of a preamble that may have first been transmitted in the certain PRACH starting frame and/or subframe.

A WTRU, such as a coverage limited WTRU, may or may only select a PRACH resource from available PRACH resources (e.g., preamble and/or frequency) in or for transmission in a PRACH starting frame and/or subframe. A frequency resource may be comprised of one or more RBs or PRBs. The WTRU may use the same resource (e.g., preamble and/or frequency) for one or more (e.g., each) of its (e.g., subsequent N) repetitions of the preamble transmission. A WTRU may not (or may not be able or allowed) to choose a (e.g., a new or another) PRACH resource in a subframe that may not be (or may not be considered to be) a PRACH starting frame and/or subframe. PRACH repetitions (e.g., one or more repetitions) may have or may use different resources (e.g., RBs or PRBs), for example, for frequency diversity. The resources that may be used for the repetitions may be identified (e.g., explicitly), for example, by signaling or may be based on a pattern, such as a frequency hopping pattern.

A repetition rate of PRACH starting frames, e.g., PFrep may be defined, allocated, or configured (e.g., by an eNB such as by signaling such as dedicated or broadcast signaling and/or system information). A PFrep may be defined, allocated, or configured for CE mode and/or for one or more (e.g., each) CE level, e.g., PFrep(CE level). The PFrep(CE level) values may be the same or different. A PFrep(CE level) value may be a function of the CE level and/or the number repetitions (e.g., preamble repetitions) that may be associated with the CE level.

PRACH starting frames, may satisfy the equation SFN mod (PFrep)=0 or SFN mod (PFrep)=frame offset. PRACH starting frames for a CE level may satisfy the equation: SFN mod [PFrep (CE level)]=0 or SFN mod [PFrep (CE level)]= frame offset.

PFrep may be a function of the number of repetitions of the PRACH that may be transmitted, for example, for a CE level. PFrep may be the next highest power of 2 from the number of repetitions of the PRACH that may be transmitted, for example for a CE level. For example, for a CE level that may use 50 repetitions, PFrep may be 64. PRrep may be a function of the number of PRACH resources (or available PRACH resources) in a subframe and/or which frames (e.g., any or even) may include PRACH resources. If the number of repetitions may be a power of 2, PFrep may be the number of repetitions of the PRACH which may be transmitted.

Given a starting frame, starting subframes may be subframes (e.g., certain subframes) within the starting frame and/or subframes (e.g., certain subframes) offset from the start (e.g., subframe 0) of the starting frame. There may be multiple starting subframes associated with a starting frame. If there may be more than one starting subframe in or associated with a starting frame, a WTRU may choose one that may be designated or configured by the eNB (e.g., for contention free RA) or may choose one randomly. If there may be multiple starting subframes to choose from in or associated with a starting frame, the PRACH resources in the multiple starting subframes may differ in some way such as by preamble(s) and/or frequency resources.

In an example, starting subframes may repeat every 64 frames and may be offset by 4 frames, e.g., they may satisfy SFN mode 64=4. Available PRACH subframes in each frame may be subframes 1 and 3 (e.g., according to a PRACH configuration). In frames that may satisfy SFN mode 64=4, a WTRU may select subframe 1 or 3 as a starting subframe, e.g., randomly.

For a CE level with R repetitions (e.g., preamble repetitions), PRACH starting subframes may be at least R subframes apart.

PRACH frames may be frames that may include PRACH resources. In an example, the number of repetitions (e.g., preamble repetitions), for example for a CE level, may be R, PRACH frames may occur every F frames, and P subframes may be available per PRACH frame that may include PRACH. PRACH starting subframes, e.g., for a CE level, may be based on or a function of at least one of R, F, and P. PRACH starting subframes may be at least CEIL [(R×F)/P] subframes apart. For example, for R=100, P=3, and F=2, PRACH starting subframes may be at least CEIL [(R×F)/P] =CEIL [(100×2)/3]=67 subframes apart. PRACH starting subframes may be apart by a function of CEIL [(R×F)/P]. For example, PRACH starting subframes may be apart by the next multiple of 10 subframes (e.g., apart by the closest multiple of 10 greater than or equal to CEIL [(R×F)/P]) (e.g., 70 subframes apart for R=100, P=3, and F=2). In another example, PRACH subframes may be apart by the next power of 2 subframes (e.g., apart by the closest power of 2 greater than or equal to CEIL [(R×F)/P]) (e.g., 128 subframes apart for R=100, P=3, and F=2). In another example, PRACH subframes may be apart by the next multiple of a certain number of frames (e.g., apart by the closest multiple of the certain number greater than or equal to CEIL [(R×F)/P]). For example, the certain number of frames may be 4 frames or 40 ms and for R=100, P=3, and F=2, CEIL [(R×F)/P]=67 and the PRACH subframes may be the next multiple of 40 ms greater than 67 apart (e.g., 80 ms apart).

A PRACH configuration index may indicate which frames and/or subframes may and/or may not include PRACH resources. One or more PRACH configuration indices may be provided for CE mode, e.g., one may be provided for each CE level or one may be used for all CE levels. The legacy PRACH configuration index may be used for CE mode or may be the default if a CE specific value may not be provided.

Certain preambles or sets of preambles may (e.g., may only) be configured and/or used, e.g., for PRACH transmission, in certain subframes or sets of subframes. Certain frequency resources or sets of frequency resources may (e.g., may only) be configured and/or used, e.g., for PRACH transmission, in certain subframes or sets of subframes. Allocations and/or usage such as these may enable or facilitate multiple starting subframes in the same frame.

RAR may be provided in reduced bandwidth, e.g., for at least bandwidth limited WTRUs. For RAR that may be intended (or at least intended) for bandwidth limited WTRUs, if the PDSCH that may carry the RAR may be located in RBs, such as the center 6 RBs of the band, special handling may be used in some subframes, e.g., subframes that may carry synchronization channels (e.g., PSS and/or SSS) and/or a physical broadcast channel (PBCH).

In subframes that may carry PSS and/or SSS, transmission (e.g., by the eNB) of a channel (e.g., EPDCCH and/or PDSCH, for example, a PDSCH that may carry an RAR) that may be located in RBs that may include PSS and/or SSS, may not use the resource elements (REs) that may include the PSS and/or SSS signals. Not using certain REs may involve omitting transmitting in those REs. Not using certain REs may involve rate matching around those REs.

If the transmission of a channel (e.g., a PDSCH that may carry RAR) may rate match around certain REs, such as REs that may include PSS and/or SSS, a WTRU that may receive or attempt to receive that channel may account for the rate matching in its reception and/or decoding of the channel.

Subframes that may carry PBCH may not be used for transmission and/or reception of PDSCH that may carry RAR for certain WTRUs, such as limited bandwidth WTRUs and/or coverage limited WTRUs. An eNB may not transmit RAR (and/or a repeated RAR) intended for a WTRU (e.g., for a certain WTRU such as one that may be a limited bandwidth WTRU and/or a coverage limited WTRU) in a subframe that may carry PBCH. A WTRU (e.g., one that may be bandwidth limited and/or coverage limited) may not monitor a subframe that may carry PBCH for EPDCCH. The RAR window size may exclude PBCH subframes from counting or consideration. A PBCH subframe may be a subframe that may not be used for RAR for at least some WTRUs, such as WTRUs that may be bandwidth limited and/or coverage limited.

An RAR message size may be reduced and/or limited in size (e.g., compact RAR), for example, for RAR that may be intended for certain WTRUs such as bandwidth limited WTRUs and/or coverage limited WTRUs.

The size may be reduced by reducing or eliminating elements in the RAR that may relate to the UL grant for message 3 of the RA procedure.

A limited bandwidth WTRU and/or a coverage limited WTRU may or may only be able to transmit in (or within) a bandwidth that may include a certain RF bandwidth and/or a certain number of RBs. RA message 3, which may be in response to an RAR and/or which may include an RRC connection request message, may be or may need to be allocated resources and/or transmitted in (or within) that bandwidth (BW).

Since, for example, the possible locations for the transmission of message 3 may be limited (e.g., to 6 RBs), one or more UL grant parameters may be reduced (e.g., to fewer bits) or may be eliminated.

In an example, one or more UL resources may be predefined and/or configured. One or more of these UL resources may be dynamically selected (e.g., by an index), e.g., by the RAR, for use for UL transmission (e.g., for message 3). This may enable reduction in the size of the UL grant. The WTRU may use this selected resource for UL transmission, e.g., of message 3.

A WTRU may set its UL power, for example, after a random access (RA) procedure. WTRU transmit power for an UL channel, e.g., a PUSCH, may include an open loop component and/or a closed loop component. The WTRU transmit power for the UL channel may be limited (e.g., by the WTRU) to the WTRU maximum power, e.g., the WTRU configured maximum output power. The open loop component may be at least a function of one or more of: the transmission bandwidth or number of resource blocks to be transmitted, pathloss, and/or one or more configured values. The closed loop component may be a function of transmit power control commands that may be received by the WTRU, e.g., from an eNB. WTRU transmit power for an UL channel, e.g., a PUSCH, may be or may also be a function of the power ramping performed by the WTRU during a random access (RA) procedure, such as an initial RA procedure (e.g., for RRC connection establishment) and/or a contention based RA procedure.

An example setting for WTRU transmit power for a UL channel, such as a PUSCH transmission, may be as follows for subframe i and serving cell c:

$$P_{PUSCH,c}(i) = \min\left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right.$$

and the value may be in dBm.

$P_{CMAX,c}$ may be the WTRU configured maximum output power. $M_{PUSCH,c}$ may be the number of resource blocks granted or allowed for the transmission. $P_{O\_PUSCH,c}$ may be a configured value or a sum of configured values. $\alpha$ may be a configured value. PL may be the pathloss. $\Delta_{TF,c}$ may be an adjustment factor that may relate to the use of MIMO or the use of one or more antennas. $f_c$ may be a correction value, e.g., a sum of a starting correction value, $f_c(0)$ and one or more other correction values that may correspond to transmit power control (TPC) commands that the WTRU may receive or may have received, e.g., from an eNB. The starting correction value may be a function of an RA procedure power ramping. Inclusion of the effects of power ramping in the correction value that accumulates TPC commands may be by way of illustration and not limitation. The impact of RA power ramping on the power setting may be separate from the TPC commands. Adjustment for TPC commands may be omitted from the power setting.

If a WTRU does not perform power ramping during the RA procedure, e.g., if the WTRU may transmit at maximum power or may always transmit at maximum power, e.g., $P_{CMAX,c}$ for the PRACH power, the value to use for $f_c(0)$ and/or the initial power for an UL channel, such as PUSCH, may be undefined. An UL transmission may be or may include one or more of a PUSCH, PUCCH, and SRS. PUSCH may be a non-limiting example of an UL channel or transmission. Another UL channel or transmission, such as PUCCH or SRS, may be used consistently with the subject matter disclosed herein.

A random access response (RAR) may include one or more parameters that the WTRU may use to determine the value of $f_c(0)$ and/or its UL power setting for one or more channels, e.g., for PUSCH. A UL transmission, e.g., the first UL transmission, that a WTRU may make, e.g., on a PUSCH, following PRACH preamble transmission may be message 3 of the RA procedure, which may be or may include an RRC connection (e.g., RRC connection establishment) request. An RAR, e.g., the RAR in which the WTRU may receive the grant for resources for message 3, may include an indication of an initial power to use for the PUSCH transmission. The RAR may include one or more parameters from which the initial power to use for the PUSCH transmission may be determined. The RAR may include the starting correction value $f_c(0)$ for the PUSCH transmission. The RAR may include a coverage enhancement (CE) level for PUSCH and/or one or more other subsequent UL and/or DL transmissions for the WTRU. The RAR may include a number of repetitions or a value or index that corresponds to a number of repetitions to use for PUSCH and/or one or more other subsequent UL and/or DL transmissions for the WTRU. The RAR may include a power offset or delta, e.g., to subtract from the maximum power to determine the PUSCH power.

A WTRU may determine its UL power and/or UL repetitions, e.g., PUSCH power and/or PUSCH repetitions, according to one or more of the parameters or values included in the RAR and may transmit according to the determined power and/or repetitions.

For example, the WTRU may determine its initial and/or subsequent PUSCH power based on a starting correction value $f_c(0)$ or a power offset that may be included in the RAR and may transmit PUSCH using the determined power. The WTRU may determine UL power, for example, according to:

$$P_{PUSCH,c(i)} = \min[P_{CMAX,c}(i), \text{openlooppower}(i) + f_c(i)]$$

The WTRU may use a value of $f_c(0)$ that it may have received in the RAR. The open loop power may be a function of the CE level, which may correspond to the CE level of the RA procedure for which the WTRU successfully received an RAR or the CE level that the WTRU received in the RAR. The open loop power may be a function of the number of PRACH repetitions for which the WTRU successfully received an RAR or the number of repetitions that the WTRU received in the RAR. A closed loop component may not be present, e.g., $f_c(i)$ may be 0 or nonexistent for i>0 or i>=0. The closed loop component, if present, may be a function of the CE level or repetitions that may be updated, e.g., dynamically.

The WTRU may transmit or may always transmit PUSCH at maximum power, e.g., $P_{CMAX,c}$ or $P_{CMAX,c(i)}$. The WTRU may use a number of repetitions or a CE level that may be provided in the RAR for transmission of a channel such as PUSCH, for example, to account or compensate for the use of maximum power when the repetitions are combined at the receiver. For example, the open loop and/or closed loop part of the power control calculation may be a function of the CE level or the number of repetitions for the transmission of the UL channel, which may be included or indicated in the RAR.

The WTRU may set its PUSCH power (e.g., initial PUSCH power) according to an initial value included in the RAR. The WTRU may reduce its power from maximum by at least a delta or offset provided in the RAR. The WTRU may determine UL power according to, for example:

$$P_{PUSCH,c}(i) = \min[P_{CMAX,c}(i), PUSCH_{initial} + \text{closedlooppower}(i)]$$

or $$P_{PUSCH,c}(i) = [P_{CMAX,c}(i), P_{CMAX,c}(i) - \Delta + \text{closedlooppower}(i)]$$

There may be no closed loop component, e.g., closedlooppower(i) may be 0. The initial closed loop value may be zero or the delta may be included in the closed loop value. The closed loop component may be a function of TPC commands, e.g., accumulated TPC commands. The closed loop component may be a function of CE level or repetitions that may be the CE level or repetitions used for the RA procedure (e.g., the successful RA procedure) and/or the CE level or repetitions included in the RAR. The closed loop component and/or the CE level or repetitions that may impact the closed loop component may be updated, e.g., dynamically.

One or more values not indicated as a function of subframe or TTI, e.g., i, may be a function of subframe or TTI and may be consistent with the subject matter disclosed herein. For example, $P_{CMAX,c}$ and $P_{CMAX,c}(i)$ may be used interchangeably.

One or more values indicated as a function of subframe or TTI, e.g., i, may not be a function of subframe or TTI and may be consistent with the subject matter disclosed herein.

The initial PUSCH power setting may be $P_{CMAX,c}$. The WTRU may determine the initial closed loop value or adjustment value, e.g., $f_c(0)$, to be the value that may make the PUSCH value equal to $P_{CMAX,c}$.

For example, $P_{PUSCH,c}(i)$ may be determined by:

$$P_{PUSCH,c}(i) = \text{openlooppower} + f_c(i)$$

or $$P_{PUSCH,c}(i) = \text{Min}[P_{CMAX,c}(i), \text{openlooppower}(i) + f_c(i)]$$

The WTRU may determine (e.g., may first determine) the initial PUSCH power based on no power ramp-up, e.g., $P_{PUSCH\text{-}noramp}$. $P_{PUSCH\text{-}noramp}$ may be the value of openlooppower(0). The value of openlooppower(0) may be or may be set to $P_{PUSCH\text{-}noramp}$. The WTRU may determine $f_c(0)$ according to the following: $f_c(0) = \max(0, P_{CMAX,c} - P_{PUSCH\text{-}noramp})$.

With this starting value of $f_c$, the starting value of the PUSCH power may be $P_{CMAX,c}$. The value of $f_c$ may be adjusted by TPC commands and/or adjustments to CE level or repetitions. The value of $f_c(0)$ may be adjusted or may also be adjusted by a parameter provided in the RAR, such as a TPC command indicated in the RAR, e.g., delta_msg2. $P_{PUSCH\text{-}noramp}$ may include the effects of a TPC command indicated in the RAR.

$f_c(0)$ may be determined according to the following:

$$f_c(0) = \text{delta } P_{rampup,c} + \text{delta\_msg2},c$$

where delta_msg2,c may be a TPC command indicated in the RAR.

The value of delta $P_{rampup,c}$ may be determined according to:

$$\text{delta } P_{rampup,c} = \max[0, P_{CMAX,c} - (10 \cdot \log_{10}(M_{PUSCH,c}(0)) + P0_{PUSCH,c}(2) + \text{delta}_{msg2},c + \text{alpha},c(2) \cdot PL + \text{deltaTF},c(0) + CL)]$$

where $M_{PUSCH,c}(0)$ may be the bandwidth of the PUSCH resource assignment expressed as a number of resource blocks valid for the subframe of the first PUSCH transmission in the serving cell c, and deltaTF,c(0) may be a power adjustment of first PUSCH transmission in the serving cell c. $P0_{PUSCH,c}(2)$ may equal the initial preamble power, e.g., preambleInitialReceivedTargetPower, which may be configured by higher layers plus a message3 delta power value that may be configured by higher layers. CL may be an adjustment to compensate for the CE level or the number of repetitions for the PUSCH transmission, which may be included or indicated in the RAR. One or more of the elements of the above equation may be 0 or not included. The message3 delta power may be 0 or not exist.

The equation above may (e.g., in effect) correspond to a delta $P_{rampup,c}$ value that may result in the initial power being maximum power. $f_c(0)$ and/or delta $P_{rampup,c}$ may be zero.

The WTRU may use the CE level and/or number of repetitions that it uses for the successful PRACH preamble transmission or transmissions, e.g., the CE level and/or number of repetitions for which the WTRU successfully receives an RAR, as the CE level and/or number of repetitions for a PUSCH transmission, e.g., the first PUSCH transmission, which may correspond to message 3 of the RA procedure.

A transmission power, such as an initial power, may be associated with a CE level or number of repetitions. This transmission power may be configured, for example, by signaling such as broadcast or higher layer signaling. The WTRU may set the PUSCH power (e.g., the initial PUSCH power or message 3 PUSCH power) to this value and/or may set the PUSCH using or at this power. The power may be a minimum power for a CE level.

A CE level or number of repetitions may be updated. UL grants and/or TPC commands may include adjustments that may be applied to future UL transmissions and/or to future UL transmit power determinations. For example, an UL grant or TPC command may include a CE level or number of repetitions to use for an upcoming UL transmission. The WTRU may transmit, e.g., may always transmit, the PUSCH at maximum power or may adjust the transmit power based on an open loop component and/or a closed loop component. The WTRU may transmit the PUSCH with a number of repetitions that may be provided with or separately from an UL grant or a TPC command. The WTRU may transmit the PUSCH with a number of repetitions that may correspond to a CE level that may be provided with or separately from an UL grant or a TPC command.

If the grant or TPC command corresponds to an UL transmission in subframe X or an UL transmission that may begin in subframe X, the WTRU may use the indicated CE level, repetitions, or power adjustment (e.g., to increase or decrease the power) for the UL transmission in subframe X or for the UL transmission that may begin in subframe X. The TPC command or UL grant may be repeated (e.g., by the eNB) and/or received (e.g., by the WTRU) in a set of subframes that may correspond to UL transmission by the WTRU in subframe X or to UL transmission that may begin in subframe X.

PUSCH power may be ramped. For example, the WTRU may ramp its PUSCH power if it has not received an ACK from the eNB for a number of PUSCH transmissions. This number may be configured, for example, by the eNB. The WTRU may increase its power by a certain delta value based on a number of unsuccessful transmissions, which may be determined based on the lack of receipt of ACK for the transmissions. The delta value may be configured, for example, by the eNB. The number of unsuccessful transmissions and/or the delta value may be a function of the CE level and/or the number of repetitions. The power may be increased for one or more retransmissions, e.g., each of the retransmissions. The transmission power may not be increased above the maximum power. Increases to the power may be stopped when the maximum power is reached or when an increase would cause the power to exceed the maximum power.

One or more of the examples disclosed herein for an UL channel or transmission may be applicable to a downlink (DL) channel or transmission. For example, the examples disclosed herein in the context of UL grants may be applicable to DL grants, consistent with the subject matter disclosed herein. For example, a CE level or a number of repetitions to use for PDSCH reception or PUCCH transmission may be included in a DL grant.

Successful reception of an RAR may be or may include reception of an RAR that may be intended for the WTRU. Transmission of a PRACH or preamble may include transmission of repetitions of a PRACH or preamble. For purposes of illustration and description, PRACH and preamble may be used interchangeably.

A random access (RA) or RA procedure may be requested or initiated, for example, by a PDCCH order. For example, a WTRU may receive a request or indication, e.g., from an eNB, to perform or initiate an RA or RA procedure. The request or indication may be or may be included in a PDCCH order that may be transmitted in a PDCCH region, for example, in a downlink control information (DCI). A WTRU, such as a low cost or reduced capability WTRU, may not be able to receive a PDCCH in a PDCCH region, e.g., due to a limited capability (e.g., reduced bandwidth and/or limited coverage). PDCCH order in a PDCCH region may not be supported for or by some WTRUs, such as low cost or reduced capability WTRUs or WTRUs that may not be able to receive a PDCCH in a PDCCH region.

PDCCH order is disclosed by way of example only and not limitation. Another request to perform or initiate an RA or RA procedure may be used and may still be consistent with this disclosure. For example, an RA request may be substituted for a PDCCH order and may still be consistent with this disclosure.

PDCCH order, M-PDCCH carrying PDCCH order, a DCI that may request or initiate contention-free (or contention-based) RA, a DCI carrying one or more PDCCH orders, and a DCI that may request or initiate RA may be used interchangeably herein.

CE level, number of repetitions, and repetition number may be substituted for each other and may still be consistent with this disclosure.

An RA procedure may be initiated on an individual basis or on a group basis. A DCI or PDCCH order or RA request that may indicate (or initiate) an RA, e.g., a contention-free or contention-based RA, may be transmitted via an M-PDCCH. An M-PDCCH may be a downlink control channel that may be monitored and/or received by a WTRU, such as a low cost or reduced capability WTRU.

For purposes of description and explanation, RA may be replaced with RA procedure, and vice versa, and may still be consistent with the examples disclosed herein.

A DCI, such as a group DCI, may be used to initiate RA for one or more WTRUs. A DCI may include one or more PDCCH orders that may request or initiate an RA or RA procedure for one or more WTRUs. A PDCCH order may be associated with a WTRU. A PDCCH order may be associated with multiple WTRUs. If a PDCCH order requests or initiates RA, WTRUs associated with that PDCCH order (e.g., WTRUs that receive that PDCCH order) may transmit a PRACH preamble, e.g., a selected or assigned PRACH preamble. The assigned PRACH preamble may be configured, e.g., by the eNB, such as by higher layer signaling. For example, a WTRU may be configured with a PRACH preamble for a contention-free RA via higher layer signaling. The PRACH preamble configured via higher layer signaling may be considered as a WTRU-specific PRACH preamble for contention-free RA. The assigned PRACH preamble may be indicated in or with the PDCCH order. A separate PRACH preamble may be indicated for a WTRU (e.g., each WTRU) for which the PDCCH order is intended (or may be intended).

A PDCCH order may be used to initiate random access for multiple WTRUs, e.g., individually. An eNB may indicate the random access initiation for a WTRU in a WTRU group that may monitor the same PDCCH order. For example, a bit field may include N bits that may be associated with N WTRUs, e.g., in a group. A bit (e.g., each bit) may indicate random access (e.g., a request to initiate random access) or not (e.g., 0 for no initiation of RA, 1 for initiation of RA). A WTRU (e.g., each WTRU) may be indicated or configured with a bit location (e.g., in the bit field) associated with or in the PDCCH order. A PRACH preamble for the PDCCH order may be configured via higher layer signaling for a WTRU (e.g., each WTRU). A PRACH preamble index corresponding to each bit in the bit field for RA initiation may be transmitted in the PDCCH order.

Two or more PDCCH orders may be transmitted in a DCI. A (e.g., each) PDCCH order may be associated with a WTRU.

A DCI or PDCCH may include information for initiating an RA procedure for one or more WTRUs. At least some of the information may be included separately for a WTRU (e.g., each WTRU) for which the PDCCH order may be intended. At least some of the information may be common to one or more WTRUs (e.g., all of the WTRUs) for which the PDCCH order may be intended.

A DCI or PDCCH order that may initiate an RA procedure may include a PRACH preamble index. A DCI or PDCCH order that may initiate an RA procedure may include a PRACH mask index and/or time resources for the PRACH transmission. A DCI or PDCCH order that may initiate an RA procedure may include a CE level and/or repetition number. A DCI or PDCCH order that may initiate an RA procedure may include a transmission (e.g., power) level and/or power level type (e.g., maximum power or based on DL measurement). A DCI or PDCCH order that may initiate an RA procedure may include frequency resources (e.g., a set of PRBs) for the PRACH transmission. A DCI or PDCCH order that may initiate an RA procedure may include an on/off indicator (e.g., on to initiate RA, or off for no initiation of RA).

A DCI that may carry one or more PDCCH orders may be scrambled with an RNTI, e.g., its CRC may be scrambled with an RNTI. A WTRU may be configured with and/or use one or more RNTIs, such as a WTRU-specific RNTI (e.g., a C-RNTI). The WTRU may use the one or more RNTIs to determine whether a DCI is intended for it.

An RNTI may be used for the DCI carrying one or more PDCCH orders. The RNTI may be WTRU-specific. The RNTI may be a group RNTI or a common RNTI, such as one that may be used by multiple WTRUs. The RNTI may be referred to as a PDCCH order RNTI. The RNTI may or may not be specific to DCIs carrying one or more PDCCH orders.

For a WTRU, the PDCCH order RNTI may be the WTRU's C-RNTI. A PDCCH order may be transmitted in a WTRU-specific DCI, which may use C-RNTI.

The PDCCH order RNTI may be or may be determined as a function of at least one of a WTRU-ID (e.g., C-RNTI), a CE level, and/or a PRACH preamble index. One or more of a C-RNTI, a CE level, and/or a PRACH preamble index may be configured via higher layers.

The PDCCH order RNTI may be or may be determined as a function of the PRACH preamble and/or resource that may be used for a contention-based RA procedure. For example, the PDCCH order RNTI may be a function of a recent (e.g., the most recent) PRACH preamble and/or PRACH resource that the WTRU used (e.g., successfully) for RRC connection establishment. The PDCCH order RNTI may be a function of a recent (e.g., the most recent) PRACH preamble and/or PRACH resource that the WTRU used (e.g., successfully) for a PDCCH-initiated RA procedure (e.g., a contention-based RA procedure).

The PDCCH order RNTI may be or may be determined as a function of the time and/or frequency location of the RAR associated with a recent (e.g., the most recent) PRACH preamble and/or PRACH resource that the WTRU used (e.g., successfully) for a contention-based RA procedure (e.g., for RRC connection establishment or PDCCH order initiated). The PDCCH order RNTI may be indicated via higher layers.

The time and/or frequency location in which a WTRU may monitor PDCCH order may be determined as a function of the PDCCH order RNTI.

An indication may be used to determine whether a DCI is intended to be used for the scheduling of unicast traffic (e.g., PUSCH/PDSCH) or whether the DCI is intended to be used for a PDCCH order. The indication may be a bit field in the DCI. The indication may be based on the RNTI used for the DCI. A combination of two or more bit field conditions may be used as an indication. The search space of M-PDCCH may be used as an indication.

A WTRU may transmit PRACH in response to RA procedure initiation, for example, by PDCCH order.

A WTRU may monitor a search space such as M-PDCCH search space for DCI scrambled (e.g., for DCI with CRC scrambled) with PDCCH order RNTI. A WTRU may receive and/or successfully decode DCI scrambled with PDCCH order RNTI.

A DCI scrambled with an RNTI may be the same as or may be used to represent a DCI with a CRC scrambled with an RNTI.

Upon receipt or in response to receipt of the DCI, the WTRU may initiate a RA or RA procedure.

The WTRU may transmit a PRACH based on information included in the PDCCH order carried by the DCI and/or configured information.

The WTRU may determine, for example from this information, one or more of (i) the PRACH preamble, (ii) the CE level and/or number of repetitions to use for the preamble transmission and/or the RA procedure, and/or (iii) the time and/or frequency resources for the preamble transmission.

The WTRU may transmit the determined preamble in the determined time and/or frequency resources with the determined CE level or number of repetitions. For example, the WTRU may transmit the PRACH (or preamble) with or using the CE level or number of repetitions indicated in or by the PDCCH order. The WTRU may transmit the PRACH (or preamble) with or using the CE level or number of repetitions configured via higher layer signaling, for example for contention-free or PDCCH order initiated RA.

The WTRU may transmit the PRACH (or preamble) with or using its current CE level, which may be the CE level of a recent (e.g., its most recent) successful RA procedure.

The WTRU may transmit the PRACH (or preamble) with or using the CE level or number of repetitions corresponding to (or determined from or according to) the CE level or number of repetitions of a previous (e.g., previous successful) RA procedure. The previous RA procedure may be a most recent (e.g., most recent successful) contention-based (or contention-free) RA procedure. The previous RA procedure may be the most recent (e.g., most recent successful) contention-based (or contention-free) RA procedure for RRC connection establishment or that was initiated by PDCCH order.

A successful RA procedure may be one for which the WTRU successfully received an RAR (e.g., successfully received an RAR which it determined was intended for it).

The CE level that the WTRU may use for the PDCCH order indicated RA procedure may be determined, e.g., by the WTRU, based on a prior RA (e.g., a prior contention-based RA). For example, the CE level may be determined based on the PRACH resource associated with the latest (e.g., most recent) RAR the WTRU received successfully.

The WTRU may transmit a preamble indicated in the PDCCH order. The WTRU may transmit a preamble configured by higher layers for contention-free or PDCCH order requested RA.

The WTRU may transmit the PRACH with the power level or type (e.g., maximum power or based on DL measurement) indicated in or by the PDCCH order. The WTRU may transmit the PRACH with the power level or type configured by higher layers. If measurement based power is used, the WTRU may ramp the power and try again if an RAR is not successfully received.

The WTRU may transmit the PRACH in time and/or frequency resources according to the PRACH mask index indicated in or by the PDCCH order and/or a PRACH mask index configured by higher layers.

The WTRU may transmit the PRACH in time and/or frequency resources (e.g., PRBs) indicated in or by the PDCCH order.

The WTRU may transmit the PRACH in time and/or frequency resources configured by higher layers for RACH or contention-free RACH, for example, for the CE level the WTRU may be using for the PRACH transmission.

A PDCCH order indicated or initiated RA or RA procedure may be an RA or RA procedure indicated, requested, and/or initiated by a DCI and/or PDCCH order, e.g., by an eNB.

The CE level (or number of repetitions) that the WTRU may use for the PDCCH order indicated RA procedure may be or may be based on the CE level (or number of repetitions) used for the M-PDCCH carrying the PDCCH order. For example, the CE level (or number of repetitions) may be based on (e.g., equal to) the number of repetitions used for M-PDCCH. The CE level (or number of repetitions) may be based on the number of total aggregation levels used for M-PDCCH, which may be referred to as the number of (E)CCEs used over subframes for repetitions.

If the WTRU does not successfully receive an RAR in response to a preamble it transmitted, the WTRU may try again, for example, until an RAR is successfully received or the maximum number of tries has been reached or exceeded.

The WTRU may use the same CE level for one or more (e.g., all) preamble transmission attempts, for example for PDCCH order initiated RA. The WTRU may try different CE levels (e.g., successively higher CE levels) and the starting CE level for the RA procedure may be or may be based on the CE level used for the M-PDCCH carrying the PDCCH order.

Starting CE level and CE level may be substituted for each other and still be consistent with this disclosure.

Techniques for handling DCI formats, e.g., carrying PDCCH order, with coverage enhancement may be provided and/or used.

A PDCCH order (e.g., a DCI carrying one or more PDCCH orders) may be transmitted repetitively. For example, a PDCCH order may be transmitted Nrep times (e.g., in or in each of Nrep subframes or TTIs), where Nrep may be the number of repetitions. Nrep may be determined based on the CE level of the WTRU or WTRUs for which the PDCCH order or orders are intended. For example, Nrep may correspond to the CE level of the WTRU (e.g., among the WTRUs for which the PDCCH order or orders may be intended) needing the most coverage enhancement. Nrep may be determined as a function of a group RNTI used for the DCI carrying one or more PDCCH orders. Nrep may be a value configured or provided by high layers and may be specific to a DCI carrying PDCCH order or may be common with the repetition number for other DCIs such as all DCIs One or more (e.g., all) DCI formats may have a repetition number, e.g., a number of repetitions, associated with it or them. The repetition number may be configured, for example, in a WTRU-specific manner or cell-specific manner (e.g., broadcast such as in system information). A WTRU may use a DCI format's repetition number (e.g., configured repetition number) to receive or attempt to receive and/or decode that DCI format, for example, regardless of a CE level being used by a WTRU for other purposes, e.g., for data transmission and/or reception. DCI and DCI format may be substituted for each other and still be consistent with this disclosure.

The number of repetitions of a DCI format may be a function of the maximum number of bits the DCI format may carry.

The number of repetitions of a DCI format may be a function of the maximum CE level supported by the eNB or cell that may transmit the DCI format.

The number of repetitions of a DCI format may be a function of the maximum CE level supported for the DCI format by the eNB or cell that may transmit the DCI format.

CE level use and/or support may be different for different DCI formats, e.g., for an eNB or cell. Maximum CE level use and/or support may be different for different DCI formats, e.g., for an eNB or cell.

If a WTRU receives a PDCCH order with repetitions and the last (or first) subframe of the repetitions is subframe n, the WTRU may transmit a PRACH preamble in the first PRACH resource (or the first PRACH resource available for the indicated PRACH preamble transmission) in subframe n+k3 or later where k3 may be at least one of following: (i) a fixed positive integer number such as 6, (ii) a positive integer number determined as a function of a CE level (or Nrep) such as the number of repetitions plus a fixed integer, and/or (iii) a configured number provided via higher layer signaling.

For a PDCCH order transmitted with Nrep repetitions, the WTRU may successfully receive the PDCCH order using fewer than Nrep repetitions, e.g., Nue repetitions. The reference subframe n for determining the start of the preamble transmission may be the last subframe (or a subframe relative to the last subframe) of the Nrep repetitions or the Nue repetitions.

A PDCCH order to initiate a RA procedure may (or may only) be supported in a subset of CE levels. A WTRU and/or eNB may support two or more CE levels which may include normal coverage (e.g., CE level-0) and one or more enhanced coverage levels (e.g., CE level-1, 2, 3), for example for data transmission and reception. PDCCH order may (or may only) be used for a subset of the CE levels. For exemplary purposes, lower number CE levels may correspond to lower coverage enhancement, e.g., fewer repetitions.

The PDCCH order may (or may only) be used for and/or by a WTRU in a normal coverage (e.g., CE level-0). The PDCCH order may (or may only) be used for and/or by a WTRU in a normal coverage without bandwidth limitation.

The PDCCH order, e.g., to initiate RA procedure, may be used for or by a WTRU in some coverage enhancement levels, but not in other coverage enhancement levels.

For example, the PDCCH order may be used for a WTRU in a low coverage enhancement level (e.g., CE level-1 or CE level-1 and CE level-2). PDCCH order may not be used if a WTRU is in a high coverage enhancement level (e.g., CE level-3 or CE level-2 and CE level-3). A WTRU in a low coverage enhancement level may monitor for and/or respond to a PDCCH order. A WTRU in a high coverage enhancement level may not monitor for and/or respond to a PDCCH order. Low coverage enhancement may be substituted for high coverage enhancement and vice versa and still be consistent with this disclosure.

The CE level or levels supported (e.g., by the eNB and/or WTRU) for PDCCH order may be predefined, configured, or known. For example, configuration of the CE level, CE levels, or highest CE level supported by the eNB and/or expected to be supported by a WTRU for PDCCH order may be provided via higher layer signaling (e.g., by the eNB) such as via system information, which may be broadcast. A WTRU may monitor for and/or respond to a PDCCH order while in or using a CE level supported or expected to be supported for PDCCH order. A WTRU may not monitor for and/or respond to a PDCCH order while in or using a CE level not supported or expected to be supported for PDCCH order.

The limit of PDCCH order to a subset of CE levels may be (or may only be) for PDCCH order which initiates contention-free RA. PDCCH order which initiates contention-based RA may be applicable at a larger set of (e.g., all) CE levels supported, e.g., by the eNB.

If a WTRU receives a PDCCH order indicating a contention-free RA procedure at a CE level not supported (e.g., by the eNB or the WTRU) for contention-free RA, the WTRU may initiate a contention-based RA procedure.

A RA procedure may be used for CE level change.

An indication may be transmitted to initiate a RA procedure, which may be a contention-based or contention-free RA procedure. The indication may be transmitted in a PDCCH order. The PDCCH order may be used to change the CE level of the WTRU (e.g., to a level such as a lower level which may need or use fewer repetitions or to a higher level which may need or use more repetitions).

In an example, a WTRU may receive a PDCCH order that may initiate a contention-based (or contention-free) RA procedure. In response, the WTRU may perform a contention-based (or contention-free) RA procedure.

The WTRU may perform the same (or a similar) RA procedure as for RRC connection establishment, e.g., for initial access.

The WTRU may perform the same (or a similar) RA procedure as for RRC connection establishment, e.g., for initial access, except for one or more aspects such as the starting CE level determination.

The starting CE level for a RA procedure (e.g., a contention-based RA procedure) that may be initiated by a PDCCH order may be indicated in the PDCCH order.

The WTRU may begin with a starting CE level, and may transmit a preamble using that level (e.g., with the repetitions corresponding to that level). If the WTRU does not successfully receive an RAR, the WTRU may try again using a higher (e.g., next higher) CE level. The WTRU may try at each successively higher CE level until an RAR is successfully received or the RA procedure has failed at the highest CE level supported by the cell and/or the WTRU. Multiple tries at each level may be performed before going to the next higher level. Tries at the same level may be at increasingly higher power.

For the starting CE level, the WTRU may use the starting CE level provided in the PDCCH order or choose one autonomously, such as based on a DL measurement (e.g., RSRP).

The WTRU may begin with a starting CE level corresponding to normal mode or to no coverage enhancement, for example based on an indication to do so included in the PDCCH order (e.g., CE level or starting CE level set to a certain value such as 0) or a characteristic of the PDCCH order, such as the DCI format used or the RNTI used. A WTRU may begin with a starting CE level corresponding to normal mode or to no coverage enhancement for a contention-based RA initiated by PDCCH order, for example, always.

Normal coverage that, for example, may not use techniques such as repetition to enhance coverage, may be considered a CE level such as CE level-0.

A PDCCH order which may be used in initiate a RA procedure may include at least one of the following information: (i) a CE level or starting CE level, (ii) a PRACH preamble index, (iii) a PRACH preamble group index (e.g., that may select a preconfigured group of preambles provided by higher layer signaling), (iv) a timing advance, (v) time and/or frequency resources (e.g., subframes and/or PRBs) for the preamble transmission, and/or (vi) an indication of a group (e.g., a group configured by higher layer signaling) of time and/or frequency resources (e.g., subframes and/or PRBs) for the preamble transmission.

For contention-based RA, the PRACH preamble index may be a fixed known value, such as 0 or all zeros. This value may indicate to the WTRU that contention-based RA is requested or is to be performed. The value may indicate that the WTRU should choose the preamble.

The WTRU may choose the preamble to use from a set of preambles available for the CE level that the WTRU will use for the preamble transmission, for example, for contention-based RA.

A preamble or preamble group may be indicated in the PDCCH order. The WTRU may use the indicated preamble or select a preamble from the indicated group (e.g., randomly), for example for contention-free RA.

The WTRU may choose time and/or frequency resources for the preamble transmission based on the time and/or frequency resources available for and/or corresponding to the CE level the WTRU will use for the preamble transmission. Correspondence may be configured and/or indicated in higher layer signaling. The WTRU may use resources indicated in the PDCCH order or select from a group of resources indicated in the PDCCH order.

After one or more attempts transmitting a preamble (e.g., with repetitions for the CE level of the attempt), the WTRU may successfully receive an RAR. The WTRU may change the preamble for each attempt, for example, if one specific preamble was not indicated in the PDCCH order.

The WTRU may receive an UL grant, e.g., in the RAR, to transmit a message to the eNB. The WTRU may send a message on the granted resources (e.g., on a PUSCH). The message may indicate that the WTRU successfully received the RAR. The message may be used to perform contention resolution, e.g., for a contention-based RA. For initial access, this message may be or may be referred to as msg3, which may be or include an RRC connection establishment request. For RA initiated by a PDCCH order, the WTRU may already be connected.

The WTRU may send a message or indication, e.g., on the granted resources, which may indicate a successful RA procedure, RA procedure complete, successful reception of the RAR and/or other information which may indicate to the eNB (or may be interpreted by the eNB) that the RA procedure (e.g., at least through RAR reception by the WTRU) was successful or completed. RA procedure msg3 or a modified version of msg3 may be used, for example, with a new establishment cause. A new message may be used. Message and msg may be used interchangeably.

The resources the WTRU may use for the PRACH transmission may be unique to a CE level and/or the eNB may be aware or informed that the RA procedure was successful. The eNB may know, e.g., based on the PRACH resource used by the WTRU and/or the success of the RA procedure, what CE level the WTRU used or needed for achieving the successful RA procedure.

The CE level for the successful RA procedure (e.g., the new CE level) may be lower (or higher) than the one the WTRU was using prior to the RA procedure.

The WTRU may change its current CE level to the CE level corresponding to the successful RA procedure (e.g., the new CE level). The new CE level may correspond to normal coverage.

The WTRU may apply the timing advance included in the PDCCH order, for example, when or beginning when transmitting the UL message following successful reception of the RAR, e.g., the UL message for which resources were granted in the RAR.

The WTRU may continue to use its current CE level until it completes the RA procedure. If the RA procedure results in a change of CE level, the WTRU may begin to use the new CE level when it completes the RA procedure.

Completion of the RA procedure may correspond to when the WTRU transmits the indication of the success of the RA procedure. The WTRU may use the new CE level when transmitting the indication.

In another example, a PDCCH order may be used to initiate one of contention-free RA or contention-based RA. An indication such as a bit field in the DCI associated with the PDCCH order may be used to indicate whether the PDCCH order is for contention-based RA or contention-free RA. A different RNTI may be used to indicate a PDCCH order for contention-based RA and a PDCCH order for contention-free RA. A different search space, e.g., a different fallback M-PDCCH search space, may be used to indicate the type of RA indicated by the PDCCH order.

A search space that may be a fallback search space may be provided and/or used.

A search space, e.g., of a cell, may have, use or be defined with a certain CE level, which may be a highest CE level which may be supported by the cell. An indication may be transmitted in this search space to a WTRU to initiate a RA procedure. The search space may be known or configured, e.g., by higher layer signaling. The higher level signaling may be from the eNB, such as in system information, which may be broadcast.

The search space may be or may be used for a fallback control channel. The search space may be referred to as a fallback search space. A fallback control channel, a fallback search space, a common search space, and a fallback M-PDCCH may be used interchangeably.

A fallback M-PDCCH may be configured with at least one of: a subband or frequency location, a set of time locations, a CE level, and a number of repetitions.

A specific subband (e.g., a subset of consecutive PRBs which may be within a system bandwidth such as a DL system bandwidth of a cell) and/or a specific time location or set of time locations (e.g., a subset of subframes and/or radio frames) may be used for a fallback M-PDCCH.

The frequency and/or time locations of the subband may be indicated in higher layer signaling such as broadcast signaling or via a physical broadcasting channel (e.g., MIB). The frequency and/or time locations of the subband may be determined (e.g., by the WTRU) as a function of one or more system parameters. The system parameters may include DL system bandwidth, physical cell-ID, subframe number, SFN number, and MBSFN configuration. The frequency and/or time locations of the subband may change over time. For example, a frequency hopping pattern (e.g., predefined or configured) may be used.

The number of repetitions for the fallback M-PDCCH may be the same as the maximum number of repetitions for M-PDCCH configured in the cell. The number of repetitions may be indicated via higher layer signaling such as broadcast signaling or via a physical broadcasting channel (e.g., MIB).

A part of M-PDCCH WTRU-specific search space may be used as a fallback M-PDCCH. For example, M-PDCCH WTRU-specific search space may include one or more CE levels (e.g., repetition numbers). One or more M-PDCCH candidates in the M-PDCCH WTRU-specific search space with a highest CE level may be used as fallback M-PDCCH.

A WTRU may determine one or more parameters (e.g., transmission and/or reception parameters) for a fallback M-PDCCH which may include one or more of a subband or frequency location, a set of time locations, a CE level, and a number of repetitions. The WTRU may determine the one or more parameters based on at least one of received configuration, system parameters, and otherwise known information.

The WTRU may monitor fallback M-PDCCH according to at least the determined parameters. The WTRU may monitor fallback M-PDCCH for at least PDCCH order (or DCI format including a PDCCH order for the WTRU) that may indicate, initiate, or request an RA procedure. Upon or in response to successful receipt of a PDCCH order, the WTRU may initiate an RA procedure.

The fallback M-PDCCH may be used by the eNB to communicate with the WTRU at a certain CE level such as a highest CE level supported by the cell, for example, if communication with the WTRU may need a higher (or lower) CE level than what is currently being used. The eNB may indicate a CE level change to the WTRU in or using the fallback M-PDCCH. The eNB may transmit a PDCCH order and/or a request to initiate a RA procedure to a WTRU, for example to potentially change the CE level of the WTRU such as to a more appropriate or higher (or lower) CE level.

Paging may be provided and/or used. CE information may be used for paging. When an eNB may page or is to page a WTRU that may be in idle mode, the eNB may not know whether the WTRU may be in coverage enhanced (CE) mode and/or if it may be in CE mode, what the CE level may be. If the eNB may page a CE mode WTRU using normal paging procedures, the WTRU may not receive the page.

Idle mode may be or include one or more of (e.g., the modes or states of) RRC Idle, ECM Idle, EMM Registered, and/or EMM Deregistered.

A WTRU may provide CE information that may be for or regarding the WTRU to an eNB and/or an MME. An eNB may provide CE information that may be for or regarding a WTRU to another eNB (e.g., as part of a handover procedure) and/or to an MME. MME may be replaced by another network entity and still be consistent with this disclosure. WTRU and device (e.g., which may be an MTC device or LC-MTC device) may be used interchangeably.

An MME may store CE information that may be for or regarding a WTRU. The MME may include CE information that may be for or regarding a WTRU in a message to an eNB, for example, when requesting the eNB to page the WTRU, such as when the WTRU may be in idle mode.

CE information that may be for or regarding a WTRU may include one or more of the mode of the WTRU with respect to coverage enhancements, e.g., CE mode or not CE mode; the CE level of the WTRU; and/or the WTRU's capability to support CE mode. The information included in CE information may be different for different messages and/or purposes.

The mode of the WTRU with respect to coverage enhancements may be the current and/or last (or most recently) known or stored mode of the WTRU. The CE level of the WTRU may be the current and/or last (or most recently) known or stored CE level of the WTRU.

CE level may include an indication of CE mode. A certain value or level such as 0 may be used to indicate that the UE may not be in CE mode. For example, 0, 1, 2, and 3 may be used to indicate not in CE mode, and levels 1, 2, and 3 of CE mode, respectively.

In an example, a WTRU may provide CE information to an MME in a NAS message such as an attach (e.g., ATTACH REQUEST) message and/or a tracking area update (TAU) message.

The WTRU may provide CE information to an MME during one or more of the network registration actions, such as an attach (e.g., in the "ATTACH REQUEST" message) or during device or WTRU mobility management actions such as tracking area update (TAU) (e.g., in the "TRACKING AREA UPDATE REQUEST" message). For example, the WTRU may include such CE information in one or more of the aforementioned messages itself, or in one or more of its WTRU or device capabilities or network support feature attribute IEs such as "WTRU network capabilities," "MS network capabilities," "MS Classmark 2," MS Classmark 3," "MS network feature support," and the like.

An eNB may receive CE information (e.g., some CE information) from a WTRU and/or may determine CE information (e.g., some or some other CE information) in one or more other ways (e.g., from a PRACH resource a WTRU may have used which may indicate certain CE information). The WTRU may provide CE information, e.g., to the eNB, in one or more capabilities information elements (IEs) or messages (e.g., a WTRU capabilities IE or message and/or an IE or message that may be specific to CE information and/or or information relating to paging or paging capabilities). The WTRU may autonomously send the message. The eNB may provide CE information to an MME in an S1 (e.g., SLAP) message.

An eNB may provide CE information to an MME for or regarding a WTRU following determination and/or receipt of this information. An eNB may provide CE information to an MME for or regarding a WTRU following a change or update of this information. An eNB may provide CE information to an MME for or regarding a WTRU when the eNB may release the WTRU (e.g., from its connection such as an RRC connection with the eNB) and/or when the WTRU may go to idle mode.

An MME may provide CE information (e.g., which it may have stored for a WTRU) to an eNB, for example, in support of certain procedures, for example certain procedures in which the eNB may not have this information. For example, the MME may provide CE information (e.g., which may include one or more items of information that may be provided separately or in combinations such as in one or more IEs), to an eNB in association with paging (e.g., with or in an S1 PAGING message) for a given WTRU or device that may be in idle mode or attached but not connected, or detached or unattached but known to be located in the paging area. The eNB may page the WTRU in a manner consistent with the CE information it may receive, e.g., from the MME.

A WTRU may provide updated CE information to an eNB and/or MME, for example, when one or more of the components of its CE information may change or in other situations.

Under certain conditions, e.g., when the WTRU may be in idle mode, the WTRU may perform a RA procedure to connect to an eNB for providing CE information or updated CE information. The WTRU may send an RRC connection request, and the reason may be indicated by the WTRU as mobile originated signaling (mo-signaling).

Change of CE mode and/or CE level (e.g., in idle and/or connected mode) may be a reason for a WTRU to perform (e.g., trigger) a TAU. Change of CE mode and/or CE level (e.g., in idle and/or connected mode) may be a reason for a WTRU to perform a RA procedure and/or perform (or request) connection establishment and/or send a capabilities message to or with an eNB.

If a WTRU may change to or from CE mode and/or or may change its CE level, e.g., while in idle mode (or connected mode), the WTRU may connect to an eNB (e.g., RRC connection), e.g., perform an RA procedure to request and/or establish an RRC connection with the eNB where the establishment cause may be mobile originated signaling (mo-signaling).

If a WTRU may change to or from CE mode and/or may change its CE level, e.g., while in idle mode (or connected mode), the WTRU may perform an RA procedure with an eNB (which may be the same or similar procedure as the one for establishing the connection), which may enable the eNB to determine whether or not the WTRU may be in CE mode and/or what level of CE the WTRU may need or use.

If a WTRU may change to or from CE mode and/or or may change its CE level, e.g., while in idle mode (or connected mode), and/or for other reasons, the WTRU may provide CE information (e.g., updated CE information) regarding the WTRU to the eNB and/or MME, for example as part of a WTRU message to the eNB and/or a WTRU message (e.g., NAS message) to the MME (e.g., via the eNB). The WTRU may use one or more messages to convey the CE information to the eNB and/or MME. The WTRU may use a NAS procedure and/or message such as TAU (e.g., in the "TRACKING AREA UPDATE REQUEST" message) to provide CE information or updated information to the MME. The WTRU may use a capabilities message to provide CE information or updated CE information to the eNB.

A WTRU may perform an RA procedure to establish a connection with an eNB.

Following connection establishment, the WTRU may send a NAS message to the MME which may be a TAU message. The message may include an indication of the mode (CE mode or not CE mode) and/or CE level of the WTRU. The WTRU may include the WTRU capability of supporting CE mode in the TAU message. The CE mode support capability may (e.g., may only) be included in an ATTACH message to the MME.

The WTRU may send CE information to the MME in a TAU message (e.g., in the "TRACKING AREA UPDATE REQUEST" message). When the WTRU may send such a message, for example for a reason other than a change of CE information, the WTRU may include all or certain of its CE information, e.g., the WTRU may or may only include the CE information that may have changed since the last time the WTRU may have sent CE information to the MME.

When CE information for a WTRU may change, an eNB may send a message (e.g., an S1AP message) to provide certain (e.g., some or all) of the CE information or at least (or only) the changed information to the MME.

During or after radio link failure (RLF) or recovery from RLF, a WTRU may provide CE information to an eNB and/or MME such as in accordance with one or more of the solutions or examples described herein, for example for a WTRU in idle mode which may have changed CE mode and/or CE level. The WTRU may act as if CE mode and/or CE level may have changed (e.g., even if it or they have not changed), for example, since before RLF or conditions which may have resulted in RLF may have occurred.

Paging may be provided for and/or used by a WTRU or WTRUs that may be in CE mode. When an eNB may page or intend to page a WTRU which may support CE mode, the eNB may not know if the WTRU may currently be in CE mode and/or the eNB may not know the current CE level of the WTRU. This may happen, for example, if the CE information which may be stored by the MME may not include CE mode or CE level information or if such information may be stale.

An eNB may page a WTRU, such as one that may support CE mode, using non-CE paging or using both non-CE paging and CE paging (e.g., simultaneously or sequentially). An eNB may page a WTRU, such as one that may support CE mode, using non-CE paging first and if unsuccessful, then using CE paging. An eNB may page a WTRU, such as one that may support CE mode, using CE paging or only CE paging. An eNB may page a WTRU, such as one that may support CE mode, using CE paging for the worst CE level (e.g., the level which may use the most repetition), e.g., only for the worst CE level. An eNB may page a WTRU, such as one that may support CE mode, using CE paging for one CE level, and if unsuccessful, using CE paging for another (e.g., another higher) or the next (e.g., the next higher) level. An eNB may page a WTRU, such as one that may support CE mode, using CE paging for one or more (e.g., each of the) CE levels (e.g., one at a time or simultaneously), for example, until successful or until the worst level may have failed. An eNB may page a WTRU, such as one that may support CE mode, using CE paging for the last known or stored CE mode and/or CE level of the WTRU, which may be provided to the eNB in a message (e.g., S1-Paging message), e.g., from the MME. An eNB may page a WTRU, such as one that may support CE mode, using CE paging for the CE mode and/or CE level of the WTRU that may be provided to the eNB in a message (e.g., S1-Paging message), e.g., from the MME. Using non-CE paging may include using legacy paging techniques or paging techniques that may be used for WTRUs that may not need or use coverage enhancement. Using CE paging may include paging using coverage enhancement techniques such as repetition. The number of repetitions may be fixed, configured, or a function of the CE level. Using CE paging may include providing a PDSCH carrying PCH or paging without a DCI format.

An eNB that may page a WTRU using both non-CE paging and CE paging may cease the CE paging (e.g., the repetitions of the CE paging) if and/or when it may receive (e.g., successfully receive) a response from the WTRU to the non-CE paging. A response to a page from a WTRU may be or include the transmission of a PRACH preamble and/or at least part of an RA procedure. Successful reception of the response by the eNB may include being able to determine that the response was from the WTRU it may have paged.

An eNB that may page a WTRU using both non-CE paging and CE paging may cease the CE paging (e.g., the repetitions of the CE paging) if and/or when the eNB may receive an indication, e.g., from the MME that the page was successful. An indication that the page was successful may include a request to perform an operation for the WTRU, such as setting up a bearer.

An eNB that may page or intend to page a WTRU (e.g., one that may support CE mode or that the eNB may know may support CE mode), where the eNB may, for example, not know or may be unsure of the (e.g., the current) CE mode and/or CE level of the WTRU, may try paging the WTRU using non-CE paging (e.g., first). If the eNB may not receive (or successfully receive) a response from the WTRU or an indication (e.g., of paging success) from the MME, for example, within a certain amount of time, the eNB may try paging the WTRU using CE paging.

The eNB may try CE paging for one or more CE levels until successful or all fail, or may try the worst CE level (e.g., only). A paging attempt by the eNB, e.g., using non-CE mode or CE mode with a CE level (e.g., a certain CE level), may be in response to a paging request from the MME. The paging request may be provided in an S1 paging message. An MME may provide an indication of lack of success of a paging attempt instead of an indication of success.

An eNB may page a connected mode CE mode WTRU, e.g., using CE mode paging, to inform it of system information changes. The eNB may directly inform these WTRUs of the changes with dedicated signaling.

CE paging may be provided and/or used. A WTRU may monitor PDCCH and/or EPDCCH to determine if there may be PDSCH carrying PCH (or paging message) that may be intended for it. The WTRU may look for a paging RNTI (e.g., P-RNTI) or DCI format masked with (e.g., with a CRC scrambled with) a paging RNTI (e.g., P-RNTI) that may indicate a PDSCH that may carry PCH or a paging message. PCH and paging message may be used interchangeably. Using a RNTI (e.g., a DCI format using a RNTI) may be the same as being masked with (e.g., the DCI format being masked with) the RNTI or having (e.g., the DCI format having) a (or its) CRC scrambled with the RNTI.

A WTRU, such as a coverage limited WTRU, may use, need, and/or combine repetitions of a transmission (e.g., PDCCH, EPDCCH, PDSCH, etc.) to be able to successfully receive and/or decode the transmission. Rules and/or procedures may be used for PDSCH that may carry PCH or a paging message and/or PDCCH (and/or EPDCCH) that may carry a DCI format that may indicate the presence of (or upcoming presence of) a PDSCH that may carry a PCH or paging message.

CE paging may use coverage enhancement techniques such as repetition of the PDCCH and/or EPDCCH that may carry a DCI format that may indicate the presence of (or upcoming presence of) a PDSCH that may carry a PCH or paging message and/or repetition of a PDSCH that may carry a PCH or paging message.

An eNB, such as one that may use CE paging, may transmit PCH in a coverage enhanced manner, for example, when transmitting PCH to a WTRU that may be coverage limited. A WTRU, such as a coverage limited WTRU that may use or respond to CE paging, may receive PCH in a coverage enhanced manner. CE paging may include transmission and/or reception of PCH in a coverage enhanced manner.

CE paging and/or transmission and/or reception of PCH in a coverage enhanced manner may include transmission of repetitions of PCH, which may include transmission of repetitions of a PDSCH that may carry PCH and/or transmission of repetitions of the associated PDCCH and/or EPDCCH. CE paging and/or transmission and/or reception of PCH in a coverage enhanced manner may include reception and/or combining of repetitions of PCH, which may include reception of and/or combining repetitions of the PDSCH that may carry PCH and/or reception of and/or combining repetitions of the associated PDCCH and/or EPDCCH. CE paging and/or transmission and/or reception of PCH in a coverage enhanced manner may include transmission of an RNTI for the PCH PDCCH and/or EPDCCH, e.g., legacy P-RNTI or an RNTI, e.g., PCE-RNTI, which may be specific to coverage limited WTRUs, for example, of a coverage enhancement level (e.g., of a certain CE level). CE paging and/or transmission and/or reception of PCH in a coverage enhanced manner may include monitoring and/or reception of an RNTI for the PCH PDCCH and/or EPDCCH, e.g., legacy P-RNTI or an RNTI, e.g., PCE-RNTI, which may be specific to coverage limited WTRUs, for example, of a coverage enhancement level (e.g., of a certain CE level).

A WTRU and/or eNB (such as a WTRU and/or eNB that may use CE paging) may transmit repetitions of PCH, which may include transmitting repetitions of a PDSCH that may carry PCH and/or transmitting repetitions of the associated PDCCH and/or EPDCCH. A WTRU and/or eNB (such as a WTRU and/or eNB that may use CE paging) may receive and/or combine repetitions of PCH, which may include receiving and/or combining repetitions of the PDSCH that may carry PCH and/or receiving and/or combining repetitions of the associated PDCCH and/or EPDCCH. A WTRU and/or eNB (such as a WTRU and/or eNB that may use CE paging) may transmit an RNTI for the PCH PDCCH and/or EPDCCH, e.g., legacy P-RNTI or an RNTI, e.g., PCE-RNTI, which may be specific to coverage limited WTRUs, for example, of a coverage enhancement level (e.g., of a certain CE level). A WTRU and/or eNB (such as a WTRU and/or eNB that may use CE paging) may monitor and/or receive an RNTI for the PCH PDCCH and/or EPDCCH, e.g., legacy P-RNTI or an RNTI, e.g., PCE-RNTI, which may be specific to coverage limited WTRUs, for example, of a coverage enhancement level (e.g., of a certain CE level).

P-RNTI or another RNTI may be used for PDCCH and/or EPDCCH associated with PDSCH that may carry PCH, for example, for PCH intended for a WTRU that may be coverage limited and/or bandwidth limited.

PDCCH and/or EPDCCH associated with PDSCH that may carry PCH may be located in a common search space (e.g., PDCCH common search space and/or EPDCCH common search space), for example, for PCH that may be intended for a WTRU that may be coverage limited and/or bandwidth limited.

A WTRU, such as one that may be coverage limited, may begin monitoring for the PDCCH and/or EPDCCH associated with PDSCH that may carry PCH at the start of its DRX cycle (e.g., the first subframe of its DRX cycle). The WTRU may monitor for PDCCH and/or EPDCCH using P-RNTI or PCE-RNTI or a PCE-RNTI for its CE level (e.g., current CE level).

An eNB may transmit a PCH PDSCH in a fixed, known, or determined location and/or with one or more fixed, known, or determined parameters (e.g., transmission parameters such as MCS) such that a DCI format may not be required or used, e.g., for a PCH PDSCH that may be intended for a WTRU (or at least a WTRU) that may be bandwidth limited and/or coverage limited. The fixed, known, or determined location and/or parameters may be provided by the eNB in signaling, such as broadcast signaling (e.g., in system information). PCH PDSCH may be used to represent a PDSCH which may carry PCH.

The location and/or one or more transmission parameters of a PCH PDSCH that may be intended for a WTRU (or at least a WTRU) that may be bandwidth limited and/or coverage limited may be a function of a capability (or reduced capability) of the WTRU. For example, PCH PDSCH location and/or one or more PCH PDSCH transmission parameters may be a function of one or more of CE mode, CE level, and/or BW limitation. The capability (or reduced capability) of the WTRU, such as the CE mode and/or CE level and/or BW limitation of the WTRU, may determine (or may be used by the WTRU and/or eNB to determine) the location (e.g., subframes and/or RBs) and/or one or more transmission parameters (e.g., MCS) for the PCH PDSCH that may be intended for a WTRU (or at least a WTRU) that may be bandwidth limited and/or coverage limited. The eNB may transmit and/or the WTRU may receive or attempt to receive the PCH PDSCH in the determined location.

Determination of the location and/or transmission parameter(s) of a PCH PDSCH that may be intended for a WTRU (or at least a WTRU) that may be bandwidth limited and/or coverage limited, e.g., by the WTRU and/or eNB, may be based at least in part on configuration (e.g., of PCH PDSCH location and/or parameters) for one or more capabilities (or reduced capabilities, such as CE mode or level), which may be provided by the eNB via signaling, such as broadcast signaling. Determination of the location and/or transmission parameter(s) of a PCH PDSCH that may be intended for a WTRU (or at least a WTRU) that may be bandwidth limited and/or coverage limited, e.g., by the WTRU and/or eNB, may be based at least in part on a WTRU parameter or identifier, such as the WTRU IMSI or WTRU ID.

Location (e.g., of a PCH PDSCH) may be or may include time (e.g., subframe, set of subframes, or pattern of subframes) and/or frequency (e.g., one or more RBs).

A PCH or PCH PDSCH may be or may represent an instance or repetition of a PCH or PCH PDSCH. Repetitions of a PCH or PCH PDSCH that may be combined by a WTRU, such as a WTRU that may be coverage limited, may be in the same or different locations (e.g., subframes may be different and RBs may be the same or different) and/or may use the same or different parameters.

A WTRU, such as a bandwidth limited and/or coverage limited WTRU, may monitor for, receive, or attempt to receive PCH PDSCH, e.g., from an eNB. The WTRU and/or the eNB may determine the location of an PCH PDSCH that may be intended for the WTRU (or at least the WTRU) based at least in part on configuration, e.g., of the relationship or correspondence between PCH PDSCH location and/or parameters and WTRU capability or reduced capability, which may be provided by the eNB via signaling, such as broadcast signaling.

One or more PCH (or PCH PDSCH) transport block sizes may be configured or fixed and may correspond to a certain number of pages (e.g., to a certain number of WTRUs). Padding may be used, for example, when the number of pages (e.g., actual pages) may be less than the number of pages (e.g., the certain number of pages) that may correspond to a fixed or configured transport block size (TBS). TBS configuration may be by signaling, such as broadcast signaling, which may be from the eNB. There may be a separate PCH (or PCH PDSCH) TBS value (e.g., fixed or configured) for one or more CE levels. There may be one or more PCH (or PCH PDSCH) TBS values for PCH (or PCH PDSCH) that may be intended for (e.g., at least for) a coverage limited and/or bandwidth limited WTRU. A WTRU such as a WTRU that may be coverage limited and/or bandwidth limited may receive or may expect to receive a PCH (or PCH PDSCH) with a fixed or configured TBS. An eNB may transmit a PCH (or PCH PDSCH) that may be intended for (e.g., at least for) a WTRU that may be coverage limited and/or bandwidth limited with a fixed or configured TBS.

There may be N CE levels, and there may be PCH PDSCH resources (e.g., separate PCH PDSCH resources) for each of the N CE levels. An eNB may transmit and/or a WTRU may receive or may expect to receive a PCH PDSCH in certain time and/or frequency resources (e.g., subframes and/or RBs) that may correspond to the CE mode or level of the WTRU.

One or more (e.g., a set of) PCH (or PCH PDSCH) transport block (TB) sizes (e.g., possible or candidate TB sizes) may be fixed or configured (e.g., by the eNB) and/or determined (e.g., by the WTRU). A WTRU may try one or more of the TB sizes (e.g., in the set of TB sizes) to try to successfully receive the PCH (or PCH PDSCH), for example, when monitoring for and/or attempting to receive PCH (or PCH PDSCH).

One or more (e.g., a set of) PCH (or PCH PDSCH) candidates may be fixed or configured (e.g., by the eNB) and/or determined (e.g., by the WTRU). The PCH (or PCH PDSCH) candidates may differ in one or more characteristics that may include time (e.g., subframe), frequency (e.g., RBs), TB size, and one or more transmission parameters, such as MCS. A WTRU may try one or more of the PCH (or PCH PDSCH) candidates to try to successfully receive the PCH (or PCH PDSCH), for example, when monitoring for and/or attempting to receive PCH (or PCH PDSCH).

PDCCH (and/or EPDCCH) may be repeated a number of times, e.g., M times, for example, for CE paging. The same PDCCH may be repeated (e.g., for one or more (e.g., each) of the M times) and one or more (e.g., each of the) repetitions may be located in the same place in a search space such as a common search space (CSS), e.g., a PDCCH and/or EPDCCH CSS.

There may be a gap of G (e.g., 0 or greater) that may follow the PDCCH (and/or EPDCCH) repetitions. G may be or may include a number of subframes (or certain subframes such as POs) and/or frames (or certain frames, such as PFs).

The corresponding PDSCH (e.g., PCH PDSCH) may follow after the gap and/or may be repeated P times. M may or may not equal P. One or more of M, G, and P may be a function of a CE level (e.g., the CE level determined for the WTRU to be paged or the worst case CE level). M and/or G may be zero, for example, if no DCI format may be used or needed for paging (e.g., CE paging).

An eNB may transmit the repetitions of the PDCCH (and/or EPDCCH) and/or the PDSCH in certain subframes and/or frames such as POs and/or PFs.

An eNB may transmit the repetitions of the PDCCH (and/or EPDCCH) and/or the PDSCH in certain subframes such as designated or configured subframes and/or subframes which may be DL (e.g., any DL) subframes and/or certain (e.g., all) special subframes (e.g., for TDD).

The subframe of the first PDSCH (e.g., of a set of P repetitions of a PDSCH) that may carry a page (e.g., PCH) for a WTRU, such as a CE mode WTRU, may align with POs and/or PFs and/or may be related to the timing of the PDCCH.

To page a WTRU, the eNB may transmit a first transmission (or repetition) of a PDCCH (and/or EPDCCH) and/or PDSCH (e.g., PCH PDSCH) according to the starting PO of the WTRU, which may be determined in a same or similar manner to which a PO may be determined by or for a legacy WTRU or according to another rule or calculation.

Following the first transmission of a PDCCH (and/or EPDCCH) and/or PDSCH (e.g., PCH PDSCH), which may be in a (e.g., a certain) PO (e.g., a starting PO) and/or a (e.g., a certain) PF (e.g., a starting PF), one or more (e.g., each) of the next of the M or P repetitions may be transmitted by the eNB in the next PO (e.g., each of the next M, M-1, P or P-1 POs). A next PO may be in the same or the next PF as a previous PO.

Following the first transmission of a PDCCH (and/or EPDCCH) and/or PDSCH (e.g., PCH PDSCH), which may be in a (e.g., a certain) PO (e.g., a starting PO) and/or a (e.g., a certain) PF (e.g., a starting PF), one or more (e.g., each) of the next of the M or P repetitions may be transmitted by the eNB in the same PO as the previous transmission in the next PF.

Following the first transmission of a PDCCH (and/or EPDCCH) and/or PDSCH (e.g., PCH PDSCH), which may be in a (e.g., a certain) PO (e.g., a starting PO) and/or a (e.g., a certain) PF (e.g., a starting PF), one or more (e.g., each) of the next of the M or P repetitions may be transmitted by the eNB in the next subframe (e.g., each of the next M, M-1, P or P-1 subframes) that may be DL.

Following the first transmission of a PDCCH (and/or EPDCCH) and/or PDSCH (e.g., PCH PDSCH), which may be in a (e.g., a certain) PO (e.g., a starting PO) and/or a (e.g., a certain) PF (e.g., a starting PF), one or more (e.g., each) of the next of the M or P repetitions may be transmitted by the eNB in the next subframe (e.g., each of the next M, M-1, P or P-1 subframes) that may be either a DL or special subframe where special subframes may apply (e.g., only apply) for TDD.

Following the first transmission of a PDCCH (and/or EPDCCH) and/or PDSCH (e.g., PCH PDSCH), which may be in a (e.g., a certain) PO (e.g., a starting PO) and/or a (e.g., a certain) PF (e.g., a starting PF), one or more (e.g., each) of the next of the M or P repetitions may be transmitted by the eNB in the next designated or configured subframe, which may be for this purpose. The subframe configuration may be provided via signaling, such as broadcast signaling, for example, in system information. System information may be provided in one or more SIBs.

Whether or not a subframe may be a DL subframe or a special subframe may be determined according to the cell specific TDD UL/DL configuration of the cell, which may be broadcast by the cell in system information (e.g., in SIB 1).

The POs and/or PFs that may be used for CE paging and (e.g., at least) non-CE paging (e.g., legacy paging) may be the same or different. The POs and/or PFs that may be used for CE paging may be configured and/or determined separately from the POs and/or PFs that may be used for (e.g., at least) non-CE (e.g., legacy) paging.

A WTRU, such a WTRU that may be coverage limited, may look for a page using non-CE paging and may use CE paging if non-CE paging may not be successful. For example, the WTRU may monitor for PDCCH which may be masked by P-RNTI in a PO that may be determined according to a legacy calculation. If the WTRU may successfully receive a P-RNTI in this manner and/or a corresponding PDSCH in the PO subframe, the WTRU may not use CE paging, e.g., it may not monitor for repeated PDCCH and/or EPDCCH and/or PDSCH. The WTRU may determine if a PCH it may have received in the PO may be intended for it and, if so, may respond to the page accordingly.

A WTRU, such a WTRU that may be coverage limited, may determine, e.g., for its paging cycle, one or more of a starting subframe, a starting PF, and/or a starting PO. Such determination may be in a same or similar manner to which a PO may be determined by or for a legacy WTRU or according to a new rule or calculation.

The starting subframe or starting PO for a page or paging cycle for a CE mode WTRU may be the subframe or PO for or of the first transmission of the PDCCH (and/or EPDCCH) of the M repetitions of the channel. The starting subframe or starting PO for a page or paging cycle for a CE mode WTRU may be the subframe or PO for or of the first transmission of the PCH PDSCH of the P repetitions of the channel.

A WTRU, such as a WTRU that may be coverage limited, may look for a page using CE paging. According to the subframes in which the starting PO and the M repetitions of the PDCCH (and/or EPDCCH) may be (e.g., as described for eNB transmission), the WTRU may monitor PDCCH (and/or EPDCCH) in those subframes and may combine the signals from those subframes or a subset of those subframes into one PDCCH (and/or EPDCCH) that it may attempt to decode and/or for which it may determine if it may be masked with a paging RNTI such as P-RNTI or PCE-RNTI.

If the WTRU may determine that there may be a page for the WTRU, for example, if the PDCCH (and/or EPDCCH) was or was determined by the WTRU to be masked with a paging RNTI (e.g., P-RNTI or PCE-RNTI), the WTRU may begin to receive the corresponding P repetitions of PDSCH.

The WTRU may skip a certain number of subframes and/or frames from the last of the M repetitions to the first of the P repetitions, which may be according to G.

A WTRU may not monitor for PDCCH and/or EPDCCH in order to receive a PCH PDSCH. According to the subframes in which the starting PO and the P repetitions of the PCH PDSCH may be (e.g., as described for eNB transmission), the WTRU may monitor for PDSCH (e.g., PCH PDSCH) in those subframes and may combine the signals from those subframes or from a subset of those subframes into one PDSCH, which it may attempt to decode and/or receive. The WTRU may monitor for the PCH PDSCH in a known or determined location or locations and/or using one or more known and/or determined parameters of PCH PDSCH. The WTRU may monitor for one or more PCH PDSCH candidates.

The WTRU may receive the P repetitions or a subset of the P repetitions of the PDSCH or PDSCH candidates and may combine them (or one or more, e.g., each set of repetitions) to a single PDSCH from which it may attempt to (e.g., successfully) receive and/or decode a PCH. If the WTRU may (e.g., successfully) receive and/or decode the PCH, the WTRU may determine if the PCH was intended for the WTRU and, if so, the WTRU may respond to the page.

One or more of M, G, and P may be a function of a CE level (e.g., the CE level of the WTRU or the worst case CE level).

Worst case CE level may be the worst or highest CE level supported by the cell or eNB (e.g., the CE level with the highest number of repetitions) which may be indicated in cell-specific signaling, e.g., broadcast signaling such as via a physical broadcast channel (e.g., MIB) or higher layer signaled system information (e.g., SIB).

G and/or P may be indicated in the PDCCH (and/or EPDCCH), which may be masked by a paging RNTI such as P-RNTI or PCE-RNTI. G and/or P may be indicated in the PDCCH (and/or EPDCCH), which may correspond to the paging PDSCH, which may be repeated P times.

The subframes of the repetitions and/or the gap may not be consecutive subframes. The subframes of the repetitions and/or the gap may be PO subframes or other particular or designated subframes. The PO subframes may be the PO subframes of a WTRU, such as any WTRU or of a certain WTRU, such as a WTRU for which a page may be intended.

For example, the repeated PDCCHs (and/or EPDCCHs) and/or PDSCHs that may be used by CE mode WTRUs (and or eNBs for CE paging) may occur in subframes that may be possible paging occasions (POs). For FDD, PO subframes may be certain subframes, such as subframes 0, 4, 5, and 9, for example. Depending on configuration (e.g., by the eNB), the subsets of subframes for POs may be certain subsets, such as [9], [4,9], or [0,4,5,9], for example. For TDD, the PO subframes may be certain subframes, such as subframes 0, 1, 5, and 6, for example. Depending on configuration (e.g., by the eNB), the subsets of subframes for POs may be certain subsets, such as [0], [0,5], or [0,1,5,9], for example.

A starting subframe of a PO or a starting PO may be in a PF. One or more repetitions of an EPDCCH and/or PDSCH for paging may not be in a PF. One or more of the PDCCHs, EPDCCHs, and/or PDSCHs that may be used for paging may be transmitted and/or received in subframes that may be identified by configuration as subframes that may be used for paging. The configuration may be provided via signaling, such as broadcast signaling, for example, in system information. The system information may be provided, for example, in one or more system information blocks (SIBs).

A downlink (DL) control channel may be used for paging. For example, an (E)PDCCH common search space (CSS) may include one or more (E)PDCCH candidates and may be configured for paging. A WTRU, such as a WTRU that may be bandwidth limited and/or coverage limited, may decode and/or monitor one or more (E)PDCCH candidates in the (E)PDCCH CSS to receive a DCI that may be masked by a paging RNTI, such as P-RNTI or PCE-RNTI. One or more (E)PDCCH candidates may be transmitted in a time and/or frequency location known to a WTRU that may monitor or may need to monitor or receive the (E)PDCCH candidates. CSS may be used as a non-limiting example of a search space. The time and/or frequency location of the (E)PDCCH CSS and/or (E)PDCCH candidate or candidates and/or one or more parameters that may enable monitoring and/or decoding of the (E)PDCCH CSS and/or (E)PDCCH candidate or candidates may be provided or configured via signaling, such as broadcast signaling that may be received and/or used by the WTRU. Another search space may be used and may be consistent with the disclosed subject matter.

Candidates, resources, and PRBs, such as (E)PDCCH candidates, (E)PDCCH resources, and (E)PDCCH PRBs may be used interchangeably or substituted for each other and still be consistent with this disclosure. PRBs and RBs may be used interchangeably.

The term (E)PDCCH may represent EPDCCH and/or PDCCH. The term (E)CCE may represent a control channel element (CCE) and/or an enhanced control channel element (ECCE).

An (E)PDCCH candidate may be, may have, and/or may include a combination of an (E)CCE aggregation level and a number of repetitions. For example, an (E)PDCCH candidate may include the (E)CCE aggregation level $N_{AL}$ and the number of repetitions $N_{REP}$. A total aggregation level (TAL) may correspond to a total number of (E)CCEs that may belong to an (E)PDCCH candidate. The number of (E)CCEs for the total aggregation level $N_{TAL}$ may be determined as a function of $N_{AL}$ and $N_{REP}$. For example, $N_{TAL}$ may be the product of $N_{AL}$ and $N_{REP}$.

An (E)PDCCH candidate that may have a larger total aggregation level ($N_{TAL}$) may support a higher CE level than an (E)PDCCH candidate that may have a smaller total aggregation level. A higher CE level may provide more or better coverage enhancement than a lower CE level. For example, a higher CE level may provide better signal strength at a receiver than a lower CE level.

Two or more (E)PDCCH candidates may be configured with a different total aggregation level, for example, to support two or more CE levels. A WTRU may monitor and/or decode a subset of the (E)PDCCH candidates that may be configured. The subset may include one or more (e.g., all) of the (E)PDCCH candidates that may be configured. A WTRU may monitor and/or decode an (E)PDCCH candidate to receive a DCI that may be masked with an RNTI, such as a paging RNTI.

A WTRU may monitor and/or decode one or more, e.g., all, (E)PDCCH candidates that may be configured, regardless of a CE level used, configured, and/or determined for or by the WTRU.

For (E)PDCCH candidate monitoring, the WTRU may start from an (E)PDCCH candidate with a first, e.g., smallest total aggregation level. The WTRU may move to an (E)PDCCH candidate with a second, e.g., larger total aggregation level if the WTRU does not receive a DCI that may be masked with a paging RNTI in the first total aggregation level. The WTRU may move or continue to move to another, e.g., larger total aggregation level until it reaches a maximum total aggregation level if the WTRU does not receive a DCI that may be masked with a paging RNTI in a total aggregation level (e.g., a certain total aggregation level). The WTRU may stop monitoring (E)PDCCH candidates and may not move to a next or another total aggregation level if the WTRU receives a DCI that may be masked with a paging RNTI in a total aggregation level, e.g., a certain total aggregation level.

A WTRU may monitor a subset of (E)PDCCH candidates configured based on the CE level used, configured, and/or determined for or by the WTRU. A paging RNTI that may be associated with a certain subset of (E)PDCCH candidates may be determined based on the CE level. A WTRU may monitor and/or decode one or more (E)PDCCH candidates in the subset of (E)PDCCH candidates to receive a DCI that may be masked with the paging RNTI associated with the CE level used, configured, and/or determined for or by the WTRU.

The WTRU may determine and/or use a first CE level or a number of repetitions for monitoring and/or decoding an (E)PDCCH candidate, for example, to receive a DCI that may be a paging DCI or a DCI that may be masked by a paging RNTI. The WTRU may determine and/or use a second CE level or number of repetitions for reception of a PDSCH that may carry a paging channel or paging message or paging information. A CE level may be associated with or configured to correspond to a number of repetitions, for example, via signaling from an eNB, such as via broadcast signaling. CE level and number of repetitions may be used interchangeably. The first and second CE levels may be the same or different. The first and/or second CE levels may be determined by the WTRU.

A WTRU may determine a CE level or CE levels (e.g., the first and/or second CE levels), which may be used or configured for or by the WTRU, for example, for one or more aspects of paging reception. For example, a WTRU may determine one or more CE levels (e.g., for one or more aspects of paging reception) based on a latest or most recent CE level used by or known to the WTRU and/or based on one or more of known, measured, and/or signaled values or information. The determined CE level (or levels) may be specific to paging (e.g., to one or more aspects of paging reception) or may be applicable to other procedures or purposes rather than or in addition to paging (or paging reception). Paging reception aspects may include, but are not limited to, one or more of: monitoring and/or decoding one or more (E)PDCCH candidates, receiving a paging DCI, and/or receiving a PDSCH carrying a paging channel or paging message or paging information.

A CE level that may be determined and/or used by the WTRU (e.g., for at least one or more aspects of paging reception) may be or may be based on the latest CE level stored at an MME for the WTRU. The CE level for the WTRU may be signaled from an eNB, such as the serving eNB of the WTRU to the MME. The CE level that may be determined and/or used by the WTRU may be (or may be based on) the latest CE level used (e.g., by the WTRU) for a successful reception of a DCI that may be masked with one or more of a paging RNTI, a system information RNTI, and/or a RA-RNTI, or the like. The CE level that may be determined and/or used by the WTRU may be (or may be based on) the latest CE level used (e.g., by the WTRU) for a successful reception of a DL channel (e.g., from its serving cell or the cell on which it is camped), such as a PDSCH carrying broadcast information (e.g., a SIB), a PDSCH carrying a paging channel or paging message or paging information, a PDSCH carrying a RAR, and/or PBCH.

A CE level that may be determined and/or used by the WTRU (e.g., for at least one or more aspects of paging reception) may be (or may be based on) the CE level associated with a downlink measurement (e.g., RSRP and/or RSRQ), for example, made by the WTRU. The downlink measurement may be or correspond to a current or most recent downlink measurement. The measurement may be a filtered measurement.

A CE level that may be determined and/or used by the WTRU (e.g., for at least one or more aspects of paging reception) may be (or may be based on) a CE level that may be indicated from broadcast signaling and/or a broadcasting channel, e.g., SIB, MTC-SIB, LC-SIB, MIB, and/or PBCH. For example, the CE level that may be determined and/or used by the WTRU may be (or may be based on) a paging CE level (e.g., a CE level for paging) that may, for example, be indicated from broadcast signaling and/or a broadcasting channel, e.g., SIB, MTC-SIB, LC-SIB, MIB, and/or PBCH. The broadcast CE level may be used (e.g., for paging) for and/or by some or all WTRUs. For example, the broadcast CE level may be used (e.g., for paging) for and/or by one or more of: one or more (e.g., all) WTRUs in CE mode, one or more (e.g., all) WTRUs that support CE mode, one or more (e.g., all) WTRUs of a certain WTRU type or category (e.g., low cost WTRU), and/or one or more (e.g., all) WTRUs that have a certain capability or reduced capability (e.g., reduced bandwidth WTRU).

A CE level that may be determined and/or used by the WTRU (e.g., for at least one or more aspects of paging reception) may be (or may be based on) the maximum CE level supported by the cell from which the WTRU may receive paging (e.g., the cell on which the WTRU may be camped in idle mode). The maximum CE level supported by the cell may be provided in signaling, such as broadcast signaling (e.g., SIB, MIB, and/or PBCH). The WTRU may receive and/or use the signaling to determine the maximum CE level and/or the CE level for paging.

The WTRU may use the determined CE level to determine the number of aggregation levels and/or the number of repetitions to use for one or more (E)PDCCH candidates that the WTRU may monitor and/or decode to receive a paging DCI. The WTRU may monitor and/or decode one or more (E)PDCCH candidates according to the determined number of aggregation levels and/or the number of repetitions, for example, to receive a paging DCI.

One or more (E)PDCCH candidates may be configured with a total aggregation level, e.g., a same total aggregation level. The total aggregation level may correspond to a CE level, e.g., a maximum CE level supported in the cell, such as the maximum CE level supported in the cell for paging.

The time and/or frequency location of the (E)PDCCH candidate or candidates may be known to a WTRU, such as a WTRU that may support enhanced coverage mode and/or that may be in enhanced coverage mode. For example, the configuration of the (E)PDCCH candidate or candidates may be signaled from broadcast signaling and/or a broadcasting channel (e.g., MIB and/or MTC-SIB).

Enhanced coverage and coverage enhanced may be used interchangeably. Enhanced coverage mode and coverage enhanced mode may be used interchangeably. Enhanced coverage level and coverage enhanced level mode may be used interchangeably.

For an (E)PDCCH candidate or candidates with M repetitions, the (E)PDCCH candidate or candidates may be transmitted and/or received in M subframes. The M subframes may be M consecutive subframes or M consecutive DL subframes. The M subframes may be M consecutive subframes within the set of subframes that may be used for paging. The subframes that may be used for paging may be signaled (e.g., via broadcast signaling such as via a SIB) or known. For a WTRU, the first of the M subframes may correspond to the WTRU's Paging Occasion, which may be a function of the WTRU-ID. The WTRU may combine the M repetitions to decode the (E)PDCCH candidate or candidates. The WTRU may combine a subset of the M repetitions, e.g., S repetitions or the first S of the M repetitions, to decode the (E)PDCCH candidate or candidates. The WTRU may combine repetitions until it successfully decodes the (E)PDCCH candidate or candidates or until it combines all M repetitions. If the WTRU combines all M repetitions and does not successfully receive a DCI (e.g., for paging), the WTRU may determine there is no page or no page for the WTRU, for example, for the current paging cycle. If the WTRU successfully receives the DCI, the WTRU may receive or may attempt to receive the corresponding PDSCH, which may carry a paging message. Reception of a PDSCH may include receiving and/or combining repetitions of the PDSCH.

The frequency location of the (E)PDCCH candidate or candidates for paging may be determined as a function of one or more of a WTRU-ID (e.g., IMSI) and/or a physical cell ID (PCI).

The frequency location of the (E)PDCCH candidate or candidates for paging may be determined as a function of the configuration of one or more downlink subbands, which may be configured for LC-MTC and/or enhanced coverage. A subband may correspond to a set of consecutive PRBs (e.g., six consecutive PRBs) located within a system bandwidth. When multiple subbands are configured, the subbands may be partially or fully overlapped. The subbands may be mutually orthogonal in the frequency domain. One or more subbands may be used for an (E)PDCCH candidate or candidates for paging. The subband that may be used for or by a WTRU may be a function of one or more of WTRU-ID, PCI, and/or DL system bandwidth.

Subband configuration, e.g., for an (E)PDCCH candidate or candidates and/or PDSCH for paging may be provided (e.g., by a cell or eNB) in signaling such as broadcast signaling, for example in system information (e.g., in one or more SIBs).

A WTRU may determine a subband to use for an (E)PDCCH candidate or candidates and/or PDSCH for paging from one or more of a subband configuration provided, a number of subbands configured, paging cycle, PF, PO, SFN, PCI, DL system bandwidth, and/or WTRU-ID. The WTRU may determine the subband to use for a PO, a starting subframe of a PO, and/or a subframe corresponding to a repetition of an (E)PDCCH candidate and/or PDSCH of a PO. The frequency location of the (E)PDCCH candidate or candidates for paging may be predefined or known. A certain subband index (e.g., the first subband) may be used for an (E)PDCCH candidate or candidates for paging if one or more downlink subbands are configured. A starting PRB index for the paging subband may be defined or determined as a function of one or more of downlink system bandwidth, subframe number, frame number, physical cell ID, and/or WTRU-ID. WTRU-ID may be a WTRU IMSI.

For purposes of description and explanation, the terms paging channel, paging message, and paging information may be used interchangeably.

A PDSCH may carry a paging message. A PDSCH carrying a paging message (e.g., PCH) for a WTRU that supports or that may be in enhanced coverage mode may be scheduled from an associated (E)PDCCH. A WTRU may monitor or decode a DCI that may be masked with a paging RNTI from the associated (E)PDCCH. The paging message may be intended for a single WTRU or multiple WTRUs. The paging message may include a system information modification indication. The DCI may include the system information modification indication. For example, a bit or bit field in the DCI may indicate whether the system information has been changed or will be changed (e.g., at the start of the next system information modification period). The bit or bit field may be or include an indication of yes or no or an indication of true or false. The bit field may be or may be used for a value tag, e.g., systemInfoValueTag.

The DCI may carry one or more of the following information. The DCI may carry a frequency location of the PDSCH (e.g., subband index or starting PRB). The DCI may carry a time location of the PDSCH (e.g., a starting subframe location). The DCI may carry TBS or TBS candidates. The DCI may carry a modulation order. The DCI may carry the repetition number of the associated PDSCH (e.g., P).

A WTRU may decode and/or receive the PDSCH if the WTRU receives a DCI that may be masked with a paging RNTI. The paging RNTI may be intended for the WTRU. A paging RNTI may be intended for a WTRU if it is intended for a WTRU or WTRUs of a certain type and the WTRU is of that type. For example, the paging RNTI may be intended for WTRUs supporting or in coverage enhanced mode.

A paging RNTI, for example, for a WTRU of a certain type, may be a function of one or more of a paging cycle, PF, PO, the number of POs per PF, SFN, WTRU-ID, and/or the number of repetitions that may be used for the (E)PDCCH candidates for paging. This may enable repetitions of a DCI beginning in the subframe of a first PO to be repeated in the subframe of a second PO (e.g., in the same frame) without confusing WTRUs that may be looking for a DCI beginning in the second PO.

The PDSCH may be transmitted repetitively over multiple subframes (e.g., P subframes). The P subframes may be continuous or consecutive within the subframes used for paging transmission. The P subframes may be discontinuous within the subframes used for paging transmission.

One or more P values may be used to support one or more CE levels. For example, P={N1, N2, N3} may be used, where P values are positive integer numbers and N1<N2<N3. A different P value may be used according to the CE level. The P values may be predefined, e.g., for each CE level supported by the cell. The P values, e.g., for each CE level supported by the cell, may be indicated from a broadcasting channel (e.g., SIB). The CE level or the P value that may be used for transmission of the PDSCH carrying a paging message may be indicated from (or by) the associated (E)PDCCH (e.g., in the DCI). Three values of P are used for exemplary purposes. Another value may be used and still be consistent with this disclosure.

A starting subframe for a PDSCH carrying a paging message, for example, in a paging cycle or corresponding to a PO, may be the same regardless of the P value. For example, the PDSCH with P=N1 and the PDSCH with P=N2 may have the same starting subframe. The end subframe may be different.

A WTRU may start to receive the PDSCH with a smallest P value (e.g., N1) and may move to a next level (e.g., a next highest P value, N2) if the WTRU fails to receive the PDSCH carrying the paging message until it may reach a maximum P value (e.g., N3). The WTRU may stop combining repetitions if it successfully receives the PDSCH prior to combining all P repetitions of a level (e.g., N1, N2, or N3).

A WTRU may receive the PDSCH with a corresponding P value indicated from the associated (E)PDCCH. A WTRU may receive the PDSCH by combining repetitions up to the P value indicated from the associated (E)PDCCH. The WTRU may stop combining repetitions if it successfully receives the PDSCH prior to combining all P repetitions. A WTRU may receive the PDSCH with a P value associated with a current CE level, which may be determined based on a downlink measurement.

Each P value may be associated with a certain (e.g., separate, unique, or different) paging RNTI. A WTRU may implicitly determine the P value from the paging RNTI when the WTRU receives a DCI that may be masked with a certain paging RNTI. For example, a first P-RNTI may be associated with a first P value (e.g., N1) and a second P-RNTI may be associated with a second P value (e.g., N2), and so on. When checking for a page, e.g., in a PO or its PO, a WTRU may check for a CRC scrambled with one or more of the P-RNTIs. If such a CRC is found, the WTRU may use that P-RNTI to determine the P value with which the PDSCH may be transmitted. The association may be between a P-RNTI and a CE level. The CE level may be associated with the P value. One or more of the associations may be predefined, known, or provided in signaling, such as broadcast signaling. The paging RNTI for each CE level for paging may be a function of the number of CE levels (or the maximum CE level) supported by the eNB or cell. The WTRU may determine the paging RNTI for each CE level based on the number of CE levels (or the maximum CE level) supported by the eNB or cell which may be provided via broadcast signaling such as in a MIB (e.g., PBCH) or SIB.

A starting subframe of a PDSCH carrying a paging message (e.g., if the PDSCH is transmitted over P subframes repetitively) may be determined as a function of the last subframe of the associated (E)PDCCH. For example, if the last subframe of the associated (E)PDCCH is the subframe n, the starting subframe may be the subframe n+k, where k may be, for example, a gap value G. The subframe n may be the last subframe of a certain (E)PDCCH candidate. If a different number of repetitions is used for two or more (E)PDCCH candidates, the subframe n may be different according to the (E)PDCCH candidate. The subframe n may be the last subframe of an (E)PDCCH candidate that may have a largest number of repetitions. The value of n may be the same regardless of the (E)PDCCH candidate in which a WTRU may receive a DCI that may be masked with a paging RNTI or that may carry a scheduling information of the PDSCH. The value of k may be determined based on the (E)PDCCH candidate and/or the number of repetitions for an (E)PDCCH candidate.

(E)PDCCH carrying a DCI masked or scrambled with a P-RNTI that may be intended for a WTRU that may be in CE mode may be transmitted with M repetitions. The value of M may be independent of the CE level of the WTRU. The WTRU may combine one or more repetitions of the EPDCCH up to the maximum of M repetitions to attempt to receive a DCI scrambled with a P-RNTI, e.g., beginning in its PO. The DCI may implicitly or explicitly identify the number of repetitions, P, with which the PDSCH carrying the PCH may be transmitted. If the WTRU successfully receives the DCI, the WTRU may receive and/or may combine up to P repetitions of the PDSCH to receive the page. If the WTRU successfully receives the page and the page is intended for the WTRU (or the WTRU determines that a page intended for the WTRU is included in the paging message), the WTRU may respond, for example, by performing a random access procedure and/or requesting connection establishment for an incoming call. If the WTRU does not successfully receive the DCI, the WTRU may assume there is no page for the WTRU and the WTRU may sleep, for example, until its next PO. If the WTRU successfully receives the DCI and the value of P is lower than what the WTRU determines it needs to receive the PDSCH, the WTRU may not attempt to receive the PDSCH, for example, in order to save battery power. If the WTRU successfully receives the DCI and does not successfully receive the PDSCH after combining the P repetitions, the WTRU may determine its CE level to be higher than that which uses P repetitions and may save that information for use for a next or later PO.

A WTRU, such a WTRU in coverage enhancement mode, may receive (E)PDCCH carrying a DCI masked or scrambled with an RNTI such as a paging RNTI (e.g., P-RNTI, PCE-RNTI, or another RNTI). The DCI may include an indication that system information (e.g., one or more SIBs) has changed or will change. The indication may be in the form of a bit or bit field. The indication may have a value of True to indicate system information has changed or will change. The indication may be, for example, in the form of a value or a value tag that the WTRU may compare to a previously stored value or value tag. If the value or value tag is different from the previous or stored value tag, the WTRU may understand or infer that one or more SIBs has changed or will change. If the DCI includes an indication (e.g., a positive indication) regarding or related to system information change, there may not be a PDSCH associated with the DCI and/or the WTRU may not receive or attempt to receive a PDSCH that may be associated with the DCI. The WTRU may receive one or more SIBs (e.g., after the start of the next SIB modification period) to acquire the updated system information, for example, if the indication indicates that system information has been or will be updated.

If the DCI (e.g., DCI for paging and/or system information update) positively indicates a system information change (e.g., has occurred or will occur), there may be no PDSCH associated with the DCI. If the DCI (e.g., DCI for paging and/or system information update) does not indicate a (e.g., any) system information change or indicates no system information change, there may be a PDSCH associated with the DCI.

A DCI or DCI format may be used to page or address one or more WTRUs and/or indicate that system information has been or will be updated. The update may occur at or before the start of the next system information modification period. The DCI format may be transmitted with or without an associated PDSCH that may carry a paging message or paging information. The DCI format may include an indication as to whether or not there may be an associated PCH or PDSCH. If the DCI format indicates that there is no associated PCH or PDSCH, one or more (e.g., all) the parameters related to the PDSCH, e.g., the scheduling parameters for the PDSCH, may not be included in the DCI or the parameters may be fixed values (e.g., zeroes) or ignored. The DCI format may be carried by a PDCCH or EPDCCH which may be in CSS. For purposes of illustration and description, DCI and DCI format may be used interchangeably. The DCI format for system information update (e.g., system information update without a paging message or WTRU-specific paging message or record) may be separate or different from the DCI format for paging (e.g., for paging with an associated PCH or PDSCH).

A WTRU that receives the DCI format may receive or may attempt to receive an associated PDSCH if (e.g., only if) the DCI format indicates an associated PDSCH (e.g., that may carry a paging message) and/or the DCI format corresponds to a DCI format with an associated PDSCH (e.g., that may carry a paging message).

The DCI format may be intended for use by and/or may be used by WTRUs in connected mode and/or idle mode. The DCI format may be intended for use by and/or may be used by WTRUs that may be in coverage enhanced mode and/or that may be reduced bandwidth WTRUs. The control channel (e.g., PDCCH and/or EPDCCH) that may carry the DCI format and/or the DCI format may be repeated M-SI times or up to M-SI times. The value of M-SI may correspond to the maximum CE level supported by the cell. The value of M-SI may be provided in broadcast signaling such as system information, e.g., in a SIB which may be intended for use by and/or may be used by WTRUs which may be in coverage enhanced mode and or which may be reduced bandwidth WTRUs. The value of M-SI may be separate from and/or different from the number of repetitions that may be used for a DCI that may be for paging and/or may not indicate a system information update. The value of M-SI may be chosen by the eNB to correspond to the highest CE level (or number or repetitions) that may be needed by its connected mode WTRUs. A WTRU may combine up to M-SI repetitions to receive or successfully receive the DCI format.

The DCI format may include one or more system information update indications. A system information update indication may indicate update of one or more of: SIBs or system information that may be associated with a value tag; SIBs or system information that may be associated with ETWS; SIBs or system information that may be associated with CMAS; and/or SIBs or system information that may be associated with EAB parameters.

The CRC of a DCI format that may include one or more system information update indications (e.g., one or more positive indications or one or more indications set to yes or true) may be scrambled with an RNTI that may be different from an RNTI that may be used to scramble the CRC of a DCI format that may not include a system information update indication (e.g., a positive indication or an indication set to yes or true).

There may be a separate DCI format and/or RNTI for system information update indications to idle mode WTRUs and connected mode WTRUs.

The RNTI for a DCI format for system information update may be different from the RNTI for a DCI format for paging (e.g., WTRU-specific paging). A separate or different RNTI may be provided and/or used for one or more of a DCI format for system information update, e.g., only; a DCI format for positive system information update and paging (e.g., indicating associated paging PDSCH); and/or a DCI format for paging (e.g., indicating associated paging PDSCH) without a system information update or positive system information update. A WTRU may monitor for one or more of the RNTIs, e.g., in or according to its PO.

The schedule for a PDCCH, EPDCCH, and/or DCI format that may carry a system information update indication may be separate from the schedule for a PDCCH, EPDCCH, and/or DCI format associated with paging messages. AWTRU may determine a PO per PC to monitor for paging messages. A WTRU may determine and/or may use another schedule for monitoring for system information updates. The occasions for system information updates may be referred to as system information update occasions (SIUOs). An idle mode WTRU may monitor its PO for paging messages (e.g., for the PDCCH, EPDCCH, DCI format, and/or PDSCH for paging messages). An idle mode and/or connected mode WTRU may monitor SIUOs for system information updates. SIUOs for idle and connected mode WTRUs may be different. A WTRU may monitor for an RNTI for paging in its PO. A WTRU may monitor for an RNTI for system information update in a SIUO. When a PO and SIUO coincide, a WTRU may monitor for a paging and/or a system information update RNTI.

Following receipt of a system information update indication, a WTRU may acquire the associated system information or one or more SIBs. For some SIBs, e.g., value tag SIBs, the WTRU may wait until the start of the next system information modification period to acquire the SIBs.

A DCI format may be transmitted by the eNB and/or received by the WTRU in PDCCH or EPDCCH.

System information and/or a paging configuration may be updated. Configuration information for and/or related to paging may be carried in or at least in a broadcast signaling channel and/or system information, such as in a SIB, e.g., MTC-SIB. Configuration information, for example, for paging, may include configuration information for an (E)PDCCH that may be used to carry a scheduling information of a PDSCH that may carry a paging message. Configuration information, for example, for paging, may include the number of repetitions M for an (E)PDCCH that may be used to carry a scheduling information of a PDSCH that may carry a paging message. Configuration information, for example for paging, may include one or more parameters that may be used for (E)PDCCH and/or PDSCH reception, for example, for paging. Configuration information may include, but is not limited to, a CE level, a maximum CE level, a number of repetitions, and/or a maximum number of repetitions. Configuration information, for example, for paging, may include PDSCH configuration and/or one or more P values that may be used for reception of PDSCH, which may carry a paging message.

An MTC-SIB may be transmitted and/or may be used if the PBCH or MIB indicates the support of low-cost WTRU and/or enhanced coverage WTRU. There may be one or more MTC-SIBs. An MTC-SIB may be intended for, received by, and/or used by one or more WTRUs that may be a certain type of WTRU. The certain type may be one or more of: MTC-WTRU, LC-MTC-WTRU, reduced BW WTRU, a WTRU supporting coverage enhancements, and/or a WTRU in coverage enhanced mode.

A first MTC-SIB (e.g., MTC-SIB-O) may be transmitted in a known or determined time and/or frequency location. The time and/or frequency location may be determined, e.g., by the WTRU, based on at least one or more of the system parameters acquired from MIB (e.g., SFN, DL system bandwidth) and/or physical cell-ID.

The first MTC-SIB (e.g., MTC-SIB-O) may carry an indication of system information modification (e.g., systemInfoValueTag). The first MTC-SIB may carry one or more of the following for the second MTC-SIB (and/or subsequent MTC-SIB(s)): (i) scheduling information (e.g., schedule in time), (ii) a TBS size, (iii) a modulation order, (iv) a repetition cycle (or CE level or repetition number), and/or (v) a frequency location.

The first MTC-SIB may have one or more properties, for example the first MTC-SIB may have a fixed TBS size. A zero-padding may be used if the actual payload size is smaller than the fixed TBS size. The first MTC-SIB may have a fixed modulation order. For example, QPSK may be used. The first MTC-SIB may be used for system information modification indication and scheduling information for the subsequent (e.g., second) MTC-SIB. For example, the first MTC-SIB may only be used for system information modification indication and scheduling information for the subsequent MTC-SIB. The first MTC-SIB may be transmitted periodically.

A WTRU, such a WTRU in coverage enhancement mode, may receive the first MTC-SIB, for example, if the WTRU needs to check whether the system information has been or will be updated before it monitors or receives the paging signals. If the first MTC-SIB indicates that the system information has been updated or will be updated prior to the WTRU's PO, the WTRU may receive the subsequent MTC-SIBs (e.g., after the start of the next SIB modification period) to acquire the updated system information, for example, at least related to the paging configuration. If the WTRU cannot acquire the SIBs, e.g., at least the SIBs related to paging, prior to its PO, the WTRU may skip monitoring its PO for paging (e.g., skip monitoring (E)PDCCH for paging), for example, until after it successfully receives the SIBs.

Techniques for reuse of the P-RNTI (e.g., legacy P-RNTI) may be provided. For example, there may be limited space in CSS, which may make it difficult to page WTRUs (e.g., legacy WTRUs and CE mode WTRUs).

P-RNTI may be used for CE paging and non-CE paging, for example, without overlap or collision when paging coverage limited WTRUs and non-coverage limited WTRUs.

PDCCH that may be associated with PDSCH that may carry PCH may be transmitted and/or received in a common search space (CSS). A WTRU may monitor for P-RNTI in CSS.

PDCCH for CE mode WTRUs may be repeated M times. The same PDCCH may be repeated for one or more of the M times. The same PDCCH may be repeated for each of the M times. One or more (e.g., and possibly all) of the repetitions may be located in the same place, e.g., the same place in the CSS. There may be a gap G that may follow the PDCCH repetitions. The corresponding PDSCH may follow after the gap and may be repeated P times. P and M may be the same or different values.

A PDCCH may grant or point to one or more PDSCHs (e.g., in a current or future subframe) which may carry PCH with a certain location and/or with certain parameters or properties (e.g., MCS, etc.). A current subframe may be the same subframe as the PDCCH providing the grant. A future subframe may be a subframe after or later than the subframe of the PDCCH providing the grant.

In the M subframes in which the PDCCH may be transmitted, there may or may not be a corresponding PDSCH. A CE mode WTRU may not look for a PDSCH until after the M repetitions of the PDCCH and after it may successfully receive the PDCCH from combining the (e.g., M) PDCCH repetitions. A non-CE mode and/or legacy WTRU, however, may look for a corresponding PDSCH in one or more (e.g., each) of the M subframes in which there may be a P-RNTI. The PDSCH in these subframes may be used to page non-CE mode and/or legacy WTRUs according to non-CE mode and/or legacy rules. The PDSCHs (e.g., all the PDSCHs) in these subframes may have the same location and parameters. The PDSCHs in these subframes may have the same location and parameters as the PDSCHs that may be repeated P times for a CE mode WTRU after the gap.

In the subframes of the gap and the P PDSCH subframes for the CE mode WTRU, the CE mode WTRU may not look for or expect a P-RNTI. P-RNTI may be used in those subframes for non-CE mode and/or legacy WTRUs. A PDCCH that may use P-RNTI in those subframes may be used in a non-CE mode and/or legacy manner. In those subframes, the PDCCH that may use P-RNTI may change from subframe to subframe and the PDCCH may point to a PDSCH in a different location and/or with different parameters. The PDCCH that may use P-RNTI in those subframes may not point to a PDSCH in a location that may overlap a PDSCH that may be used by or for CE mode WTRUs.

A DRX cycle may be provided and/or used. A DRX cycle may not be suitable or sufficient for CE mode WTRUs. DRX and paging cycle may be used interchangeably.

The DRX or paging cycle for a CE mode WTRU may be the longer of a WTRU specific signaled value and a default value such as the legacy default value. The DRX or paging cycle for a CE mode WTRU may be a CE mode DRX value, which may be cell-specific and may be provided in broadcast signaling, such as system information. The DRX or paging cycle for a CE mode WTRU may be the shorter or longer of a WTRU specific signaled value (e.g., which may be specific to CE mode) and a cell specific value. The DRX or paging cycle for a CE mode WTRU may be independent of WTRU ID and/or IMSI.

The DRX or paging cycle for CE mode WTRUs may be a function of one or more of the default DRX or paging cycle (e.g., a multiple of it); the legacy DRX or paging cycle (e.g., a multiple of it); the CE level; and/or the number of repetitions of the paging PDCCH and/or PDSCH (e.g., M and/or P) and or the gap (e.g., G) between them.

Paging may be provided for and/or used by WTRUs that may be bandwidth limited. An eNB that may page or that may intend to page a WTRU may or may not know that the WTRU may be a limited bandwidth WTRU and may or may need to page the WTRU in a way in which the WTRU may receive the page.

An eNB that may support limited bandwidth WTRUs may or may always page certain WTRUs (e.g., all WTRUs or limited bandwidth WTRUs) in a bandwidth in which limited bandwidth WTRUs may receive the PDSCH (e.g., in or within N RBs such as the center N RBs, where N may be 6).

For paging a WTRU, such as one that may be a limited bandwidth WTRU, an eNB may use an EPDCCH for the control channel associated with a paging PDSCH (e.g., a PDSCH that may carry PCH), for example, since a PDCCH may not (or may not be able to) be located in a limited bandwidth.

An eNB, for example one that may not know if a WTRU it may page or intend to page may be a limited bandwidth WTRU, may page the WTRU using PDCCH (e.g., which may not be in a limited bandwidth) and EPDCCH (which may be in a limited bandwidth). The PDCCH and the EPDCCH may be associated with the same PDSCH and the grant that the PDCCH and/or EPDCCH may provide may be the same with respect to at least some (e.g., all) parameters such as one or more of the grant size (e.g., in RBs), grant location, and MCS, among others.

The PDCCH may be masked with P-RNTI or another paging RNTI that may be used by at least limited bandwidth WTRUs. The EPDCCH may be masked with P-RNTI or another paging RNTI that may be used by at least limited bandwidth WTRUs.

A WTRU that may be bandwidth limited may monitor EPDCCH in its PO. If the WTRU may receive (e.g., successfully receive) an EPDCCH that may be masked with P-RNTI or a (e.g., another) paging RNTI that may be used by at least limited BW WTRUs, the WTRU may receive or attempt to receive the associated (e.g., granted) PDSCH that may carry PCH. If the PCH may include a page for the WTRU, the WTRU may respond to the page.

For a WTRU which may be both coverage limited and bandwidth limited, the eNB may apply one or more of the examples disclosed herein for paging a WTRU that may be coverage limited where the PDSCH repetitions which may carry the PCH and/or the associated EPDCCH repetitions may be located within the limited bandwidth, which may be received by a limited bandwidth WTRU.

If an eNB may not know if a WTRU may be reduced BW, the eNB may try paging the WTRU as a full bandwidth WTRU one or more times and if unsuccessful may then try to page the WTRU as a limited bandwidth WTRU.

Paging a WTRU as a full bandwidth WTRU may include using PDCCH for the control channel (e.g., which may be masked with P-RNTI or another paging RNTI), which may be associated with a PDSCH which may carry PCH.

Paging a WTRU as a limited bandwidth WTRU may include paging the WTRU in accordance with one or more of the examples disclosed herein for limited bandwidth WTRUs such as using EPDCCH and/or limiting the EPDCCH and/or paging PDSCH to locations within the limited bandwidth.

One or more examples described herein for RAR transmission and/or reception may be applied to PCH transmission and/or reception, for example, for PCH that may be or may be intended for a WTRU that may be bandwidth limited and/or coverage limited.

An eNB may page a WTRU that may be bandwidth limited and/or coverage limited without the use of a control channel, such as PDCCH or EPDCCH.

The POs and/or PFs in which a paging PDSCH (e.g., one that may carry PCH) may be located may be known (e.g., by calculations and/or parameters such as legacy and/or new calculations and/or parameters). The grant parameters for the paging PDSCH may be known (e.g., fixed or signaled). Paging PDSCH for limited bandwidth WTRUs may be less often than paging PDSCH for full bandwidth WTRUs.

In a subframe or PO that may include a PCH intended for a WTRU that may be a bandwidth limited and/or coverage limited WTRU, the WTRU may attempt to receive a paging PDSCH using the known location and/or parameters. The WTRU may determine if it may receive the paging PDSCH successfully based on the CRC of the PDSCH. If the WTRU may successfully receive a PCH that it may determine to be intended for it, the WTRU may respond to the page.

For a WTRU that may be in CE mode, the WTRU may combine multiple repetitions of the paging PDSCH, which may be in the same location (e.g., in at least frequency resources) and may use the same parameters for one or more (e.g., each) of its repetitions, before attempting to successfully receive the PCH from the PDSCHs. For a WTRU that may be in CE mode but may not be bandwidth limited, the location of the PDSCHs may not be limited to being in or within the limited bandwidth. For a WTRU that may be bandwidth limited or that may behave like a bandwidth limited WTRU, the location of the PDSCHs may be limited to being in or within the limited bandwidth.

A location (e.g., time and/or frequency resources) of a PDSCH that may be used for paging and/or parameters (e.g., coding/decoding parameters such as MCS) of the PDSCH may be signaled by the eNB to the WTRU using dedicated signaling and/or broadcast signaling (e.g., in system information or in one or more SIBs). The location (e.g., time and/or frequency resources) and/or certain parameters may be fixed or known (e.g., by specification).

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed:

1. A method implemented by a wireless transmit/receive unit (WTRU), the method comprising:
   receiving a physical downlink control channel (PDCCH) message, wherein the PDCCH message indicates that the WTRU is to initiate a random access procedure, and wherein the PDCCH message further indicates a coverage enhancement (CE) level associated with the random access procedure;
   transmitting, based on the received PDCCH message, a preamble using a physical random access channel (PRACH) resource;
   repeating transmission of the preamble, wherein a number of repetitions is based on the CE level indicated by the PDCCH message; and
   receiving a random access response (RAR) within a response time window, wherein at least one parameter of the response time window is determined based on the CE level indicated by the PDCCH message.

2. The method of claim 1, wherein the at least one parameter of the response time window is a length of the response time window.

3. The method of claim 1, further comprising determining, based on the CE level indicated by the PDCCH message, a time location to start monitoring for the RAR.

4. The method of claim 3, wherein the time location is indicated in terms of a subframe.

5. The method of claim 4, wherein the time location is determined to be three subframes after a subframe associated with a last repeated transmission of the preamble.

6. The method of claim 3, further comprising starting to monitor for the RAR at the determined time location.

7. The method of claim 1, wherein the PDCCH message includes downlink control information that indicates the CE level.

8. The method of claim 1, wherein the CE level is a starting CE level.

9. The method of claim 1, wherein the PRACH resource is selected based on the CE level indicated by the PDCCH message.

10. The method of claim 1, further comprising receiving configuration information that indicates a relationship between the CE level and a parameter associated with the response time window.

11. A wireless transmit/receive unit (WTRU), comprising:
    a processor configured to:
    receive a physical downlink control channel (PDCCH) message, wherein the PDCCH message indicates that the WTRU is to initiate a random access procedure, and wherein the PDCCH message further indicates a coverage enhancement (CE) level associated with the random access procedure;
    transmit, based on the received PDCCH message, a preamble using a physical random access channel (PRACH) resource;
    repeat transmission of the preamble, wherein a number of repetitions is based on the CE level indicated by the PDCCH message; and receive a random access response (RAR) within a response time window, wherein at least one parameter of the response time window is determined based on the CE level indicated by the PDCCH message.

12. The WTRU of claim 11, wherein the at least one parameter of the response time window is a length of the response time window.

13. The WTRU of claim 11, wherein the processor is further configured to determine, based on the CE level indicated by the PDCCH message, a time location to start monitoring for the RAR.

14. The WTRU of claim 13, wherein the time location is indicated in terms of a subframe.

15. The WTRU of claim 14, wherein the time location is determined to be three subframes after a subframe associated with a last repeated transmission of the preamble.

16. The WTRU of claim 13, wherein the processor is further configured to start monitoring for the RAR at the determined time location.

17. The WTRU of claim 11, wherein the CE level is a starting CE level.

18. The WTRU of claim 11, wherein the PRACH resource is selected based on the CE level indicated by the PDCCH message.

19. A network device, comprising:
a processor configured to:
determine a coverage enhancement (CE) level for a wireless transmit/receive unit (WTRU);
indicate the CE level to the WTRU through a physical downlink control channel (PDCCH) message;
receive repeated transmissions of a random access preamble from the WTRU in response to indicating the CE level to the WTRU; and
transmit a random access response (RAR) to the WTRU within a response time window, wherein a length of the response time window is dependent on the CE level.

20. The network device of claim 19, wherein the CE level indicates a number of times that the WTRU is to repeat the random access preamble.

* * * * *